(12) United States Patent
Swartz et al.

(10) Patent No.: US 6,837,436 B2
(45) Date of Patent: Jan. 4, 2005

(54) CONSUMER INTERACTIVE SHOPPING SYSTEM

(75) Inventors: Jerome Swartz, Old Field, NY (US); Thomas K. Roslak, Eastport, NY (US); Mauro Premutico, Brooklyn, NY (US); Adam Petrovich, Pittsburgh, PA (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 197 days.

(21) Appl. No.: 09/990,597

(22) Filed: Nov. 21, 2001

(65) Prior Publication Data

US 2003/0132298 A1 Jul. 17, 2003

Related U.S. Application Data

(63) Continuation-in-part of application No. 09/487,923, filed on Jan. 19, 2000, which is a division of application No. 08/866,690, filed on May 30, 1997, now abandoned, which is a continuation-in-part of application No. 08/780,023, filed on Dec. 20, 1996, now Pat. No. 6,084,528, which is a continuation-in-part of application No. 08/706,579, filed on Sep. 5, 1996, now Pat. No. 5,825,002.

(51) Int. Cl.[7] ............................................. G06K 7/10
(52) U.S. Cl. ............................ 235/472.02; 235/462.45
(58) Field of Search ..................... 235/472.02, 462.45, 235/462.46, 472.01, 380, 385, 383

(56) References Cited

U.S. PATENT DOCUMENTS

| | | | |
|---|---|---|---|
| 4,373,133 A | 2/1983 | Clyne et al. ................. | 235/383 |
| 4,779,706 A | 10/1988 | Mergenthaler ............... | 186/61 |
| 4,787,467 A | 11/1988 | Johnson ......................... | 177/50 |
| 4,792,018 A | 12/1988 | Humble et al. ............... | 186/61 |
| 4,833,308 A | 5/1989 | Humble ........................ | 235/383 |
| 4,882,724 A | 11/1989 | Vela et al. .................... | 364/401 |
| 4,947,028 A | 8/1990 | Gorog ........................... | 235/381 |
| 4,949,256 A | 8/1990 | Humble ........................ | 364/401 |
| 4,973,952 A | 11/1990 | Malec et al. ................. | 340/825 |
| 5,047,614 A | 9/1991 | Bianco ......................... | 235/385 |
| 5,192,854 A | 3/1993 | Counts ......................... | 235/375 |
| 5,227,874 A | 7/1993 | Von Kohorn ................ | 358/84 |
| 5,250,789 A | 10/1993 | Johnsen ....................... | 235/383 |
| 5,287,266 A | 2/1994 | Malec et al. ................. | 364/401 |
| 5,294,781 A | 3/1994 | Takahashi et al. ........... | 235/376 |
| 5,297,882 A | 3/1994 | Kornides ...................... | 401/184 |
| 5,340,970 A | 8/1994 | Wolfe et al. ................. | 235/383 |
| 5,361,871 A | 11/1994 | Gupta et al. .................. | 186/61 |
| 5,420,606 A | 5/1995 | Begum et al. ............... | 345/156 |
| 5,424,524 A | 6/1995 | Ruppert et al. .............. | 235/462 |
| 5,426,282 A | 6/1995 | Humble ........................ | 235/383 |
| 5,437,346 A | 8/1995 | Dumont ........................ | 186/61 |
| 5,457,307 A | 10/1995 | Dumont ........................ | 235/383 |
| 5,463,209 A | 10/1995 | Figh et al. .................... | 235/383 |
| 5,469,206 A | 11/1995 | Strubbe et al. ............... | 348/7 |
| 5,478,989 A | 12/1995 | Shepley ........................ | 235/375 |
| 5,490,060 A | 2/1996 | Malec et al. ................. | 364/401 |
| 5,630,068 A | 5/1997 | Vela et al. .................... | 395/201 |
| 5,664,110 A | 9/1997 | Green et al. .................. | 705/26 |
| 5,761,648 A | 6/1998 | Golden et al. ............... | 705/14 |
| 5,821,513 A | 10/1998 | O'Hagan et al. ............. | 235/383 |
| 5,859,414 A | 1/1999 | Grimes et al. ............... | 235/383 |
| 5,918,211 A | 6/1999 | Sloane .......................... | 705/16 |
| 5,950,173 A | 9/1999 | Perkowski .................... | 705/26 |
| 5,970,469 A | 10/1999 | Scroggie et al. ............. | 705/14 |
| 5,995,015 A | 11/1999 | DeTemple et al. ....... | 340/825.49 |
| 6,000,610 A | 12/1999 | Talbott et al. ............... | 235/383 |

(List continued on next page.)

*Primary Examiner*—Daniel St Cyr
(74) *Attorney, Agent, or Firm*—Amin & Turocy, LLP

(57) ABSTRACT

The present invention relates generally to a consumer interactive shopping and marketing system. The system includes a portable data terminal for communicating information over a communication network. The present system has aspects that may be used within a shopping establishment or at a user's home.

105 Claims, 26 Drawing Sheets

U.S. PATENT DOCUMENTS

| | | | |
|---|---|---|---|
| 6,009,411 A | 12/1999 | Kepecs | 705/14 |
| 6,014,634 A | 1/2000 | Scroggie et al. | 705/14 |
| 6,026,376 A | 2/2000 | Kenney | 705/27 |
| 6,055,573 A | 4/2000 | Gardenswartz et al. | 709/224 |
| 6,076,069 A | 6/2000 | Laor | 705/14 |
| 6,084,528 A * | 7/2000 | Beach et al. | |
| 6,101,483 A | 8/2000 | Petrovich et al. | 705/26 |
| 6,101,485 A | 8/2000 | Fortenberry et al. | 705/27 |
| 6,119,935 A | 9/2000 | Jelen et al. | 235/383 |
| 6,123,259 A | 9/2000 | Ogasawara | 235/380 |
| 6,129,274 A | 10/2000 | Suzuki | 235/381 |
| 6,155,486 A | 12/2000 | Lutz | 235/383 |
| 6,168,079 B1 | 1/2001 | Becker et al. | 235/383 |
| 6,185,541 B1 | 2/2001 | Scroggie et al. | 705/14 |
| 6,189,789 B1 | 2/2001 | Levine et al. | 235/383 |
| 6,237,145 B1 | 5/2001 | Narasimhan et al. | 725/23 |
| 6,296,184 B1 | 10/2001 | Dejaeger | 235/383 |
| 6,298,330 B1 | 10/2001 | Gardenswartz et al. | 705/14 |
| 6,317,722 B1 | 11/2001 | Jacobi et al. | 705/14 |
| 6,330,543 B1 | 12/2001 | Kepecs | 705/14 |

* cited by examiner

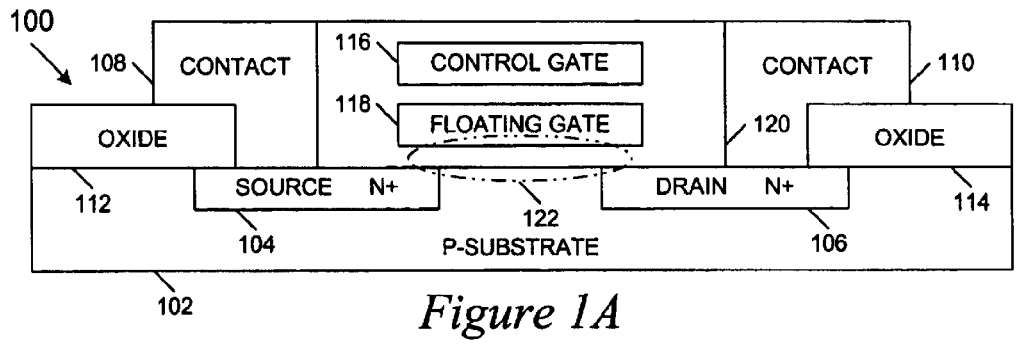
Figure 1A
*(PRIOR ART)*
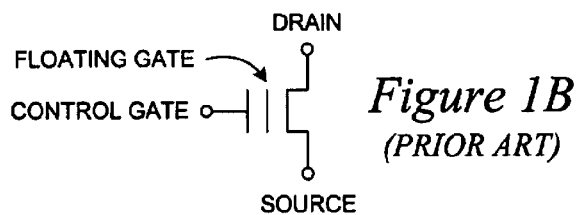
Figure 1B
*(PRIOR ART)*
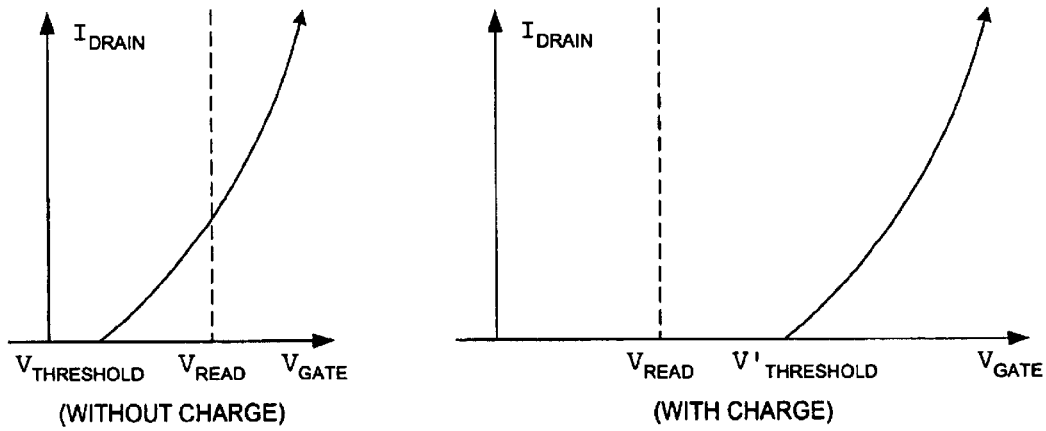
Figure 1C
*(PRIOR ART)*
Figure 1D
*(PRIOR ART)*

CALCULATION OF NV MEMORY CELL RETENTION CHARACTERISTICS

| q0, C | m0, kg | kb, J/K | h, J-s | hb, J-s |
|---|---|---|---|---|
| 1.6022E-019 | 9.1095E-031 | 1.38062E-023 | 6.62617E-034 | 1.05459E-034 |

| b0, eV (barrier) | εi | mr, effective mass ratio | T, K degree |
|---|---|---|---|
| 2.9 | 3.9 | 0.5 | 300 |

| c | b |
|---|---|
| 1.0630E-006 | 2.3854E+008 |

| Seconds | Time Period |
|---|---|
| 31536000 | 1 year |
| 94608000 | 3 years |
| 1.9E+008 | 6 years |
| 2.8E+017 | 9 years |
| 3.8E+008 | 12 years |
| 4.7E+008 | 15 years |
| 9.1E+009 | 18 years |
| 6.6E+008 | 21 years |
| 7.6E+008 | 24 years |
| 8.5E+008 | 27 years |
| 9.5E+008 | 30 years |

| Parameter | Value | Description |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 80 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.4313 | Capacitance between the floating gate and the silicon substrate |
| Cfd fF | 0.1078 | Capacitance between the floating gate and the drain |
| Cfs fF | 0.7547 | Capacitance between the floating gate and the source |
| Cfg fF | 1090.8295 | Total floating gate capacitance |
| Cr,wl | 0.9988 | Control gate to floating gate coupling ratio |
| Cr,src | 0.0007 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg.ini | -5.00 | Initial floating chaged voltage |
| Va | 0.00 | Actual erase volatge (equal to applied + charge stored on the floating) |
| S | 3.76E+016 | Derived parameter in the floating gate "erase" equation |
| X | 1.27E+011 | Derived parameter in the floating gate "erase" equation |

*Figure 1E*
*(PRIOR ART)*

CALCULATION OF NV MEMORY CELL RETENTION CHARACTERISTICS

| | | | | | Seconds | Time Period |
|---|---|---|---|---|---|---|
| q0, C | m0, kg | kb, J/K | h, J-s | hb, J-s | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| b0, eV (barrier) | $\varepsilon_1$ | mr, effective mass ratio | | T, K degree | 604800 | 1 week |
| 2.9 | 3.9 | 0.5 | | 300 | 2592000 | 1 month |
| | | | | | 31536000 | 1 year |
| C | b | | | | 1.3E+008 | 4 years |
| 1.0630E-006 | 2.3854E+008 | | | | 5E+008 | 16 years |
| | | | | | 1E+009 | 32 years |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 80 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.4313 | Capacitance between the floating gate and the silicon substrate |
| Cfd fF | 0.1078 | Capacitance between the floating gate and the drain |
| Cfs fF | 0.7547 | Capacitance between the floating gate and the source |
| Cfg fF | 1090.8295 | Total floating gate capacitance |
| Cr,wl | 0.9988 | Control gate to floating gate coupling ratio |
| Cr,src | 0.0007 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 3.76E+016 | Derived parameter in the floating gate "erase" equation |
| X | 1.27E+011 | Derived parameter in the floating gate "erase" equation |

*Figure 1G*
(PRIOR ART)

CALCULATION OF NV MEMORY CELL RETENTION CHARACTERISTICS

| | | | | | Seconds | Time Period |
|---|---|---|---|---|---|---|
| $q0, C$ | $m0, kg$ | $kb, J/K$ | $h, J\text{-}s$ | $hb, J\text{-}s$ | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| $b0, eV$ (barrier) | $\varepsilon l$ | $mr$, effective mass ratio | $T, K$ degree | | 604800 | 1 week |
| 2.9 | 3.9 | 0.5 | 300 | | 2592000 | 1 month |
| | | | | | 31536000 | 1 year |
| $C$ | $b$ | | | | 1.3E+008 | 4 years |
| 1.0630E-006 | 2.3854E+008 | | | | 5E+008 | 16 years |
| | | | | | 1E+009 | 32 years |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 85 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.4059 | Capacitance between the floating gate and the silicon substrate |
| Cfd fF | 0.1015 | Capacitance between the floating gate and the drain |
| Cfs fF | 0.7103 | Capacitance between the floating gate and the source |
| Cfg fF | 1090.7534 | Total floating gate capacitance |
| Cr,wl | 0.9989 | Control gate to floating gate coupling ratio |
| Cr,src | 0.0007 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 4.09E+017 | Derived parameter in the floating gate "erase" equation |
| X | 1.20E+011 | Derived parameter in the floating gate "erase" equation |

*Figure 11*
*(PRIOR ART)*

CALCULATION OF NV MEMORY CELL RETENTION CHARACTERISTICS

| q0, C | m0, kg | kb, J/K | h, J-s | hb, J-s | Seconds | Time Period |
|---|---|---|---|---|---|---|
| 1.6022E-019 | 9.1095E-031 | 1.38062E-023 | 6.62617E-034 | 1.05459E-034 | 2592000 | 1 month |
| | | | | | 5184000 | 2 months |
| | | | | | 7776000 | 3 months |
| b0, eV (barrier) | $\epsilon$l | mr, effective mass ratio | T, K degree | | 10368000 | 4 months |
| 2.9 | 3.9 | 0.5 | 300 | | 12960000 | 5 months |
| | | | | | 15552000 | 6 months |
| c | b | | | | 18144000 | 7 months |
| 1.0630E-006 | 2.3854E+008 | | | | 20736000 | 8 months |
| | | | | | 23328000 | 9 months |
| | | | | | 25920000 | 10 months |
| | | | | | 28512000 | 11 months |
| | | | | | 31104000 | 12 months |

| | | | Seconds | Time Period |
|---|---|---|---|---|
| Lfg um | 0.6000 | Channel length of floating gate device | 33696000 | 13 months |
| Wfg um | 1000.0000 | Channel width of floating gate device. | 36288000 | 14 months |
| Hfg um | 0.0900 | Thickness of floating gate polysilicon conductor | 38880000 | 15 months |
| Wrx um | 0.5000 | Width of floating gate overlapping shallow trench isolation | 41472000 | 16 months |
| Ttunox A | 65 | Tunnel oxide thickness | | |
| Tono A | 190 | Thickness of Oxide-Nitride-Oxide dielectric between floating gate and control gate for capacitive coupling | | |
| Tswox A | 300 | Thickness of sidewall oxide between floating gate and control gate for sidewall coupling | | |
| Xfd um | 0.0500 | Length of floating gate overlapping drain region of the floating gate MOSFET | | |
| Xfs um | 0.3500 | Length of floating gate overlapping source region of the floating gate MOSFET | | |
| Ainj um2 | 0.0436 | Area of the electron tunneling region between the floating gate and the source for resetting the floating gate charge | | |
| Cfc fF | 1089.5358 | Capacitance between the floating gate and the control gate | | |
| Cfsx fF | 0.5308 | Capacitance between the floating gate and the silicon substrate | | |
| Cfd fF | 0.1327 | Capacitance between the floating gate and the drain | | |
| Cfs fF | 0.9288 | Capacitance between the floating gate and the source | | |
| Cfg fF | 1091.1281 | Total floating gate capacitance | | |
| Cr,wl | 0.9985 | Control gate to floating gate coupling ratio | | |
| Cr,src | 0.0009 | Source junction to floating gate coupling ratio | | |
| Vt,fg V | 0.90 | Threshold voltage of floating gate MOSFET | | |
| Verase | 0.00 | Erase voltage applied to the source(not used here, set to zero) | | |
| Vfg,ini | -5.00 | Initial floating chaged voltage | | |
| Va | 0.00 | Actual erase volatge (equal to applied + charge stored on the floating) | | |
| S | 2.93E+013 | Derived parameter in the floating gate "erase" equation | | |
| X | 1.56E+011 | Derived parameter in the floating gate "erase" equation | | |

*Figure 1L*

CALCULATION OF NV MEMORY CELL RETENTION CHARACTERISTICS

| | | | | | Seconds | Time Period |
|---|---|---|---|---|---|---|
| $q0$, C | $m0$, kg | $kb$, J/K | $h$, J-s | $hb$, J-s | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| $b0$, eV (barrier) | $\varepsilon l$ | $mr$, effective mass ratio | | T, K degree | 604800 | 1 week |
| 2.9 | 3.9 | 0.5 | | 300 | 1209600 | 2 weeks |
| | | | | | 2592000 | 1 month |
| $c$ | $b$ | | | | 5184000 | 2 months |
| 1.0630E-006 | 2.3854E+008 | | | | 10368000 | 4 months |
| | | | | | 15552000 | 6 months |
| | | | | | 20736000 | 8 months |
| | | | | | 25920000 | 10 months |
| | | | | | 31104000 | 12 months |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Tlunox A | 65 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.5308 | Capacitance between the floating gate and the silicon substrate |
| Cfd fF | 0.1327 | Capacitance between the floating gate and the drain |
| Cfs fF | 0.9288 | Capacitance between the floating gate and the source |
| Cfg fF | 1091.1281 | Total floating gate capacitance |
| Cr,wl | 0.9985 | Control gate to floating gate coupling ratio |
| Cr,src | 0.0009 | Source junction to floating gate coupling ratio |
| Vt.fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 2.93E+013 | Derived parameter in the floating gate "erase" equation |
| X | 1.56E+011 | Derived parameter in the floating gate "erase" equation |

*Figure 1N*

CALCULATION OF NV MEMORY CELL RETENTION CHARACTERISTICS

| | | | | | Seconds | Time Period |
|---|---|---|---|---|---|---|
| $q0, C$ | $m0, kg$ | $kb, J/K$ | $h, J\text{-}s$ | $hb, J\text{-}s$ | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| $b0, eV$ (barrier) $\varepsilon 1$ | | $mr$, effective mass ratio | $T, K$ degree | | 604800 | 1 week |
| 2.9 | 3.9 | 0.5 | 300 | | 1209600 | 2 weeks |
| | | | | | 2592000 | 1 month |
| $C$ | $b$ | | | | 5184000 | 2 months |
| 1.0630E-006 | 2.3854E+008 | | | | 10368000 | 4 months |
| | | | | | 15552000 | 6 months |
| | | | | | 20736000 | 8 months |
| | | | | | 25920000 | 10 months |
| | | | | | 31104000 | 12 months |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 60 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.5750 | Capacitance between the floating gate and the silicon substrate |
| Cfd fF | 0.1438 | Capacitance between the floating gate and the drain |
| Cfs fF | 1.0063 | Capacitance between the floating gate and the source |
| Cfg fF | 1091.2608 | Total floating gate capacitance |
| Cr,wl | 0.9984 | Control gate to floating gate coupling ratio |
| Cr,src | 0.0009 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 2.70E+012 | Derived parameter in the floating gate "erase" equation |
| X | 1.69E+011 | Derived parameter in the floating gate "erase" equation |

*Figure 1P*

VOLTAGES DURING PROGRAMMING OPERATION

VOLTAGES DURING SENSING OPERATION

CONSUMER INTERACTIVE SHOPPING SYSTEM

RELATED APPLICATIONS

This application is a continuation-in-part of U.S. patent application Ser. No. 09/487,923 entitled "PORTABLE SHOPPING FULFILLMENT SYSTEM" filed on Jan. 19, 2000, currently pending, which is a division of application Ser. No. 08/866,690, entitled "PORTABLE SHOPPING AND FULFILLMENT SYSTEM" filed on May 30, 1997, now abandoned, which is a continuation in part of application Ser. No. 08/780,023, Dec. 20, 1996, U.S. Pat. No. 6,084,528, entitled "INTRANET SCANNING TERMINAL SYSTEM" which is a continuation in part of application Ser. No. 08/706,579, Sep. 5, 1996, U.S. Pat. No. 5,825,002, entitled "DEVICE AND METHOD FOR SECURE DATA UPDATES IN A SELF-CHECKOUT SYSTEM".

FIELD OF USE

This invention relates generally to an improved marketing and shopping system. The system includes a portable data terminal and for communicating information over a communication network. The portable data terminal can receive and display messages related to products that are being offered for sale.

BACKGROUND OF THE INVENTION

The use of data collecting portable computing terminals manufactured by Symbol Technologies, Inc., the assignee of the present invention, has been adopted in many commercial applications. These terminal systems may include integrated bar code readers which permit the collection, storage and distribution of a high volume of data without the need for extensive keypad data entry. These terminal systems also provide full computing capabilities using standard PC architectures. These terminal systems may also be provided with wireless communication radio systems such as Symbol Technologies, Inc. local area network radio system "SPECTRUM24®". The SPECTRUM24® radio network system permits hand-held terminals to share and retrieve data in the proximity of local area networks with a central host. Handheld computing terminals offering various computing functions have been previously used in consumer applications. Examples of such systems are described in Dutch Patent Application No. 9002296 ("the '296 Application") and U.S. Pat. No. 5,468,942 to Oosterveen et al. ("the Oosterveen Patent"). The '296 Application and the Oosterveen Patent describe systems in which an authorized customer is issued a terminal having an integrated bar code scanner to record merchandise purchases. The scanners maintain a list of merchandise selected for purchase by the customer within internal memory means. Prior to exiting the store, the information stored in the memory of a scanner is downloaded through a communication port attached to a terminal dispenser, and a printed ticket of the customer's purchases is printed on a printer. The customer then proceeds to a checkout register where the customer tenders payment for the purchased merchandise. The systems may provide for the occasional audit of customers using the system to ensure integrity of the self-service system.

Commercially available prior art self-checkout systems have employed relatively simple and unsophisticated consumer systems which have generally been limited to providing simple pricing and product identification information. Although the proliferation and general acceptance of networked computers and the Internet has improved access to information, it has not yet changed the fundamental nature of how consumers select, purchase and receive consumable goods and other items, nor has such information been successfully provided to consumers during a standard shopping transaction at a retail facility. Nor have these systems been employed to significantly improve article collection and distribution systems. There currently exists a need for improved ordering systems, systems for providing improved product data profiles, order collection and order fulfillment.

SUMMARY OF THE INVENTION

It is the object of the present invention to provide an improved marketing and shopping system which may be used in a portable shopping and order fulfillment system.

It is a further object of the present invention to provide a standardized system for presenting data at a portable terminal by retrieving associated data files stored at remote addresses by employing a wireless communication network. In a preferred embodiment, the portable terminal employs a relatively simple microprocessor and system architecture while providing full graphics and audio support.

It is a further object of the present invention to provide improved access to generally available multi-media data files associated with an item identified by a portable terminal.

It is a further object of the present invention to provide an improved self-scanning system which provides improved multi-media support and direct marketing functions.

It is a further object of the present invention to provide an improved marketing and shopping system which has an intelligent messaging agent for selecting messages to send to a portable terminal.

The present invention provides an improved portable shopping system and an improved order selection and fulfillment system. The portable shopping system is provided with an improved portable terminal which is provided with telephony as well as enhanced video capabilities. The home shopping system is provided with a customer order system, a product collection system and a product delivery system. In a preferred embodiment of the present invention, the order system is an Internet accessible user interface which is user dependent. An authorized user may access the system from a home computer (or dedicated order kiosk) and retrieve user specific data which may be useful in placing their order. For instance, a user may select a list of items purchased on his or her last three shopping trips to the store or for items required for a selected recipe. Alternatively, a user may employ a graphical display of a store product layout to browse through the store's products for selection of items. Once the items are selected, the customer may then select to have the list stored, items collected for pick-up or delivery.

When the items are to be collected, either by the customer or an attendant, the collector is provided with a portable hand-held terminal which displays the list of items to be collected. The terminal is in communication with a central host and may be provided with a machine code reader to assist in recording selected items from the list. The portable terminal is also provided with item-related information, as required, to assist in selecting items such as product ingredients, nutritional data, price information, promotional data, and government subsidized information (e.g., applicability of food stamps). In the event the terminal is used by an attendant, such functions may be turned off and items such as delivery instructions and packing requests may be provided. The system could also be employed to permit efficient collection of the listed items, or in the case of an attendant collecting items for order fulfillment for multiple customers, efficient collection and tracking of multiple customer orders. The system could be used to present information to an employee about a customer's particular requirements. For instance, the terminal could provide an employee with information about whether a customer wants green or yellow bananas.

In a preferred embodiment of the present invention, a portable terminal having an integrated machine code reader and a radio is provided with a graphical user interface such as a "web browser." The terminal is provided with a display for illustrating help and instructional files associated with a selected item identified with the machine code reader.

The information downloaded to the hand-held terminal can be presented in any number of forms. The data can be presented in the form of a still picture, text, audio or as video. As a result, a consumer using an open standard communications network and a generic hand terminal can download a video image of a product part and a video clip for the part providing instructions on its removal and repair. The use of standard data protocols such as those used currently on the Internet permit wide area accessibility over commercial and closed communication networks on any number of hardware platforms.

A preferred alternative embodiment of the present invention includes machine readable coded labels having one or more remote file location, such as uniform resurrect locators ("URLS") used to reference sites on the world wide web. These URLs are used by the portable terminal to retrieve data files including items such as prices, nutritional data, coupon availability, promotions, marketing data and general interest data from various local and remote addresses available over a wireless communication network. The machine coded labels are preferably encoded with a high-density bar code such as PDF417. These URLs can be presented on the terminal display in the form of a hyperlink which submits a data retrieval request to a remote address upon selection. The displayed hyperlink could be presented on the display as either a direct address (URL) or a highlighted title for the address.

In an alternative embodiment of the present invention, a portable terminal having a unique address on the system is provided with a voice transmission channel. This permits the terminal to function as a telephone and pager. The telephone line could be automatically established using an associated data link or by dialing a phone number.

The equipment necessary to implement the present system could be financed by consumer product manufacturers, a store that sells products, coupon vendors (i.e., entities that offer discounts on products and receive compensation from the manufacturer of the product) or the manufacturer of the equipment. Alternatively, the system could be financed by a combination of some or all of these entities.

BRIEF DESCRIPTION OF THE DRAWINGS

The present invention will be understood and appreciated more from the following detailed description, taken in conjunction with the drawings, in which:

FIGS. 7A–7E are illustrative examples of display outputs employed in a self-scanning system employing a preferred embodiment of the present invention;

FIGS. 8A and 8B are general functional block diagram of alternative preferred embodiments of a telephony system used in a portable terminal of the present invention;

FIG. 9 is an example of system components used by a consumer in a self-scanning system employing a preferred embodiment of the present invention;

FIG. 16 is a table of records stored in a product profile database of one embodiment of the present invention;

FIG. 17 is a table of records stored in a product profile database that provides information about external characteristics of available products in one embodiment of the present invention;

FIG. 18 is a table of records stored in a product profile database that provides cross-reference information of available products in one embodiment of the present invention;

FIG. 19 is a table of records stored in a customer profile database for a particular customer in accordance with one embodiment of the present invention;

FIG. 20 is a table of records relating to shopping behavior for a particular customer stored in a customer profile database in accordance with one embodiment of the present invention; and FIG. 21 is a table of records relating to shopping behavior for a particular customer on a particular date that are stored in a customer profile database in accordance with one embodiment of the present invention.

DETAILED DESCRIPTION OF THE PREFERRED EMBODIMENT

The present invention employs a portable terminal having an integrated machine code reader. Although the system will be described in terms of a portable terminal employing an integrated bar code laser scanner, it will be understood by those skilled in the art that the machine code reader can be a radio frequency identification tag reader, a CCD (charged coupled device) or CMOS imager or any other type of machine code reader which can decode encoded indicia on an article and/or collect data by means of optical, radio or other means.

In a preferred embodiment, the portable terminal of the present invention employs a wireless communication radio for communicating data to a central computer over a wireless communication network. The network could be either a local area network ("LAN"), such as Symbol's SPEC-TRUM24® spread spectrum frequency hopping communication network, or a wide area communication network system ("WAN") such as those employing a cellular digital packet data (CDPD) communication protocol, or a combination of LAN and WAN systems and other systems such as personal area network (PAN) and satellite systems.

Data collected with the portable terminal is communicated to a central host. In a preferred embodiment, the host performs most of the computing functions, thereby reducing the computational memory and power requirements of the portable terminals communicating with the system. The host is preferably connected to other remote networks through high speed communication links such as commercially available T1, T2 or T3 type connections. Through such connections, the host may communicate with third party servers employing standard TCP/IP and other standardized communication protocols to transmit/retrieve data in a secure fashion.

The present invention will be described in terms of an improved retail shopping system. However, as noted above, it will be understood by those skilled in the art that the present invention may be utilized in any data collection environment in which data is communicated from a host system to an end user employing a portable data collection terminal. The present invention also describes the system as being used by a "customer." However, it will be understood by those skilled in the art that that the end user could be a professional (such as a doctor, lawyer, engineer, or financial service individual), a tradesman (electrician, plumber, etc) or a standard laborer as well as store personnel, manufacturers, distributors and delivery personnel may utilize many of the features described with minor customization.

A. The Portable Terminal

Figure 2:
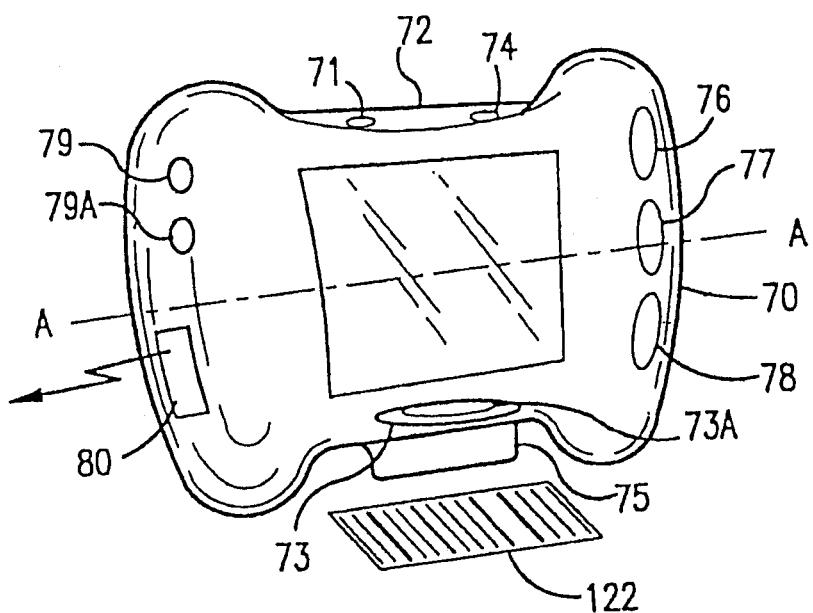

FIG. 2 illustrates a preferred embodiment of a portable terminal of the present invention. The portable terminal may be owned or leased by the customer or loaned to the customer. The portable terminal could be dedicated to a particular store (or store chain) wherein it would provide additional functions or simply not operate outside of the store or store chain. As discussed below, the customer may check-out a portable terminal when he enters a merchant's establishment and return it before he leaves without cost to the customer. The terminal 70 is provided with a display 72. The display is preferably a graphics type video display having a touch sensitive surface. The display will function both as a video display and a data input device. A pen 73 is also provided on the terminal 70. The pen 73 is located in a pen slot 73A when not in use.

In a preferred embodiment, the terminal 70 is also provided with a limited number of activation buttons 76, 77 and 78 for performing various user functions. In the context of a preferred portable shopping system, the portable terminal includes a "plus" key to "add" an item selected by a consumer to a list of purchased items, a "minus" key to "delist" a previously selected item from the purchase list which is to be returned to the shelves of the store, and an "equals" key to display the total cost of the items selected for purchase. In a preferred embodiment the portable terminal includes a key for a customer to indicate that he would like additional information about an item. If a customer scans a product and engages this key, the portable terminal can access a database to provide additional information about the product, such as recipe, nutritional information, instructions on use, government subsidized information, etc.

The portable terminal of the present invention could be a portable digital assistant ("PDA") computer. Currently available PDAs on the market include the iPAQ manufactured by Compaq Computer Corporation, the Palm series manufactured by Palm, Inc. and the Visor series manufactured by Handspring Inc. The PDA may include a module or sled to provide additional functionality to the PDA such as a product identification reader and/or radio capabilities. In another preferred embodiment the portable terminal is a cell phone modified for use by the system. The cell phone would preferably include a product identification reader. An example of such a phone is described in U.S. Pat. No. 6,243,477 assigned to Symbol Technologies Inc. In another preferred embodiment the portable terminal is a key-fob device. Examples of such key-fob are commercially available from the assignee of the present invention under the trade names CS-1504 and CS-2000. The portable terminal may be a hand held device or it may be permanently or removably mounted on a shopping cart or other device designed to carry products selected by a user.

In a preferred embodiment of the present invention, the terminal 70 is provided with a voice communication system including a microphone 71 and a speaker 74. This voice communication system may be used to obtain assistance from a store operator or to transmit audio data broadcast by the central host, i.e., "Please proceed to the store checkout center, the store will close in ten minutes" or "Soda is on sale for 89 cents in aisle five." Video messages may also be transmitted to the video display 72. In order to protect consumers in retail facilities from unwanted commercial transmissions, the terminal is also provided with a commercial transmission "on/off" button 79. This button disables transmission of broadcast audio and/or video commercials to consumers during their shopping trips. Preferably, the "off" button will not disengage the transmission of urgent messages such as a lost child notice, an emergency notice, or as described further below, a specified preference information message. In addition, the voice system on the portable terminal may also be used to provide voice activated control commands on the portable terminal or audio feedback of product data for the visually impaired.

Collection of data is preferably performed by a bar code scanner 75. Preferably the scanner will be able to read one and two dimensional bar codes such as the ubiquitous UPC/EAN/JAN code and PDF 417 code. The scanner could be provided with either a short range radio link and its own battery supply or a wired connection. In a preferred embodiment the short range radio link complies with the Bluetooth standard. In the event the products selected by the customer also bear electronic article surveillance (EAS) tags, the terminal may also be provided with a deactivation circuit which is activated when the product is scanned for purchase and deactivation prior to the product being delisted from the consumer's shopping list. An example of such an activation/deactivating system is described in U.S. Pat. No. 5,594,228 which is assigned to Symbol Technologies, Inc.

To conserve battery power on the terminal, the EAS tags are preferably used on a limited number of restricted sales items so that the EAS tags will be deactivated/activated only upon determination that the selected item is available for purchase by the customer at that specified time and place. After a customer scans a code associated with a product, the system could access a database to determine whether the scanned product has an EAS tag. If the product is determined to have an EAS tag, the EAS tag deactivator on the terminal could be turned on and the EAS tag can be deactivated.

Portable terminal 70 communicates with a central host through a wireless radio 80. The wireless radio 80 may communicate over a wireless wide area network and/or a local area network. In a preferred embodiment of the present invention, the radio 80 is a Symbol SPECTRUM24® PCM-CIA type II card communicating over a local area network employing a frequency-hopping communication system conforming to the IEEE 802.11 standard. The standard is available from IEEE Standards Department, 445 Hoes Lane, P.O. Box 1331, Piscataway, N.J. 08855-1331. The standard is incorporated herein by reference and shall not be further discussed. The system employs data throughput of at least one mega bit per second. Depending on the volume of data being transmitted, discrete communication systems such as SPECTRUM ONE®, also available from Symbol Technologies, Inc., may also be used. Moreover, many other frequency bands and data encoding schemes could be employed which provide adequate bandwidth and security.

The ergonomic design of the portable terminal shown in FIG. 2 permits a consumer to use the terminal in either horizontal configuration along line A—A, or in a vertical configuration relative to line A—A. The terminal is provided with a reconfiguration key setting that permits the video system to automatically reconfigure its display to reflect the user's preference. The reconfiguration key 79A will automatically reconfigure the video display to change the display configuration from the first configuration, e.g., landscape, to a second configuration, e.g., portrait. The reconfiguration function permits a facility to connect the portable terminal to a fixed station in more than one arrangement. Thus, depending on space requirements, the portable terminal may be used as part of a kiosk to provide a fixed station for presenting pricing data, advertising and customer assistance.

Figure 3:
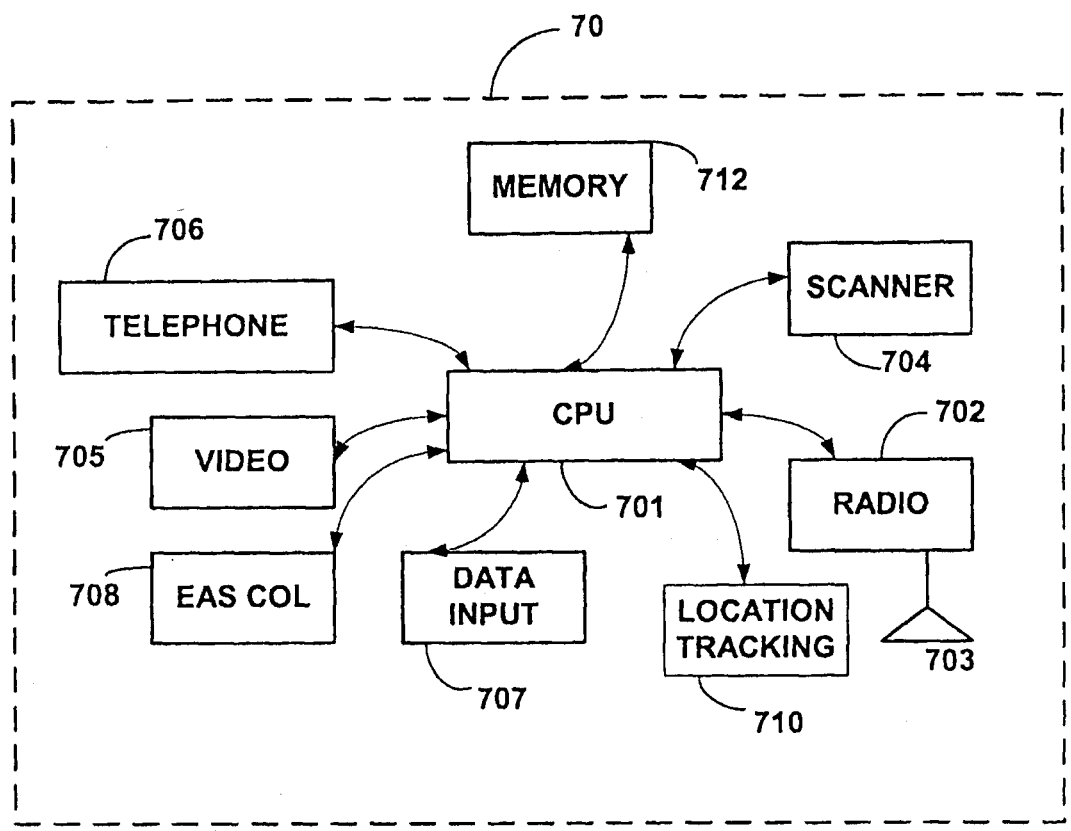

FIG. 3 illustrates the basic subcomponent systems of the portable terminal shown in FIG. 2. As shown, the system 70 includes a CPU 701 which communicates with the radio 702, scanning subsystem 704, the video subsystem 705, the telephone subsystem 706, data input device 707, an EAS tag activation/deactivation circuit 708, location tracking circuitry 710 and memory 712. Data input device 707 could include a keypad, touch screen, and/or voice recognition engine. Scanning subsystem 704 could be a scanner and/or imager. Scanning subsystem may further include an optical character recognition ("OCR") engine for recognizing alphanumeric characters. Memory 712 may include volatile random access memory (RAM) or nonvolatile RAM. Memory 712 may store an electronic shopping list, prior purchasing history and/or stored coupons. Location tracking circuitry 710 enables the system to determine the location of the portable terminal.

Figure 4:
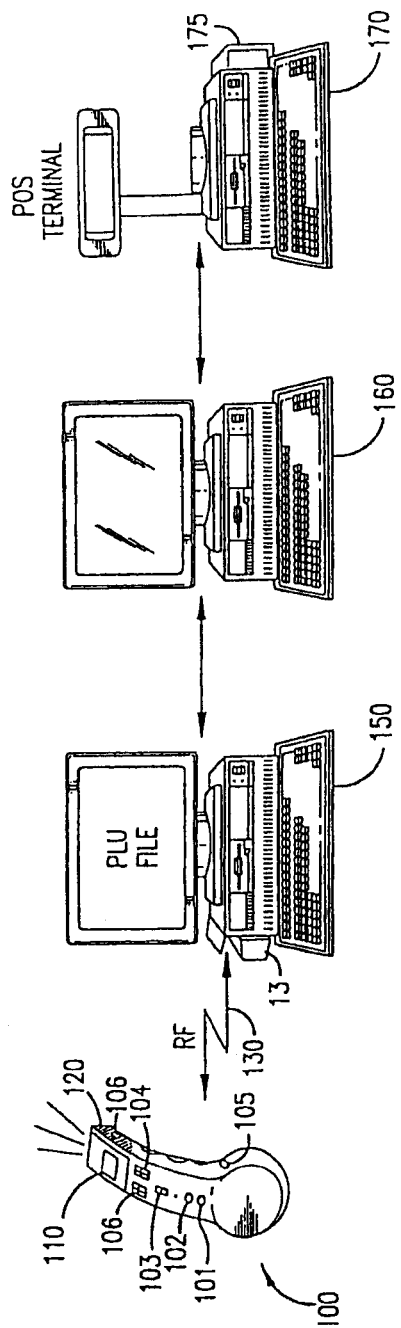
Figure 5:
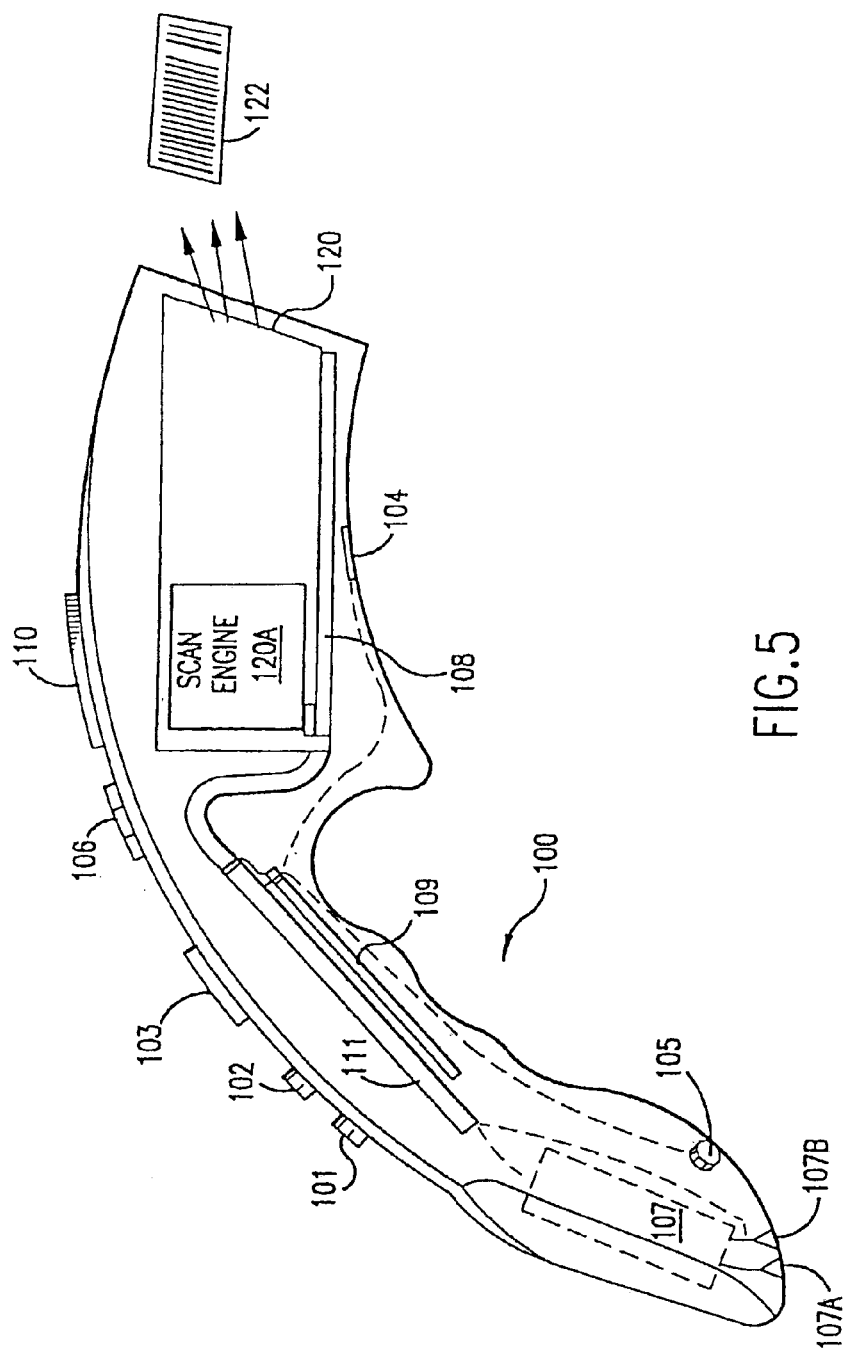
FIG. 5 is a cross-sectional view of the portable terminal illustrated in FIG. 4.

FIGS. 4 and 5 illustrate an alternative embodiment of a portable terminal of the present invention. In FIG. 4, terminal 100 is provided with a display 110. The display is a graphics display having a multi-contact navigational pad 106 for scrolling through the full video image presented to the consumer. In addition, the terminal 100 is also provided with a scanner 120 for reading bar code labels 122, three input buttons 101, 102 and 103, a speaker 104 and a microphone 105. The portable terminal 100 is equipped with a radio 108 and a rechargeable battery 107 inside the casing, shown in FIG. 5. Also shown in FIG. 5 are the main circuit board 111, the scan engine 120A, and battery recharging terminals 107A and 107B which are connected to a recharging circuit (not shown). A separate circuit board 109 is also shown for the optional telephony application. A battery overcharge protector circuit is also included but not shown.

Figure 11:
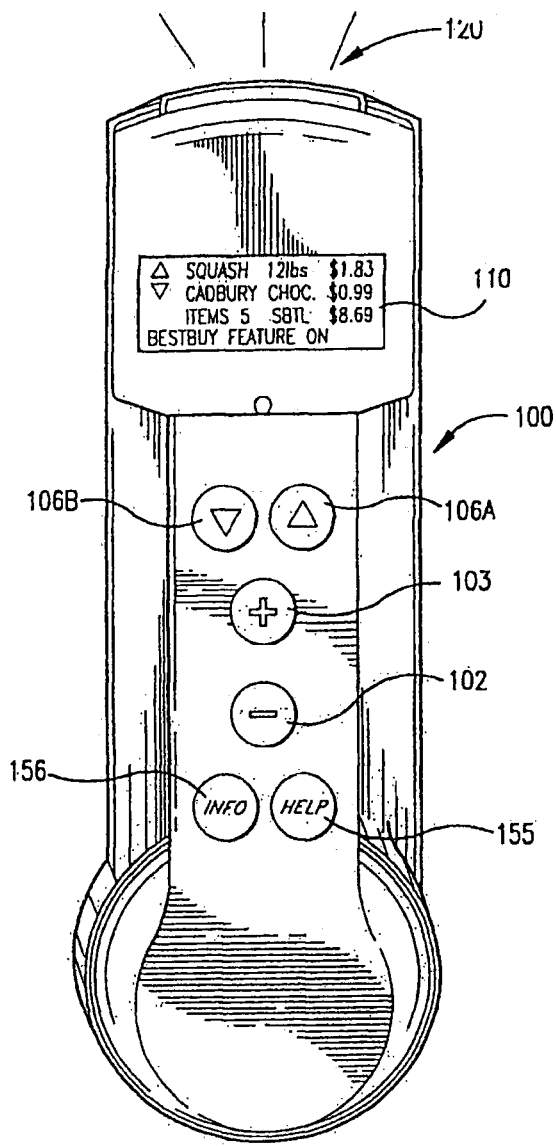
FIG. 11 is an alternative preferred embodiment of the present invention used in a self-scanning application.

An alternative embodiment of the present invention is illustrated in FIG. 11. The scanner is provided with a display 110, a plus key 103, a minus key 102 and two scrolling keys 106A and 106B. The terminal is also provided with an information key 156 and a help key 155. The information key can be employed to provide a customer with information on a selected item and the help key can be used to provide user assistance in the form of data displayed on the display or for calling an attendant to the terminal's location. In addition, if the terminal is provided with voice functions, the help key could automatically open a line of audio communication with a customer assistance desk. In the preferred embodiment of the portable terminal the help key is a bright color such as red, orange or yellow, and the information key is green or blue.

In an alternative embodiment of the present invention, the scanner is detachable from the terminal. The terminal may be attached to a shopping cart with a shopping cart cradle and the scanner can be detached for use by the consumer. The scanning device could be a device with a limited or no display. For instance, the scanning device could be a keyfob, cell phone or PDA. The terminal that is attached to the shopping cart should have a display at least 6" by 6" to allow a user to easily view information. The scanning device could be used by the customer while shopping in a store or when at home. When at home the customer could use the scanning device to create a shopping list and link the scanning device with a home computer. The link between the scanning device and the home computer could be through a cradle or through a wireless communications protocol. The scanning device could also communicate with the terminal or with a kiosk. Again the link between the scanning device and the terminal or the kiosk could be through a cradle of through a wireless communications protocol. Information stored on the scanning device, e.g., a shopping list, can be transferred through the terminal or through the kiosk to a host computer.

In a preferred embodiment, a customer may enter product information on the portable terminal or kiosk. In a preferred embodiment, the system includes data completion entry. That is, as the customer enters the letters of the name of the product the customer is interested in, and the system displays an alphabetical list of items consistent with the entered letters. As the customer enters letters, the alphabetical list decreases. For example, if a customer enters the letters "sa", the portable terminal will list the available items that start with those letters such as "sacks", "salad", "salad dressing", "salami", "salsa", "salt", "salmon", "sandwich", "sardine", "sauce" and "sausage". If the customer then enters the letter "u", the portable terminal will then list only "sauce" and "sausage". The customer could spell out the entire word or simply scroll through the list and select one of the remaining words.

As an alternative searching mechanism, the customer could search products by a hierarchical subject matter categorization. Under this approach, the products could be organized in logical groups and subgroups. For example, if a customer is interested in "sausage", he could enter or select a group named "meat" and then be provided with the subgroups of meat that are available such as "beef", "chicken", "pork" and "turkey". After the customer selects "pork" the portable display will then list the specific pork products that are available. The customer may then scroll through this list and select "sausage". The products may be included in multiple group categories. For instance, the customer may be able to find "sausage" by searching groups named "breakfast" or "barbeque". In an alternative embodiment, the system may have voice recognition circuitry where the customer may enter the product information by speaking into a microphone. For example, the customer could simply say the word "sausage" and the system would recognize that the customer is interested in sausages.

B. The Central Host/Wide Area Network

Figure 1Q:
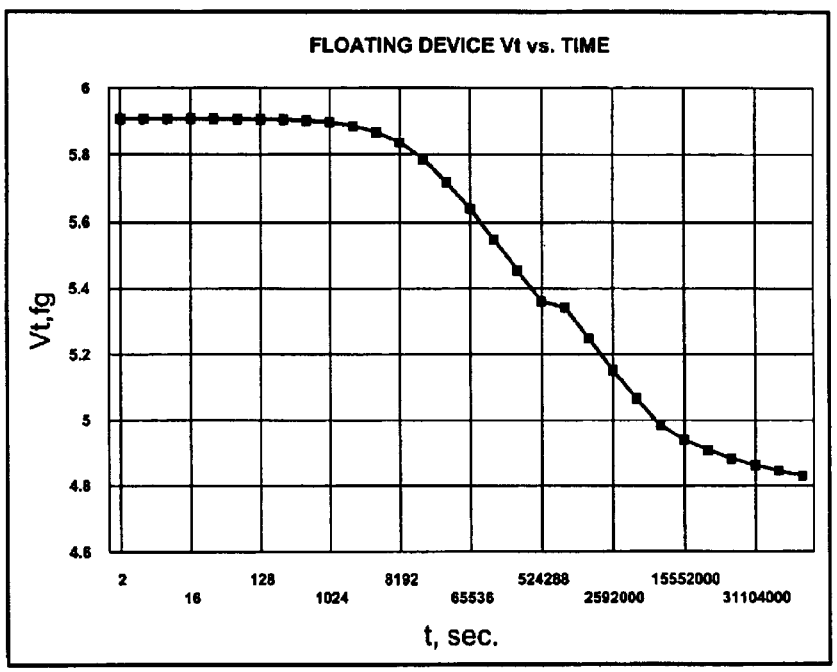
Figure 1:
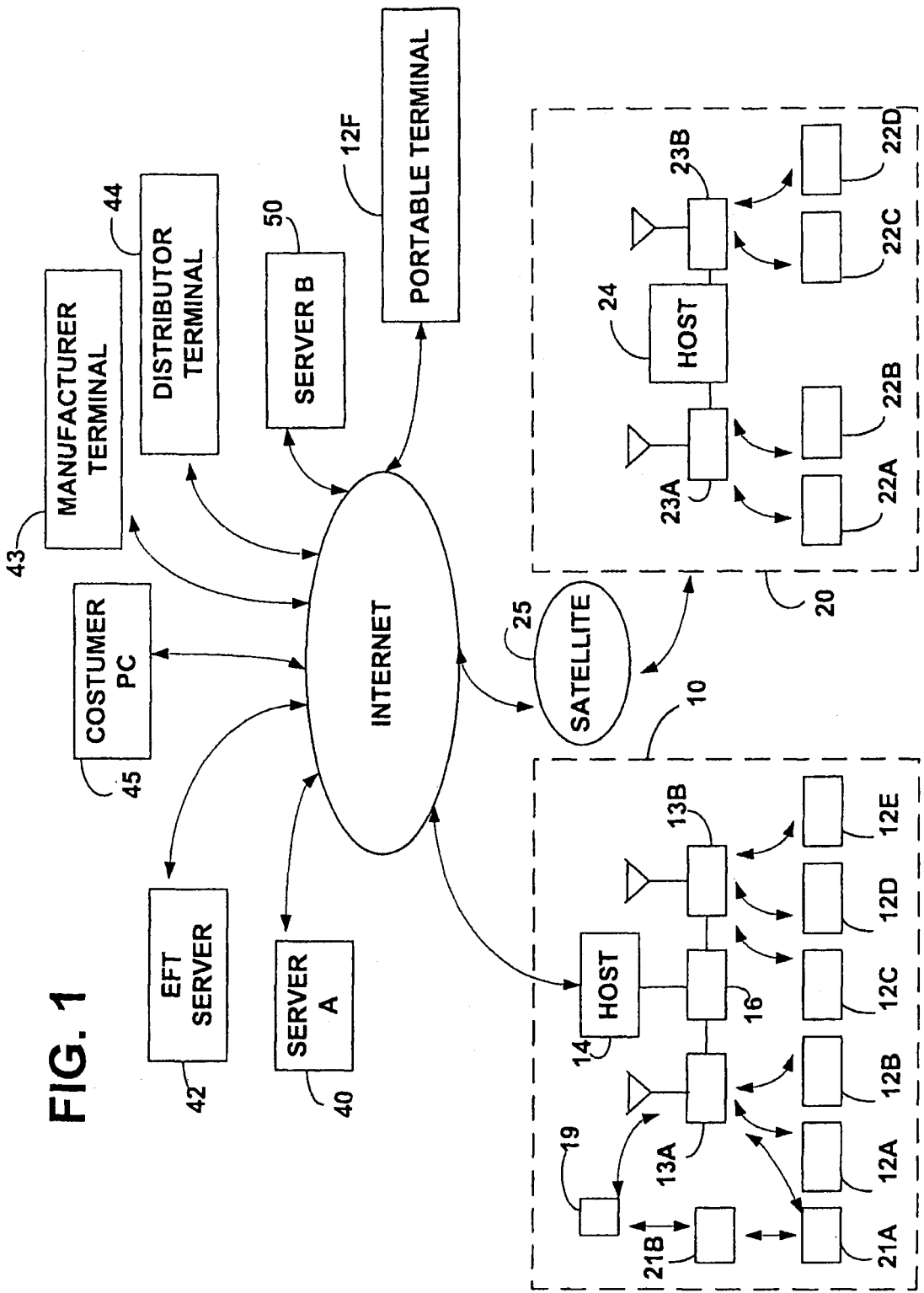

In the preferred embodiment illustrated in FIG. 1, portable terminals 12A, 12B, 12C, 12D and 12E in location 10 communicate to a central host 14 through multi-access points 13A and 13B. As described above, the portable terminals communicate in the local area network 10 with a SPECTRUM24® network. The network provides a transparent wireless connection to an Ethernet LAN 16 through multiple access points 13A and 13B. Preferably, each of the access points is compatible with the Simple Network Management Protocol (SNMP). SPECTRUM24® offers a high-capacity network by using multiple access points which may be connected to an existing wired LAN backbone. The system is designed to work in the 2 to 2.5 GHz frequency band.

In a preferred embodiment, data collected by the central host 14 through the Ethernet LAN backbone 16 (FIG. 1) is processed locally. To the extent the received data requires a response, the central host retrieves data, processes information and retransmits data to the portable terminals. In the event the terminal's request should require the retrieval of data not stored on the central host 14, the central host 14 may retrieve data from external sources such as IP addressable servers 40 and 50 through a wide area communication network 30. In an alternative embodiment, central host 14 is located remotely from location 10. Information can be transmitted from the portable terminals through Ethernet LAN backbone 16 to wide area network 30. Central host 14 could access this information through its link to wide area communication network 30. The terminal could also be used to transmit data to other LAN devices such as a manager's pager.

Also shown in FIG. 1, is a portable terminal 12F that is located remote from location 10. Portable terminal 12F can communicate with host 14 and other components linked to wide area network 30. Host 14 may also use the wide area communication network 30 to communicate data to another host 24 at a related site 20. The two sites could also be linked to provide pass through communication between a terminal 12A located in site 10 and a terminal 22A located at site 20. Also linked to wide area network 30 may be a manufacturer terminal 43 and/or a distributor terminal 44. Manufacturer terminal 43 is associated with a manufacturer of products that are offered for sale to a customer. Distributor terminal 44 is associated with a distributor of products that are offered for sale to a customer. Manufacturer terminal 43 and distributor terminal 44 can transmit data to portable terminals 12A–12E through Ethernet LAN backbone 16. Alternatively, manufacturer terminal 43 and distributor terminal 44 can transmit data directly to the portable terminals and other components that have a link to wide area network 30. Also linked to wide area network 30 may be at least one home computer 45 associated with a customer. Home computer 45 may include a cradle for linking one of the portable terminals with the home computer. Also within location 10 is a kiosk 19. The functionality of kiosk 19 will be disclosed more fully below.

FIG. 1 also shows a scanning companion 21B that is detached from a terminal 21A. Terminal 21A may be secured to a shopping cart. Scanning companion 21B and terminal 21A are able to communicate via a wireless link. In some embodiments, a customer may use scanning companion 21B without using terminal 21A. Scanning companion 21B can communicate with kiosk 19. Kiosk 19 may be located on an end cap of the store. Kiosk 19 may also be located within the aisle. For instance, kiosk 19 may be in the middle of the aisle between the stocking shelves. Preferably the store would have multiple kiosks through out the store. Kiosk 19 has many features that are common to terminal 21A. Kiosk 19 may also service customers who do not have a scanner. Kiosk 19 may have a scanner to allow customers to check prices on products. Information from scanning companion 21B can be downloaded and displayed on terminal 21A or on kiosk 19. Terminal 21A and kiosk 19 could display the relevant information stored on scanning companion 21B. For instance, terminal 21A and kiosk 19 could display an aisle sorted list from the customer's shopping list. Terminal 21A and kiosk 19 may only display information that is available within site 10. Scanning companion 21B can be used by the customer while outside the site 10. Scanning companion 21B can be used to collect information and generate a shopping list. In a preferred embodiment, scanning companion 21 can communicate with customer PC 45.

In a preferred embodiment of the present invention host 14 and host 24 communicate data over the wide area network 30 with open standard protocols and data types such as that used by an Internet server. Such a system would permit host 14 to retrieve and utilize data from servers without complex data conversion and translation routines. In a preferred embodiment, the open architecture standard is also designed into the portable terminals so that data files can be transparently retrieved by the portable terminals 12A 12F through to the host 14. With respect to sensitive and confidential data, it is preferred that the systems employ encryption technology or use a secure closed communication link. The portable terminals can access the world wide web and have email capabilities. An email message may be transmitted to a remote terminal (e.g., home computer 45). This feature can be used to transmit a bookmark concerning an item of interest to home computer 45. Additionally, a recipe or a link to a third party website (e.g., a manufacturer's website) could be emailed to home computer 45. Any computer linked to wide area network 30 can send a message to home computer 45 or the portable terminal to provide information about a product of interest to the customer. In the event a store is out of stock of an item or the customer prefers to have the item delivered, the customer can purchase the item from the store's web site before he leaves the store. The customer could also determine inventory in other stores within the store's chain.

The source of the information that may be sent to one of the portable terminals varies depending on the set up of the system. In a broad access application, a portable terminal may be able to receive information from any source at any time. This allows a customer to receive information from stores that compete with the store that the customer is physically located. This embodiment would also be useful for a system where the customer uses the portable terminal at home or on the road. For example, the portable terminal may be able to receive information from any source that has access to a wide area network such as the internet. As shown in FIG. 1, the portable terminal 12F is linked to internet 30. Thus portable terminal 12F can communicate with other terminals linked to the internet, such as server 40 and 50.

Figure 1A:
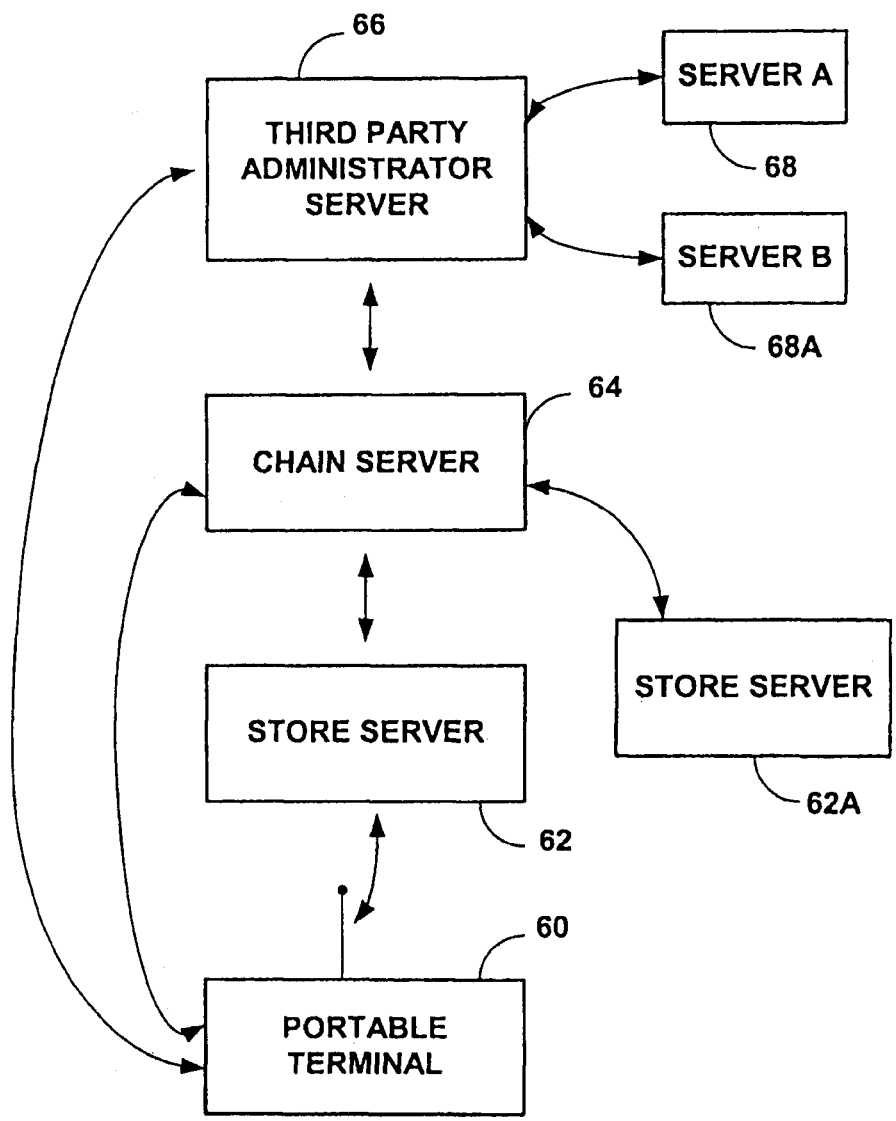

FIG. 1A is a general block diagram showing information flow in an embodiment of the present invention. The following elements are shown in FIG. 1A: portable terminal 60, store server 62 and 62A, chain server 64, third party administrator server 66, server A 68 and server B 68A. A store may set up the system so that a customer using portable terminal 60 within the store can only receive information sent from a computer associated with the store, store server 62. Similarly, the system may allow a customer to receive information only from other stores within the store's chain. A computer which manages a chain of stores, chain server 64, may be able to communicate directly to portable terminal 60 or may be able to communicate with portable terminal 60 through store server 62. For large retail chain, the source of the information provided to the customers becomes an issue of local versus corporate control. Under certain circumstances there may be information that a store would like to provide to its customers that is uniquely local in nature. For instances, in retail chains prices among the various stores within the chain are often different to reflect differences in the cost of doing business in different locations. A store may be able to provide this information to customers nearly instantaneously since the information would likely be stored on a local database. In other circumstances, the information may come from a store's corporate headquarters that is often a location remote from the store. Headquarters often desires to provide messages to customers that effect all or most of affiliated stores. Thus, chain server 64 may be able to communicate with multiple stores in a chain, e.g., store server 62, store server 62A, etc.

In a preferred embodiment, the customer may receive information from a server associated with third party administrator 66 that acts as a portal to information from various information sources, server A 68 and server B 68A. Portable terminal 60 may transmit to third party administrator 66 a customer identification number that identifies the customer. Third party administrator 66 could access a database that contains information about the customer. Third party administrator 66 filters information from the information sources, e.g., server A 68 and server B 68A, to transmit a limited amount of the information to the portable terminal 60. Third party administrator 66 may transmit information directly to portable terminal 60 or the information may be routed through a series of computers. The information sources may provide compensation to the third party administrator in exchange for having information transmitted to the customer. The information transmitted to the customer may consist of a listing of various merchants within a certain geographical area of the customer that offer products the customer is interested in purchasing.

In another embodiment the present invention can operate in a batch mode as opposed to being connected to a wireless network. In such an embodiment, the customer may enter a store and synchronize his portable terminal by placing it in a cradle at the store or at his home computer before going to the store. The portable terminal includes a communications port that links to a communications port on the cradle enabling the bi-directional communication of data. To enable personalized communication between the host computer and the portable device, the host computer must identify the customer. After the portable device is engaged with the cradle, the customer may enter a personal identification code (either on the portable device or an input device associated with the cradle) or a personal identification code stored in the memory of the portable device may be transmitted to the host computer.

While in batch mode the host computer can download all pricing information as well as messages that are tailored for the particular customer. The portable terminal may include a messaging agent as described below to determine which of the downloaded messages to present to the customer. During the customer's shopping visit, the downloaded messages could be displayed on the portable terminal. The message selected could be based on the customer's profile and/or on the profile of the products selected by the customer. The message may consist of an advertisement, coupon, specials, news clips, songs, etc. A message may be triggered in response to the customer scanning items in the store, the customer's location within the store, the time of day or in accordance with other messaging logic described herein. Thus, in batch mode the messages provided to the customer could emulate the wireless embodiment. In the batch mode, there will likely be less available information to provide to the customer. Upon a triggering event, this information may be accessed for presentation to the customer. This embodiment of the invention provides a less expensive marketing system than the wireless embodiment. The store does not need to invest in a wireless communications infrastructure. Since the store could implement the system for relatively little capital expenditures, the store may be able to pay for the infrastructure without any contribution from manufacturers or coupon vendors.

Accessible to the host computer are one or more databases that store information about customers and products that are relevant to determine the customers' shopping behavior. The information within the database may be compiled by a particular store, a chain of stores or a group of stores. Similarly, access to the database may be limited to the particular store, the chain of stores or the group of stores that compiled the information. The information may also be provided to other entities that would find this information valuable.

The database includes information about each profiled product in the database. Certain records in this database relate to characteristics that are inherent to the products. These records include "general types" of products, "characteristics" of the products, nutritional value of the products, potential uses of the products, advertisements associated with the products, expiration information and replenishment frequency history. The general types of products record may characterize the products within the following categories soup, vegetables, seafood, baby products, pet food etc. The characteristics of the products record may characterize the products within the following categories healthy, profit margin level, family size, etc. The nutritional value record relates to fat content, protein content, carbohydrate content, calories, cholesterol, vitamin content, etc. The potential uses of the products record includes which recipes are the products used in, what holidays/activities are associated with the products, etc. The replenishment frequency history record relates to how often the product is typically replenished. For instance, milk is typically replenished more often than furniture polish. (Although a particular customer may replenish furniture polish every week and milk every three weeks.) The replenishment frequency may be expressed as a quantity representing how often a product is typically replenished. For example, a designation of 1 may indicate that a product is typically replenished in an interval less than a week; a designation of 2 may indicate that a product is typically replenished in a weekly interval; a designation of 3 may indicate that a product is typically replenished every two weeks; a designation of 4 may indicate that a product is typically replenished every three weeks; a designation of 5 may indicate that a product is typically replenished every month; a designation of 6 may indicate that a product is typically replenished every two months.

FIG. 16 represents a table of records stored in a product profile database of one embodiment of the present invention.

Column 902 of the table represents the identity of the available products in the store. In a preferred embodiment, the database would include a substantial number of the products offered by a merchant. The identification of the products may be by a unique identification number such as a universal product code (UPC). Associated with each UPC is a unique product. Column 904 of the table represents a general product type for each product. For instance, products may be classified in accordance with certain types such as, snack, meat, beverage, tools, etc. Column 906 of the table represents a further classification of the product. For instance, certain characteristics of the products may be provided, such as their size of the product, profit margin, nutritional classification, etc. Column 908 of the table represents nutritional information about the products (in the case where the product is edible). The nutritional information may include the amount of calories, cholesterol, fat, protein, carbohydrates, sodium, vitamins, fiber, etc. Column 910 of the table represents potential uses of the products. Uses may include recipes that use the product or events in which the product is normally associated. Column 912 of the table represents information used to track advertisements associated with the products. For instance, if a merchant includes an advertisement in a circular for a certain product, the information about the advertisement may be linked to the product in the database. Column 914 of the table represents expiration information about the products. For instance, the table may indicate that a container of orange juice will expire on a specific date in the future. Column 916 of the table represents a replenishment frequency of the products. For instance, soda may typically be purchased every week so it may be given a designation of 2. A typical customer, on the other hand, may purchase garbage bags every two months. Thus, garbage bags may be given a designation of 6.

The product profile database (or a separate related product database) may also include external characteristics of the products. These records include the price of the products, profits from the products, expenses associated with the products, available promotions, the location of the products within the store, the number of products in inventory, the date of next shipment, etc. The expenses associated with the product include spoilage (some products can stay on a shelf indefinitely while others have an expiration date), theft (certain items are stolen more often than others) and floor space (the space occupied by products is an inherent expense of the products). The available promotions record relates to whether any discounts were applied/available for the product. The promotions could include electronic coupons, paper coupons, rebates, contests, etc. The location of the products in the store includes the aisle number, location within aisle and shelf level.

FIG. 17 represents a table of records stored in a product profile database that provides information about external characteristics of products in one embodiment of the present invention. Column 918 of the table represents the retail price of the product. Column 920 represents the profit a store realizes from the product. The profit may be net profit, gross profit, or, preferably both may be indicated. Column 922 represents an expense factor associated with the products. The expense factor may be characterized by a number within a certain range. A low expense factor may indicate a product with little external expenses associated with it. A high expense factor may indicate a product with a lot of external expenses associated with it. For instance, products that spoil easily wherein the merchant must constantly dispose a portion of the inventory may have a higher expense factors than products that last indefinitely. Other factors that may affect the expense factor associated with the products include, the theft associated with the product, the amount of floor space required by a product, the amount of customer service required by the product, etc. Column 924 of the table represents the available promotions of the products. The promotions may be from a newspaper, circular, in store advertisement, etc. Column 926 of the table represents a specific location of the product with the store. The location may be characterized by aisle, section and/or shelf. Alternatively, the location may be characterized in accordance with x,y,z coordinates. Column 928 of the table represents the inventory of the products that is available. As customers select the products for purchase, the available inventory of the corresponding products decreases. Column 930 of the table represents the next shipment of the products. This information may be adjusted in real time or near real time. For instance, if a deliveryman of a certain product is behind schedule the time of the next shipment may be automatically adjusted after the deliveryman relays this information to the system.

The product profile database (or a separate related product database) may also include cross-reference information of other associated products. For example, these records include records for "nutritional alternative" products, "competitive alternative products", "substitute" products, "complementary" products and "other products within a certain area". The nutritional alternative products include alternative products having less calories, vegetarian alternatives, etc. The competitive alternative products include a list of competitive brands that could be substituted for each product (including store brand alternatives). The substitute products include a list of different types that could replace each product. For example, olive oil could be a substitute for corn oil. Complementary products include a list of products that are often purchased together, e.g., hot dogs and buns, hamburgers and rolls, ice cream and ice cream cones, salad and salad dressing, pasta and sauce, peanut butter and jelly, etc. The other products within a certain area record provides a list of other products that are with a certain distance of a product.

The information in this database provides a merchant with a unique opportunity to provide cross-promotional messages to customers. Cross-promotional messages are messages offered by a first merchant that relate to products offered by a second merchant (typically the second merchant does not directly compete with the first merchant). The first merchant may receive compensation for providing the message, compensation if the customer purchases the offered product/service or the second merchant may offer similar cross-promotional messages promoting the first merchants products. For instance, a supermarket link lighter fluid (which the store sells) with a barbeque grill (which is sold by a partner store). In response, to a customer selecting lighter fluid the customer may be presented with a promotion for the barbeque being sold by the partner store.

FIG. 18 represents a table of records stored in a product profile database that provides cross-reference information of products in one embodiment of the present invention. The cross-referenced products may be represented by the products' unique identification code and/or by product name. Column 932 of the table represents nutritional alternatives of the products. For instance, the nutritional alternatives to cola may be diet cola or juice. The nutritional alternatives for each product may be the same brand as the product or a different brand. Column 934 of the table represents competitive alternatives of the products. Column 936 of the table represents substitutes of the products. The substitutes are not necessarily competitive alternatives to the product. For instance, a substitute for pretzels may be popcorn. Column 938 of the table represents complementary products. The complementary products listed within the database may be derived by analyzing customers' shopping behavior. For instance, shampoo and jelly are not ordinarily considered to be complementary products. However, the system may determine that customers who purchase a particular brand of shampoo frequently purchase a certain brand of jelly. Thus, the system may list that brand of jelly as a complementary product to the shampoo. Column 940 of the table represents the products that are within vicinity of each product. For instance, within the vicinity of the Piggy Brand sausage may be Acne brand Turkey sausage, the store brand sausage, ground beef and poultry.

The system of the present invention may also maintain a customer profile database. This database maintains records for each of the profiled customers who have a shopping history. Certain records in this database relate to features of the customer's shopping history. These records include dates the customer has shopped, the time of day the customer has shopped, the duration of the shopping visits and total products purchased per shopping visit (in quantity and value) and the particular products purchased. The database may also store records that relate to personal information about the customers. These records may include the customers' frequent shopper point level, unique preferences, language, age, gender, marital status, number of children, age of children, birthdays, income level, hobbies, educational level, movie preferences, magazine/book preferences, etc.

FIG. 19 represents a table of records stored in a customer profile database for a particular customer in accordance with one embodiment of the present invention. The information shown in FIG. 19 is for a customer who is associated with the identification code 10-0001. This particular customer has visited the store on four dates: June 16, June 23, June 30 and July 7. The table also includes information that represents the time the customer started shopping, the time the customer finished shopping, the total number of items purchased and the total cost of the items purchased. In a preferred embodiment this table may also include an identification of the specific products purchased by the customer in each shopping trip.

The customer profile database (or a separate related customer database) may also maintain other information about the customer's shopping behavior. The records in the database are dynamically determined by analyzing the customer's shopping behavior. The more a customer uses the system, the more reference points the system has to provide more accurate information. The customer's shopping behavior may be determined in "real time." The shopping behavior does not need to be based on prior shopping visits, but may be determined as the customer scans items. As the customer scans products, the system may update the information in the databases. The records in the database may include products that are "linked" to other products. For instance, a customer may have a record of purchasing a certain brand rye bread each time he purchases peanut butter. Thus, for this particular customer the system will develop a link between these two products. As a customer continues to shop within a store, the system is able to establish links between products. The database may also include records relating to a product price sensitivity factor. The product price sensitivity factor relates to whether the customer has purchased the product at full price or at a discount. A low product price sensitivity factor indicates that the customer is not sensitive to the price of the product. For instance, a customer may always buy a certain brand of aspirin regardless of whether the customer receives a discount. A high product price sensitivity factor indicates that the customer is very sensitive to the price of the product. For instance, a particular customer may only buy a certain brand of cola when it is on sale. The database may also include records relating to each customer's replenishment frequency for products. The replenishment frequency record relates to how often the customer typically repurchases the product. For example, a designation of 1 may indicate that a particular customer replenished in an interval less than a week; a designation of 2 may indicate that a product is typically replenished in a weekly interval; a designation of 3 may indicate that a product is typically replenished every two weeks; a designation of 4 may indicate that a product is typically replenished every three weeks; a designation of 5 may indicate that a product is typically replenished every month; a designation of 6 may indicate that a product is typically replenished every two months; a designation of 7 may indicate that a product is typically replenished in a period greater than two months.

FIG. 20 represents a table of records relating to shopping behavior for a particular customer stored in a customer profile database in accordance with one embodiment of the present invention. The information within this table is constantly updated as the customer shops in the store. Column 950 of the table represents the products purchased by the customer associated with the identification number 10-0001. Column 952 of the table represents product links. For instance, for customer 10-0001, there is a correlation between the customer's purchase of product 0006 and 0090. The linked products listed in the database will constantly be updated as a customer shops within the store. Column 954 represents the price sensitivity factor. The price sensitivity factor shown in the table is within a range of 1 to 5. The table indicates that the customer is not sensitive to the price of product 0002 since it has the lowest possible price sensitivity factor. Column 956 represents the replenishment frequency. The replenishment frequency shown in the table is within a range of 1 to 7. The table indicates that the customer typically purchases product 0002 more often than any other product. Columns 958 represent the specific dates customer 10-0001 purchased the listed products. For instance, the customer purchased product 0006 on June 16 and July 7, and purchased product 0016 on June 23.

The customer profile database (or a separate related customer database) may also maintain information about the circumstances of a particular customer purchasing products on a specific date. This information may include the customer's "selection patterns" during a shopping trip. During some shopping visits a customer may shop in an orderly process down each row of the store. As the customer travels down each row, he selects certain items. By analyzing the customer's selection patterns, the system may be able to deduce a type of shopping visit the customer is making, i.e., whether the customer is going on a full shopping trip or picking up a couple of items. This deduction may be based on the particular customer's prior selection patterns. For instance, a particular customer may usually go down each aisle in an orderly fashion during a large shopping visit. When this customer is going on a short shopping visit, he may jump two or more aisles at a time. By analyzing the items selected by this customer, the system can deduce the type of shopping visit the customer is likely going on. The deduction of the type of shopping visit a customer is going on can also be based on the selection patterns of a group of customers. For instance, the system may determine that customers who select milk and bread as items in the initial stages of a shopping visit are likely going on a short shopping visit. The system may also use other factors to deduct the type of shopping visit. For instance, the system may analyze the time of day the customer is shopping or the day of week. For example, a customer may go on large shopping visits on Saturday mornings and short shopping visits on Wednesday evenings. The information in this database may also include information about the application of discounts to a customer's product selections. For instance, a customer may purchase certain products only when they are on sale or when the customer has been offered a discount. The customer may purchase other products regardless of whether a customer receives a discount on the products. The customer may purchase these products even if he is offered a discount on competing products. There may be other products that a customer does not purchase regardless of the discount on the products offered to the customer.

FIG. 21 represents a table of records relating to shopping behavior for a particular customer on a particular date that are stored in a customer profile database in accordance with one embodiment of the present invention. Column 950 of the table represents the products purchased by the customer associated with the identification number 10-0001 on Jun. 16, 2001. Column 960 of the table represents the customer's product selection order. For instance, on Jun. 16, 2001, the customer purchased a total of 65 items. Product 0002 was the fourth product he selected, product 0050 was the $39^{th}$ product he selected and product 0006 was the $45^{th}$ product he selected. Column 961 and 963 represent time and location stamps for each of the products selected by the customer. The time stamp provides the time of day the product was selected by the customer. The location stamp provides the location within the store where the item was selected. Column 962 represents information about whether a discount was available for the product. The discount may be a coupon in a circular or newspaper, a rebate, a sale item, a message presented to the customer on the portable terminal, etc. In a preferred embodiment, the system would also retain information about the type of discount available for the product. Column 964 represents information about whether a discount was applied to the purchase. Some discounts may be automatically applied to a purchase. For example, an electronic coupon presented as a message on the portable terminal may automatically reduce the purchase price of a product. Other discounts require the customer to offer evidence of the offered discount. The information in column 964 indicates whether the customer actually received a discount on the product. In a preferred embodiment, the system would also retain information about the type of discount applied, e.g., whether the discount was one in which the discount was applied automatically or whether the customer presented some type of coupon. Column 966 of the table represents information about discounts available on competing products.

C. The Shopping and Marketing System

In a preferred embodiment of the present invention, locations 10 and 20 (FIG. 1) are retail facilities employing self-scanning systems illustrated in FIG. 4. These systems are also sometimes referred to as self-checkout and self-shopping systems which terms will be used interchangeably herein. In FIG. 4, the portable terminal 100 communicates over a wireless communication network 130. In the illustrated embodiment, the multi-access point 13 (FIG. 1) is incorporated into a controller 150 that functions as the central host to the portable terminal 100. The controller 150 is coupled to an in-store point of sale (POS) controller 160 which may be an IBM 4680/90 or similar computer which includes price information and maintains statistical data as to purchases, discounts, inventory, and promotional information. Although these controllers are shown as physically separated items, they could also be logical distinct software items in a single hardware device.

The in-store controller 160 is coupled to the retail facilities point-of-sale terminals 170. The point-of-sale terminal 170 is used to receive payment from customers after they have selected items for purchase and to process customers not using portable terminals to collect items for purchase. Payment may be made by electronic means via a card swipe/reader 175 or through a standard cash/check transaction.

1. System Operation

FIG. 9 illustrates various components of a self-checkout system employing a preferred alternative embodiment of the present invention wherein a customer checks-out a portable terminal. The system components are used by a consumer during a self-checkout transaction.

As illustrated in FIG. 9, a customer is provided with a customer card 210 having encoded customer data stored thereon. Corresponding customer information is also placed in a customer data file on a central storage system. Once customer card 210 has been issued and a corresponding customer data file is established on the central storage system, the customer may then use the system to perform self-checkout of merchandise distributed in a facility employing the self-checkout system.

To use the system, a customer proceeds to an entrance unit 220 and inserts his customer card 210. Customer card 210 refers to any card used to identify a unique customer. It may be a loyalty card issued by the store, a credit card, driver's license or other identification card. A card reader on the entrance unit 220 reads the information stored on the card and checks with the central storage system to confirm that a corresponding customer data file exists and that the customer is authorized to use the system. Alternatively, instead of using customer card 210, entrance unit 220 could be equipped with a biometrics reader. The biometrics reader could be used to provide active and/or passive security enhancements. In an active system, the customer has to actively participate in the security check, e.g., voice recognition. In a passive system, the authentication may take place without the customer actively doing anything, e.g., facial recognition. The biometrics reader scans a customer's fingerprint or iris or recognizes the customer's voice or facial characteristics and checks the central storage system to confirm that the corresponding customer data file exists and that the customer is authorized to use the system. The biometric reader may be used identify a particular customer or to verify that a customer is who he represents himself to be. The biometrics reader could also be used to identify individuals who misuse credit cards or checks. The system is also ideal for credit card check confirmation. For instance, after receiving a request to purchase items on credit a terminal with an imager could scan and identify the customer with reference to an external identification server.

Once system approval is obtained, a display unit 224 on the entrance unit 220 instructs the user to proceed to a designated area of a dispenser unit 230 to retrieve a designated data collection unit such as portable terminal with an integrated bar code reader 240. Although not shown, the self-checkout system could also be provided with an entry gate which is activated to permit entry of the customer upon the assignment of the portable terminal 240 and activation of blinking lights 233 located on the side of and above the dispenser which directs the customer to the location of the portable terminal 240 in the dispenser units. These entry and directional systems are especially necessary in large stores having a high number of dispenser units.

The portable terminal 240 is provided with a flashing light 242 to assist the customer in retrieving it after it has been assigned to the customer. The flashing light 242 is activated by the central processor (shown in FIG. 2) after it has been assigned to the customer and the assignment is recorded in the customer's data file. In an alternative embodiment, the portable terminal is further provided with an audible signal generator to assist the user in finding it in the terminal dispenser and a visual display for displaying either the customer's name or some other form of customer identifiable code. Although not illustrated, the dispenser system for the portable terminals could also take the form of a vending machine type dispenser or rotatable dispenser racks which rotate to provide a customer access to a selected terminal.

The hand-held portable terminal 240 is stored in one of a plurality of slots 234 in the dispenser unit 230. Each of the slots is physically and electronically marked and may be provided with locking means for locking the portable terminal 240 in place until the portable terminal is assigned for use to a customer. The physical marking is used to direct the customer to the proper location on the dispenser, i.e., location "A9," and the electronic marking is provided as a means for identifying the location of the portable terminal by the central processor. The electronic means may comprise a bar code located on the terminal dispenser 230 such that when the portable terminal 240 is locked in place, the bar code can be read by the portable terminal 240 and communicated to the central processor. Once the portable terminal 240 is assigned to a customer, the locking means is disengaged. In the event the portable terminal is not removed from the slot 234 after a predetermined time period, it is again locked and the customer data file for the customer to whom it was assigned is updated to reflect that the customer did not take possession of the reader within the allotted time period.

Prior to issuance to a customer, the portable terminal 240 could also be required to scan the bar code located on the terminal dispenser as a self-diagnostic tool. In a preferred embodiment, the bar code is sufficiently degraded to test the outer boundaries of the portable terminal's capabilities. Thus, if the portable terminal is unable to read the bar code and communicate the bar code symbol to the central processor, it will not be assigned. The central processor will notify the supervising attendant that the terminal is not functioning properly.

Instead of checking out a portable terminal, a customer could have his own portable terminal that is not returned after the customer finishes selecting products. The customer's portable terminal could be a cell phone, personal digital assistant, key fob or any other dedicated terminal. For instance, in an embodiment where the portable terminal is a cell phone, the cell phone could dial a phone number associated with the store or access a host utilizing always on protocol method, i.e., TCP/IP. A WLAN link could be formed between the store's terminal and the cell phone. A merchant may choose to keep the communication to the customer's portable terminal private so that other merchants cannot send unsolicited messages to the customer. The merchant may do this by filtering out other merchants' communications.

The portable terminal could have a unique identification code that is associated with the portable terminal. The portable terminal transmits the identification code to a central processing unit. The identification code could be sent wirelessly or via a docking station. The wireless transmission could be via the bar code scanner feature of the portable terminal. The bar code scanner could be designed to modulate at a certain unique rate. After the customer "scans" a optical reader, the central processor could process the unique modulation rate to identify the particular customer. The central processing unit could be associated with host 14 (shown in FIG. 1) or another computer linked to wide area network 30. The communication link between the portable terminal and the central processing unit may be automatically triggered by the portable terminal coming within a certain range of the system. Alternatively, the customer may establish the link by actively inputting information into the portable terminal. The system could be designed to recognize valued customers or those with special needs. For instance, if a valued customer enters the store, the system could notify store personnel to provide additional assistance to the customer.

The customer proceeds through the retail facility and uses the portable terminal 240 to record purchases. Preferably each item is either coded with a code which is recognizable to the portable terminal, or in the case of produce which is sold by weight, is provided with a machine for generating an adhesive bar coded ticket after the produce is weighed. Upon scanning of the code on a selected merchandise item 260, a display 244 on the portable terminal 240 displays product information such as price, product name, quantity and nutritional information.

In a preferred embodiment of the present invention, the portable terminal 240 acts as a dumb terminal with radio frequency communication means. In such case, all information is stored in a central location and the portable terminal 240 simply sends and receives data from the central location.

In a preferred embodiment of the present invention, the reader permits a customer to add a product to their record through the selection of an "add" key 246, return a scanned product previously selected by selecting a "minus" key 247 or simply to perform a price check or other information check by pressing an "equals" key 248. In a preferred embodiment, the "equals" key may also be used to provide the customer with a running total of the products selected. In another preferred embodiment the portable terminal includes an "i" key for a customer to indicate that he would like additional information about an item. If a customer scans a product and engages this key, the customer can obtain additional information on the product. The additional information may include recipes, nutritional information, instructions on use, comparisons to other products, etc. The source of the additional information may be host 14 or a storage facility linked to wide area network 30. The additional information may be displayed on the display of the portable terminal, stored in the portable terminal's memory for latter use by the customer and/or emailed to an address associated with the customer. The customer may transmit the additional information stored in memory to a home computer for examination at home. Alternatively, the store may have a kiosk wherein the customer can view or printout the additional information. In one embodiment, the additional information can be provided to the customer in accordance with a "bookmarking" protocol. Under this procedure, the code on the product includes an address (such as a unique internet address) to a site that contains additional information about the product. After engaging the "i" key, the customer can access the site associated with the address from the portable terminal or from another computer.

In a preferred embodiment, the system is able to track in real-time the location and direction of travel of the portable terminal, and hence the customer. The location of the portable terminal can be determined using global positioning satellites (GPS), radio frequency identification (RFID), access point (AP) triangulation or similar technology. As a supplement to these location tracking schemes or as an alternative approach, a customer's location may be determined by interpreting the data of real-time scanning being performed by the customer. After a customer in a store scans a particular product using the portable terminal, the system accesses a product database that provides information about the location of the scanned product in relation to the store. The location and/or direction tracking feature can also be used to track portable terminals that are outside of the store. The system may be able to determine that an individual within the range of a store's wireless LAN will likely enter the store in the near future. The may track the location of a customer of the store or a delivery person coming to stock the store's shelves.

The system's ability to track the location of the customers allows the system to provide messages that correlate to the customers' location. For instance, the system may be able to determine that a customer is at a location having coordinates x, y, z. The system may access the product profile database and determine which products are in that area. The system may then send promotional messages to the customer for the products that are in that area or for products that are related to products in that area. The location tracking feature supplements intelligent messaging agent features described herein. The feature helps sending the customers all over the store to receive discounts. For instance, at some point in a customer's shopping trip the system may determine that a customer should be provided a message related to potato chips. The system would preferably wait to send the message to the customer when the customer is near the potato chips. The location tracking information can also be used to find a customer if the store needs to communicate in person with the customer or if the store wants to bring something to the customer. For example, if a customer placed an order at the deli counter, store personnel could bring the completed order directly to the customer. The location tracking information can also be used to monitor a customer for security reasons or to determine the likelihood a customer is stealing items.

In another embodiment of the present invention, the location tracking information can be used to improve shopping efficiency. The system may be able to analyze customer's shopping habits to determine proper placement of products. The system may also be able to identify bottleneck areas within a store. A merchant may be able to address the bottleneck areas by rearranging the placement of products. The system may also use the location tracking information to manage traffic in real-time. For instance, if the number of customer in a given area exceeds an acceptable level, the system may send messages to certain portable terminals to encourage some of the customers to move to another area.

The system could be used in a similar manner to manage store employees. If all of the store employees carry terminal that have the location tracking feature, a store could manage the employees in more efficient manner. If the employees are spread out throughout the store, customers can more easily locate the employees in the event the customers need assistance. A store may also be able to determine if employees are actually doing their jobs. The system may detect patterns of certain employees who tend to congregate within a certain area. By analyzing these patterns (and perhaps also the employees assigned tasks and/or job responsibilities), a determination may be made as to whether the congregation is work related or a social gathering.

Once the customer has completed his product selection, the customer returns the portable terminal 240 to the dispenser unit 230 where it is placed in an open slot 234. Upon return of the portable terminal 240, information collected with the portable terminal 240 is processed by a central processing unit and a ticket for the items is issued to the customer from a printer 232 which is located near or on the dispenser. The information from the portable terminal may be transferred to the central processing unit through a wireless link or the portable terminal may be inserted into a cradle associated with the central processing unit. The returned terminal also transmits its terminal identification code and the address of the slot into which it has been inserted for tracking by the system controller 150. In an alternative embodiment of the present invention, rather than issuing a ticket at the terminal dispenser location, a card reader and data entry device 175 are provided at the cash register 170. The customer may then enter their customer card, with or without an authorization pin number, at the cash register location. In a preferred embodiment, after a customer completes his selections, the portable terminal transmits a product selection list to the central processing unit.

The customer may be requested to insert the customer loyalty card 10, enter a pin code, scan his fingerprint and/or scan his iris to ensure that the customer is in fact the same person who initially retrieved the scanner. This is especially important in the event the system provides for electronic fund transfers for payment and information for such transfers are stored wholly or partially in a customer data file.

Customers who scan their selections as they shop do not have their product selections scanned by a store clerk. Preferably, the store employs some type of statistical security methodology to reduce product shrinkage. Examples of security methodologies that may be employed are discussed in U.S. Pat. Nos. 5,877,485 and 6,092,725, both assigned to Symbol Technologies, Inc. and both herein incorporated by reference. Since the system is able to track the location of the customers, the security methodology may include considering the amount of time a customer spends in the vicinity of various items as one of the criteria used to determine the probability that the customer actually scanned in items selected from that vicinity. For instance, if a customer spent a great deal of time near a store's battery selection and the customer did not scan any batteries, this could be a signal to check to see if the customer put any batteries in his basket without properly scanning the batteries.

Customers who register product selections using a portable terminal may also bag the products as they shop. For instance, in a supermarket environment, a customer may have a shopping cart with grocery bags that are filled with products as the customer shops. The shopping cart may be equipped with mounting brackets that hold plastic bags. The mounting brackets allow the customer to easily open a bag, fill it, remove the full bag and access the next bag held by the mounting brackets. The self-bagging arrangement saves the store money since it does not need to have the personnel to bag the products, and it saves the customer time since be does not have to wait to have his selections bagged by the store personnel.

In one embodiment, each bag may include a bar code or other indicia that the customer could register with his portable terminal. A customer scans the bar code on the bag he is going to use, and each of the items he adds to the bag. After he fills the bag with products, the customer scans the bar code on the next bag. Thus, the portable terminal could maintain a record of each bag a customer has used and all of the products that the customer scanned that were added to the bag. This information may be used as part of the system's security checking methodology. For instance, to check the accuracy of a customer's selections, a store may spot-check some of the bags the customer filled. The store could match the actual contents of one or more of the bags with the products scanned by the customer.

Once the central processing system has successfully retrieved the customer information from the portable terminal 240, the customer then proceeds to a checkout register 170 for payment of the products selected. There are various ways a customer could indicate that he has finished with his product selections. The customer may be able to input on the portable terminal that he is done, the customer may scan a special "end of trip" barcode or the customer could simply insert the portable terminal in an "end of trip" cradle. In systems that allow wireless communications between the portable terminal and the host, a clerk can automatically determine the UPC numbers for all of the items in the shopping cart and all of the discounts/coupons available to the customer. In systems that operate in batch mode, the customer hands his scanner to a clerk who places it in a download well, which downloads the information to the host computer. The host computer then returns the price and item description for each item, as well as calculating the total price, tax, discounts, etc., just as it would if the items had been scanned by a clerk using a traditional slot scanner. The receipt printer prints out the entire list of all purchased items. The receipt preferably has a code for determining all of the products (and their cost) purchased by the customer. The code could be in the form of a one dimensional barcode for looking up the relevant information in a database. Alternatively, the code could be in the form of a two dimensional barcode that contains all of the relevant information with the code itself. This receipt could optionally be emailed to an email address associated with the customer. Discounts that were offered to the customer while he was shopping will preferably be recorded by the system. Some discounts offered to a customer may be stored in a customer's portable terminal. For instance, a customer may have scanned a coupon at his home from a newspaper advertisement. Information related to this coupon is transferred from the portable terminal to the host computer. If the customer was offered discounts on the products he selected, the system may automatically apply the discount. The system should log and maintain a record of coupons for transmission to manufacturers. A printer may also be used to print out hard copies of all of the electronic coupons stored in the customer's portable terminal.

The system of the present invention can be implemented using much of the same equipment already present in a store. A store does not need to invest in expensive self-scan stations that take up a great deal of space and require personnel to assist customers. After the customers using this system select their products, they can proceed to a clerk who services customers who shop the traditional way. Even though the customer who uses a portable terminal has selected a shopping cart full of products, a store may allow him to use one of the express checkout lanes that normally exist in supermarkets. These lanes are usually designated for shoppers who are purchasing less than 10 or 15 items. The customer may use these lanes because he can move through the checkout process faster than the other shoppers. It is also possible to set aside lanes designated for use by customers who use the self-shopping system.

The customer would need to pay for his purchases in any of the ways normally available at a supermarket, such as by using cash, a check, credit card, etc. In one embodiment a debit operation may be made at the dispenser unit 230 through a card reader 175. A customer may be able to select his choice of payment options prior to shopping. For instance, the customer may provide his credit/debit information to the store. When the customer finishes shopping the customer can be charged for his selections automatically.

In one embodiment of the invention, the product database maintains a record of the weight of products available for purchase. After a customer has completed his product selections, the customer may proceed to a weighing station as part of the system's security checking methodology. The system could be devised so that each customer must go to the weighing station, a random selection of customers go to the weighing station, or customers may be selected to go to the weighing station depending upon a number of security factors (e.g., prior shopping history, types of products scanned, time of day, personal discretion, suspicious activity, etc.). At the weighing station, a customer may have all of the products he selected weighed, each bag in the customer's cart weighed or a selection of some of the products in each bag weighed. Again the determination of which of these options is selected may depend on a number of security factors.

The system determines whether there is a discrepancy between the actual weight measured at the weighing station and the calculated weight. In an embodiment where the total cart of products is weighed, this total measured weight is compared to the calculated total weight. For instance, the system may calculate that the weight of the scanned contents of a customer's cart should be fifty pounds. If the actual weight of the bag is outside an acceptable margin of error, the system may notify store personnel to verify the contents of the bag. If there is a discrepancy between the calculated weight of the products and the actual weight, the store may rescan the contents of the bag (or the all of the bags). Alternatively, a visual check can probably locate the cause of the discrepancy more quickly than a rescan. This is possible because the cash register has already printed out the entire list of items scanned by the customer. This allows the clerk to visually compare the items in the bags to the scanned items shown on the receipt. To make this process easier, it will be advisable to use transparent bags. This also helps discourage the shopper from placing expensive unscanned items in the bags because he will know that they will be easily visible to the clerk at the checkout stand. To increase accuracy, the system may account for a certain margin of error before notifying store personnel. The margin of error will depend on the accuracy of the weighing station and the products selected. For instance, the weight of some products may vary by 20% even though they have identical identification codes. On the other end of the spectrum, if a customer selects a can of soup, the weight between different cans of the same brand may vary by less than 5%. If a customer selects 2 pounds of meat, the actual weight should be two pounds plus the packaging.

In an embodiment where each bag is weighed individually (and where the system can determine the scanned contents of each bag), the measured weight of each bag is compared to the calculated weight of the respective bag. If the comparison of one of the bags is outside an acceptable margin of error, store personnel may verify the contents of the bag in question or multiple bags.

In another embodiment, the system runs a statistical algorithm based on the weight of one or more individual items in a group (such as items within a bag) and the total weight of the group. The algorithm would determine the statistical probability that the customer correctly scanned all of the items in the group. For instance, in this embodiment, a clerk measures the weight of a bag of products and rescans X number of sample items in a bag of products. The clerk could do this for each of the customer's bags. The system then computes a net weight for each bag that is calculated by deducting from the weight of each bag the weight of the X number of items scanned from the respective bag. (Alternatively, the weight of the bag could be measured after removing the X items from the bag.) The weight of the X number of items that are scanned can be determined by reference to a database of product weights or by actually weighing each of the items. Next the system compares the net weight with the weight of the products that are on the list of items that where self-scanned by the customer (excluding the items that were rescanned by the clerk). This information is used to determine the probability that the customer correctly scanned all of the items in the bags. The following is an example of the security methodology according to this embodiment. Assume a customer has three bags, a, b and c, having the following weights: a=8 lbs, b=6.5 lbs. and c=4.8 lbs. A clerk then rescans items from these bags as follows. From bag a, the clerk scans two products having a combined weight of 2.5 lbs. From bag b, the clerk scans three items having a combined weight of 2 lbs. From bag c, the clerk scans two items having a combined weight of 1.8 lbs. The net weight of the three bags are a=5.5 lbs., b=4.5 lbs. and c=3 lbs. If any of the clerk's scans uncovers a product that was not on the list of items scanned by the customer, the system would note the discrepancy. If any such discrepancy is found, the system could instruct the clerk to rescan an increased number of products or all of the customer's products. After the clerk scans items from each of the bags, the system compares the net weights with the weights of the products that the customer scanned (excluding the items that were rescanned by the clerk) and determines the probability of obtaining the net weights given the customer scans. If the system determines that there is a very low probability (or impossibility) of obtaining the net weights given the products the customer scanned, the system could instruct the clerk to rescan more items from one or more of the bags or to rescan all of the products selected by the customer.

Additional security can be incorporated into the system by requiring the customers to identify themselves to the system by scanning a customer loyalty card. In addition, a video camera can be positioned to record customer transactions. Theft is reduced since the customer then knows that he is being observed and that his identity is known.

Recognizing that some goods may not be scanned due to coding damage or other issues, a customer may proceed to a manned checkout station such as POS terminal 170 for the addition of items to his receipt. At such point, additional payment may need to be made using traditional payment schemes, or if the central processing unit is being used to provide a debit or credit function, customer card and pin code information may need to be entered at the checkout facility.

2. Preparing for Customer/Greeting Customer

A merchant utilizing the marketing and shopping system of the present invention may prepare for the arrival of customers before they enter the store. As discussed above, the real time tracking feature allows the system to determine if a customer is likely going to enter a store. Alternatively, the portable terminal may transmit a message to the host computer informing the merchant of the customer's imminent arrival. Having this information the merchant can prepare items that are on the customer's electronic shopping list or items that the customer is expected to purchase or previously ordered. For example, if a customer previously dropped off clothes to be dry-cleaned or film to be developed, these items can be retrieved for the customer before he enters. When the customer enters the store, he may be greeted with these items. The system could analyze the customers that are expected to soon enter. The merchant can use this information to assign staff to various stations based on the number of customers coming to the store and/or the relative value of the particular customers who are coming to the store.

Figure 7A:
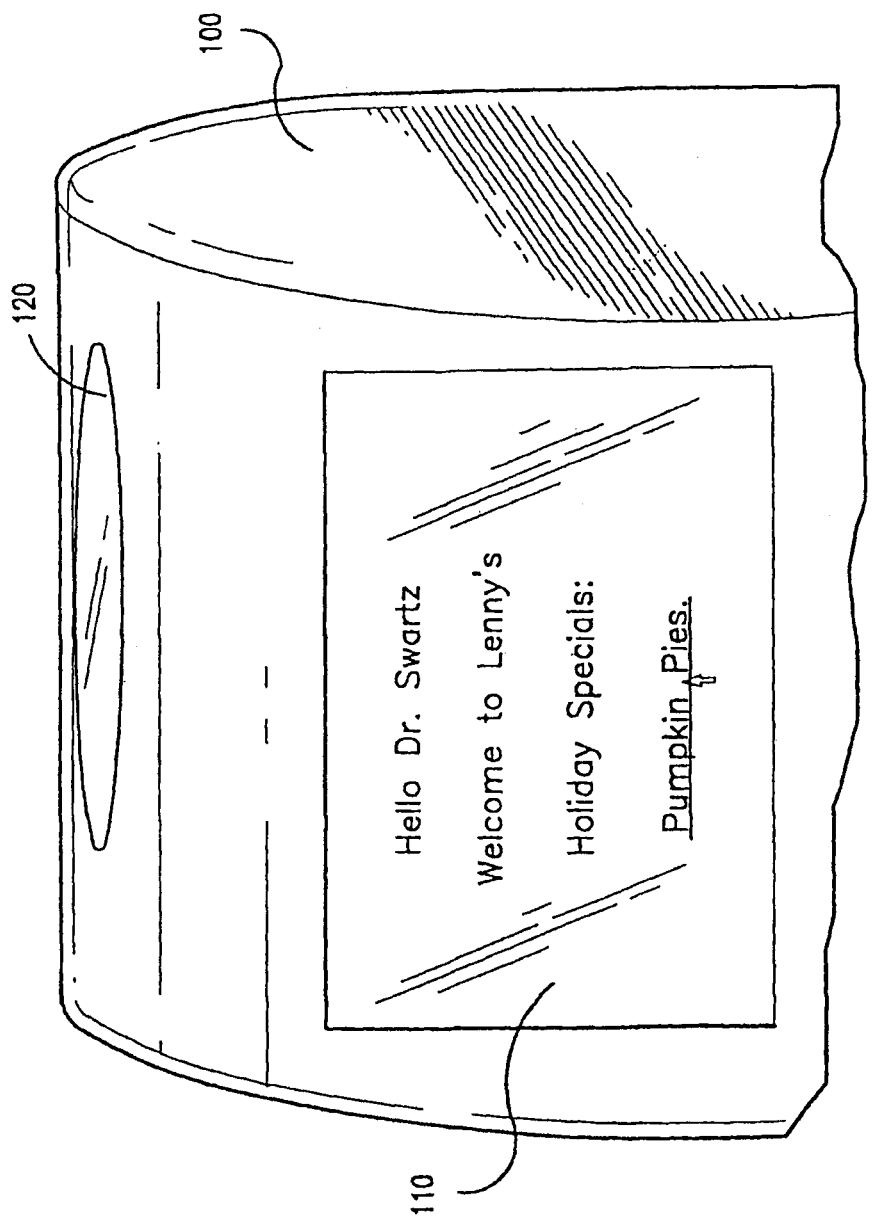

FIGS. 7A–7E illustrate an application of the present invention on a portable terminal employing a four by twenty line display in which each line consists of a five by eight pixel matrix which can be converted to pixel data to generate graphical characters. It is understood that in other preferred embodiments of the present invention, the display will have a much higher resolution than shown in the illustrated embodiments. FIG. 7A illustrates a greeting message that is displayed on a portable terminal upon retrieval of the portable terminal or upon activating a portable terminal in the vicinity of a merchant. As illustrated in FIG. 7A, a generic message is displayed to each user which includes a message regarding a special promotion, e.g., a Holiday Special on Pumpkin Pies. The term "Pumpkin Pie" is underlined, indicating that the selection may be activated to retrieve additional information. In this case, although not shown, the information retrieved would indicate the price and size of the pumpkin pie special, the location within the store where the pies are located and another link marked "Additional Specials".

In a preferred embodiment, the system can determine the last time the customer visited the merchant's store (or an affiliated store such as a store in the same chain). The greeting message may include a list of any new items carried by the store since the customer's last visit. The system may also access, either wirelessly or via a docking station, an electronic shopping list associated with the customer. The electronic shopping list may be stored on the portable terminal or stored on a computer linked to the wide area network. The system may display on the portable terminal a list of the items on the customer's electronic shopping list that are carried by the store. The system may also be able to sort the customer's electronic shopping list. The sorting could be done according to the layout of the store or desired categories.

The customer has an option of printing out a "Shopper Sheet." The Shopper Sheet may contain a shopping list, which may include scanned items from the portable terminal and/or items from a historical database. The list could be arranged by item location, in order of past customer shopping patterns or by category. The list may also contain prices—which could be normal prices or special prices offered to the customer. The printout may also include a map of the store, advertisements (for products and services inside and outside of the physical store), a list of specials (determined by customer frequently purchased items an on general items), and recipes. The printout may or may not include what would traditionally be called coupons. The Shopper Sheet may offer a discount to the customer without printing out a coupon. The system tracks the offers made to the customer and also which products the customer selects. If a customer purchases a product that the customer was offered a discount on, the discount could be automatically be applied. If needed, the store could printout a hard copy of the offer to present to the manufacturer.

In another preferred embodiment, the system may display recipes and other information the customer may be interested in. The messages presented to the customer are selected based upon a stored profile of the customer. Thus, if the customer is determined to be a vegetarian the recipe will be for a vegetarian meal or provide vegetarian alternatives. The customer may be able to retrieve gift registry information. The gift registry information consists of specific products that a friend or family member would like to have purchased for a special occasion. The system can download the gift registry information directly to the customer's portable terminal. Alternatively, the gift registry information could be provided to the customer in a format to be read by the portable terminal. For instance, the gift registry could be in the format of a two-dimensional bar code such as PDF 417. After a customer purchases an item on the gift registry, the gift registry information is updated to prevent other individuals from purchasing the same item.

In another preferred embodiment, the greeting message can remind the customer about previously ordered items. For example, a customer may be greeted with a message reminding the customer to pick up the photographs he had developed at the store and to pick up his dry cleaning.

The system may also provide instructions on using the system to the portable terminals. An instructions message may be triggered in the event no selection is made and no other key is pressed within a predetermined amount of time (i.e., 10 seconds). Alternatively, the customer may input a help request on the portable terminal. In response, the screen will display the instructions illustrated in FIG. 7B. In FIG. 7B the activation of any link will result in the display of additional information pertaining to the use of the keys on the portable terminal and a prompt for the selection of a different language in the event the originally selected language was incorrectly entered.

3. Customer Data Downloads

As discussed above, in a preferred embodiment of the present invention a portable terminal is provided with a high resolution graphical screen for displaying text and graphics to the consumer, and a two-way radio. In the context of the present invention, these interactive multi-media devices are employed to provide selective and broadcast data to consumers using the system.

In a preferred embodiment, each customer who uses the system has an associated preference profile assessable by the central host including a customer preference list. Thus, when a customer engages the system, the central host creates a transaction file for the customer to track the customer's shopping history and also downloads data related to the customer preferences. The customer preference may be collected/activated when the customer signs up for the system or may be added or modified later through a customer service desk or kiosk (not shown) which is connected to the central host 150. As discussed further below under the disclosure of the messaging agent, the preference profile may also be modified by the host computer in response to the customer's product selections. The preference profile may be stored on a computer database accessible via the wide area network or the database may be stored on the customer's portable terminal or identification card.

Preferences may include display available information on:
(1) cholesterol
(2) calories
(3) fat content
(4) generic brand alternatives
(5) better buy alternatives
(6) brand name alternatives
(7) electronic coupons
(8) paper coupons
(9) contests
(10) News
   (a) general
   (b) metro
   (c) sports
   (d) markets
   (e) local events
   (f) celebrity news briefs
(11) general advertising broadcasts
(12) language
   (a) English
   (b) German
   (c) Spanish
   (d) French
   (e) Italian
   (f) other
(13) size
(12) special family event dates
   (a) birthdays
   (b) holidays
(15) preferences of other family members if approved upon registration
(16) frequent shopper point level, including those from partner companies (e.g., Blockbuster and 7–11)

In one embodiment of the invention, a user selects which, if any, of the following categories of information he would like to activate during his shopping transaction. Certain of the preferences may be activated by the scanning of certain items. Examples of such preferences are selections (1), (2), (3), (4), (5), (6), (7), (8) and (9). For instance, if a customer has activated items (1), (2) and (5), the customer's scan of a pint of frozen yogurt may prompt the customer that the product has a certain amount of cholesterol and calories per serving and that a cheaper per serving alternative for the same brand is available in a one-quart container.

Certain data may not be item selection sensitive. For instance, if a customer selects that he is interested in receiving "celebrity news briefs" he may have a portion of his display function as a ticker-tape data field in which data regarding various celebrities is continuously displayed. The ticker tape may include story headlines which may be selected for presentation of a full story. Alternatively, if the screen is sufficiently large, a small segment of the screen may be devoted to video clips from relevant shows such as "CNN" or "Entertainment Tonight."

In the preferred embodiment of the present invention illustrated in FIG. 4, this information is downloaded to the portable terminal 100 over the wireless network 130. The portable terminal may use a variety of operating systems. For instance, the operating system may be a DOS, Windows™, Palm, or Linx based system having a browser type graphical user interface. Data displayed on the terminal's display will include "links" to other information. Accordingly, when a "fat content" value is displayed on the display, the "fat content" indicator is underlined and highlighted to indicate that the selection of the "link" will retrieve additional information. If the link is activated by navigation keys 106 (or by touching the selection if using a touch sensitive display pad), the portable terminal will retrieve additional data through the controller 150. The data, such as recommended daily amounts, alternative products with lesser fat contents, etc. may be stored at the controller, in which case, the relevant information is downloaded directly to the portable terminal. Alternatively, the "link"

represents a data file stored at a remote source such as the manufacturer's web page, in which case the controller 150 sends the request over a wide area network and retrieves the data and routes the data to the portable terminal or an email account associated with the customer. The link may also include embedded passwords and data request commands required by the remote server for retrieval of the highlighted data field.

The structure discussed above permits the retail facility to use standard programming tools such as HTML 3.0 for the creation of an Intranet/Internet environment for the operation of the portable terminals 100 and for ease of retrieving and converting data files from external sources for use on the system.

Figure 7C:
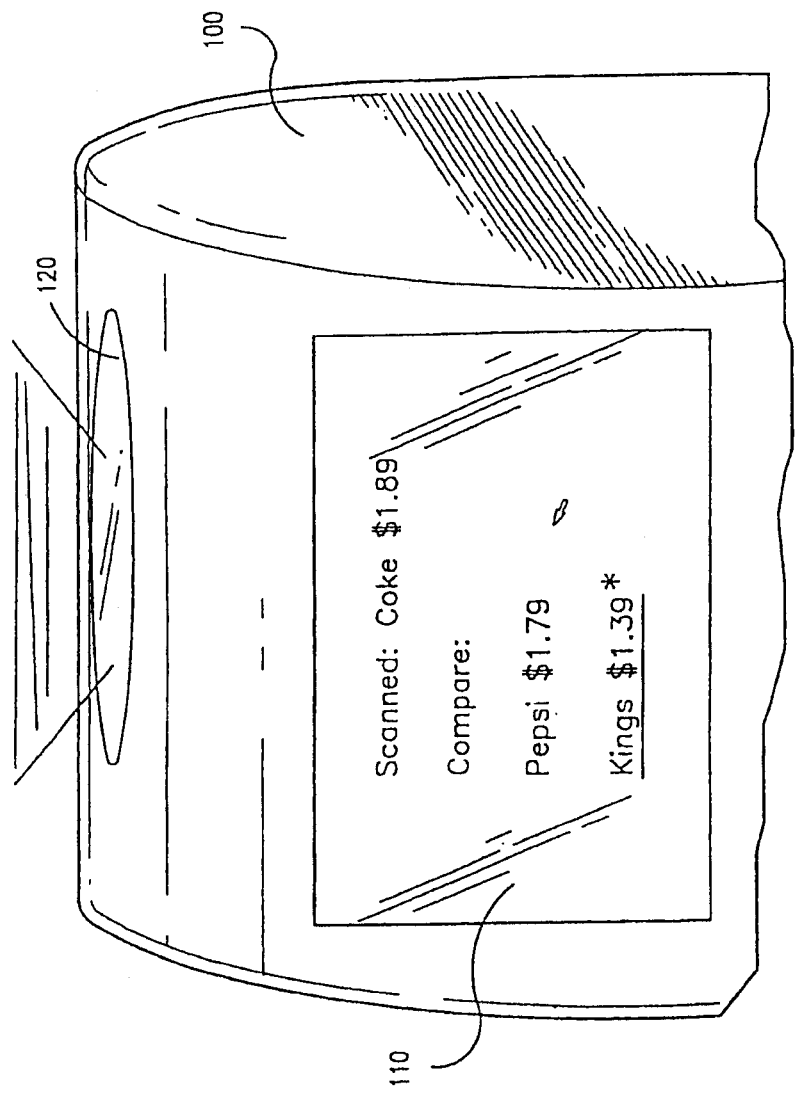

FIG. 7C illustrates the use of a comparison function by the portable terminal. This feature is activated by the consumer upon the entry of the customer preference choices discussed above, or in the alternative is automatically activated by the retail facility upon scanning of an item with the scanner 120 display. The feature causes the graphical display 110 to display an identification of the item scanned and its cost. In addition, the display also displays alternative brands and their costs. In the illustrated example, one selection, King's, includes a link with a marker, a star, indicating that an electronic coupon is available for the selected item. Selection of the item for a buy would automatically download the electronic coupon into the customer's transaction file. In the event the item is scanned for return, the electronic coupon is deleted from the consumer's data file.

Figure 7D:
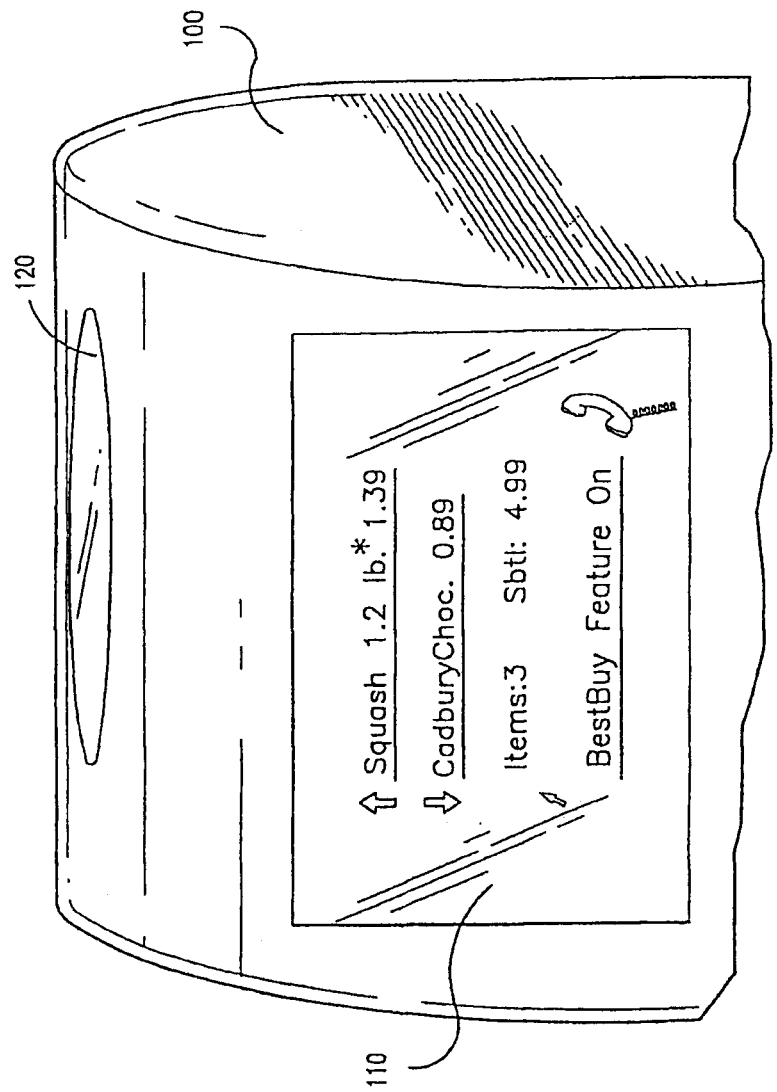

FIG. 7D illustrates a sample screen 120 after a consumer has selected several items for purchase, and pressed the equals key to display the current total. The portable terminal downloads information from the central controller once the "equals" key has been activated. The information is then displayed on the display 110 providing the consumer visual confirmation that the items have been scanned for purchase. A consumer may see all the items by scrolling through the list by placing the cursor on the arrow keys and pressing the activation key. The last line on the display indicates that the Best Buy feature is on. Selection of that link will disengage the feature. In the event multiple features are available, a multiple feature link could also be displayed to provide a menu of links which will turn various features "on" or "off" as the case may be. The two selected items are also highlighted to indicate that an electronic coupon has been used for the Squash and that cheaper buys are available for Cadbury Chocolate purchase. The latter link would be disengaged and not shown in the event the Best Buy feature was not activated.

Figure 7E:
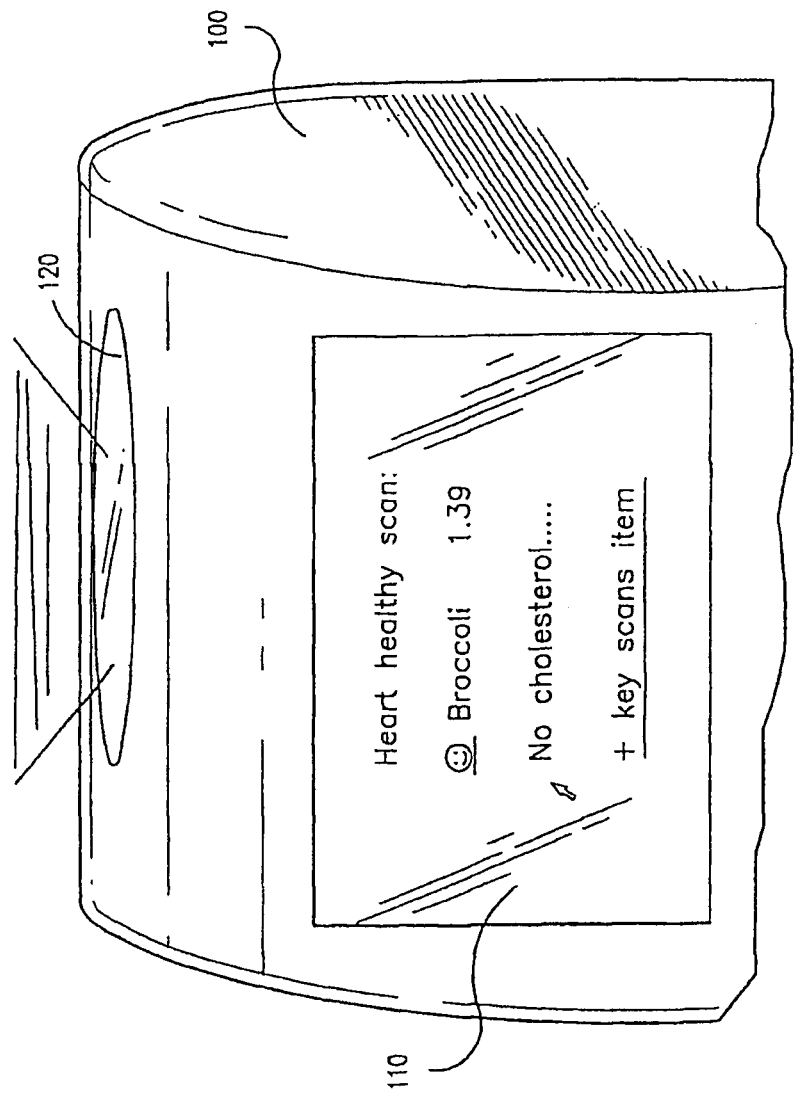

In FIG. 7E, an example is provided of a consumer using the cholesterol preference. The consumer has scanned an item of broccoli, a no cholesterol item. The scanned item is displayed with a friendly message and a happy face which in this case acts as a "link" to a consumer's advocate home web page available on the Internet which provides various data and recommendations on how to prepare broccoli and other healthy foods. The selection of this link, in the illustrated example, would download a text-only version of the web page. In the event a larger display was used such as that shown in FIG. 2, the graphics version of the page would be displayed.

The portable terminals could also be used to download audio data files. This would be especially useful to visually impaired consumers. Those consumers who have difficulty reading small print such as nutritional information on items would be able to scan an item and find its price and nutritional data through an audio output. In the event a consumer requires assistance, the portable terminal could also be provided with a working telephone subsystem.

Preferably, each unit is provided with a unique address such as an internet address. A consumer who sends out audio data or an assistance request may receive audio assistance. In a preferred embodiment, a consumer selects the help link associated with any of the selection keys, as illustrated in FIGS. 7B and 7E, or selects an audio link as illustrated in FIG. 7D. This selection generates a help request command to the controller which forwards the request to a service desk, which may be located at a point-of-sale terminal location 170. Once the clerk responds to the message request, the clerk opens a voice channel with the consumer which provides for a telephone type communication. Although the data is transmitted using packed data communication techniques using the portable terminal IP address, the communication networks described above provide for adequate throughputs to establish a real time communication link. Thus, if a consumer needs assistance in retrieving an item from a top shelf or has injured himself, he can communicate his message directly to a customer service attendant.

Figure 8A:
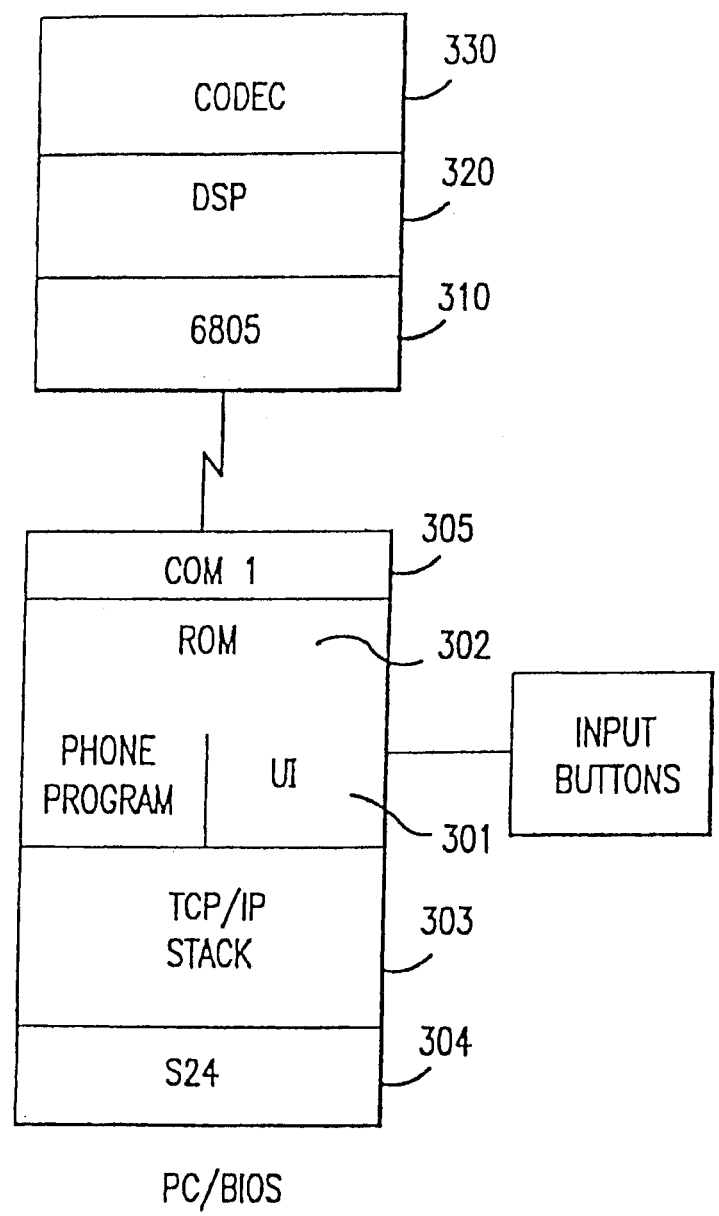
Figure 10:
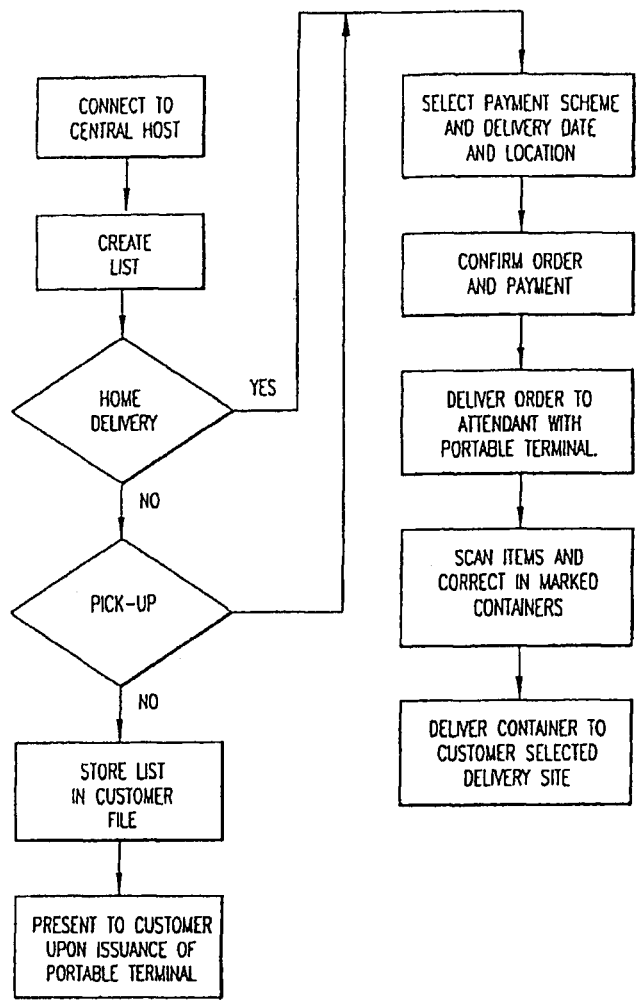

Illustrated in FIG. 8A is a block diagram of a preferred embodiment of a telephony system employed in a terminal of the present invention. In FIG. 8A, a PCM CODEC (coder/decoder) chip 330 is connected to a CT8015 DSP chip 320 and a 6805 processor chip 310. This chip set is connected to a communication part of the terminal which is provided with a data input user interface 301, and a phone program 302 stored in read only memory. The phone program utilizes a TCP/IP or other protocol stack 303 which communicates packet switched data over a SPEC-TRUM24® radio PCMCIA card 304. The audio input and output are configured to be placed next to the user's ear and mouth similar to a standard telephone handset and to provide an echo, so that a user can hear what he is saying when he speaks into the microphone. This configuration is preferred in any system in which the terminal is being held up to the user's head for use, such as that shown in FIG. 4.

The 6805 chip 310 sends and receives packets of data between the CT8015 DSP chip 320 and the serial port 305. Packets received from the CT8015 on the terminal's CPU via the serial port 305. The user interface software is designed to identify the selection of an IP address on the display. Alternatively, the user interface 301 could simply send a telephony request message and wait for a telephone communication channel open command to be received from the controller over the wireless communication link.

The phone program is a memory resident (TSR) program and handles the actual processing of audio communication which includes processing user interface data, routing the packets from and to the SPECTRUM24®network, and routing packets from and to the local CT8015 chip. The phone program 302 also performs the handshaking procedure with the CT8015 chip 320.

Illustrated in FIG. 8B is an alternative preferred embodiment of the architecture which may be used in a device of the present invention to effectuate telephony application. Although the architecture illustrated in FIG. 8A is preferred in systems wherein the telephony application is to be added through com port com 1. The architecture illustrated in FIG. 8B is preferred in systems in which the application is to be built as an integral part of the system architecture.

The two-way audio system of the present invention permits retail facilities to transmit emergency broadcast messages on the portable terminal and permits customers to respond quickly. For instance, inquiries as to a lost child could be made by a parent and retransmitted to all other users in the store or to a service attendant, located near the store exit who can ensure that the lost child is not permitted to leave the facility. Moreover, the phone system permits facilities having multiple locations to use service desk assistants located at a central location to service multiple locations. A store need not set up a telephone help desk at each location. In addition, the telephony application could also be implemented to provide (i) customer notification upon the availability of an ordered item (i.e., deli order is ready), (ii) place orders for out-of-stock items, and (iii) identify the location of all store shoppers and employees.

4. In-Store Marketing

The self-shopping embodiment of the present invention permits broad in-store marketing programs including pin-point marketing, coupon distribution and coupon tracking. An example of a preferred marketing system employed in a system of the present invention is described below.

The application of an electronic coupon system has been previously described above. In the event electronic coupons are not available for a particular product, the system, i.e., software on the central host, could be provided to identify the existence of other couponing or discount system applicable to a scanned product. For example, some retail facilities provide coupon dispensers at entrance points and in aisles. If such a coupon system exists for a scanned item, the controller generates a link for the scanned item, identifying the nature, availability, conditions, locations and amount of savings generated by the coupon, and the customer may then proceed to the location and physically retrieve the coupon. A coupon redemption center may then be provided for expedient conversion of the coupon into the customer's transaction file. Alternatively, the coupon can be presented at a checkout register or, if the coupon is provided with a machine coded label, e.g., a bar code, it may be scanned with a portable terminal which will register the coupon on the system and apply it to a previously scanned or subsequently scanned item. Besides providing information about the product and the amount of discount, the machine coded label on the coupon could include other information used by manufacturers and marketing firms. This pre-scanning of coupons may be performed by a customer at the store or at home using a home scanner (such as one attached to the customer home computer 45) or a portable terminal having a scanner and downloaded into the customer's data file at the facility.

In order to provide coupon functions, the central host is provided with a database of available electronic coupons and hard coupons. In a preferred embodiment, the system automatically creates a linked page for scanned items including any associated information matching a customer's preference profile. The system will employ a dynamic page builder using a predetermined coupon template wherein a hyperlink to a page of coupon data is presented. In the event the page exceeds the display limitations of the display (i.e., requires more lines than are available on a single display) for the terminal in use, the page builder automatically creates a new "next page" link to be displayed on the terminal. The dynamic page builder program also permits an override functions in the event a link is provided to an external web page address. Using the IP address of the portable terminal, the central host will retrieve the file from a remote site (i.e., an Internet server) and retransmit the web page to the portable terminal. The retransmission by the central host will include any reformatting constraints which are applicable to the destination portable terminal which may only have a partial view screen capability. The resulting collection of data may then be transmitted to the in-store system by E-mail transmission or through a data collection article such as a smart-card or a floppy disk. Store receivers (i.e., kiosks) would be installed to load such data on to the customer's data file.

In addition to the coupon schemes discussed above, the central host also provides and tracks other marketing programs in response to the scanning of predetermined items by a consumer using a portable terminal of the present invention. One example is a "buy two and get a third item free" or "for fifty percent off" discount prompt at the display. The system could provide offer a discount to a customer if the customer increases his purchasing volume. For example, if a customer scans two rolls of paper towels, the system may offer the customer half off a third roll. The system could also provide a message to a customer to purchase a product that competes with a product that the customer scanned. Thus, after a customer scans brand x soda, the system could offer a discount on brand y soda. In the event of company rebates, the system could be employed to generate automatic redemption requests by the system. In accordance with a preferred embodiment of the present invention, the central host generates a list of consumers who have bought articles having a rebate feature. The store may then print fully formatted rebate requests upon receiving payment from the consumer or automatically communicate the rebate request to the company providing the rebate. This would provide for the automatic rebate of funds to the consumer or for the crediting of the consumer's account at the specific facility. The central host also maintains detailed logs as to the nature, quantities and results of such transmissions.

In another preferred embodiment, the central host is programmed to inform customers that a selected item is a restricted item and cannot be purchased by the consumer at that time. For instance, in some states alcoholic beverages may not be sold on Sundays. Thus, if a consumer scans the product for purchase, the portable terminal will display a message or play an audible message conveying the prohibition. Similarly, if a customer who is below the minimum drinking age attempts to purchase an article of alcohol, they will be reminded of the drinking age and a notice will be provided to the local service attendant upon an attempted payment that a person of unknown or insufficient age has attempted to buy an age restricted item.

5. Kiosk

In a preferred embodiment, the system includes one or more kiosks that are linked to the system's LAN and WAN networks. The kiosks may be configured to provide many of the functions performed by the portable terminals. For instance, many of the messaging features disclosed herein are described as providing messages to a customer's portable terminal. These same messages can be presented to a customer at a kiosk instead of a portable terminal. This is particularly advantageous for customers who are shopping without a portable shopping device. For example, a kiosk may greet customers with a list of new items carried by the store since the customer's last visit to a store in the chain. As described in more detail below, the system's intelligent messaging agent may select appropriate messages to send to the customers. These messages may be presented to the customer via the kiosk instead of a portable terminal.

The kiosks may have a "hot sync" connection to link with the portable terminals. The link may be established by placing a portable terminal in a cradle associated with a kiosk. In this embodiment the system operates in accordance with the batch mode embodiment discussed above. Alternatively, the portable terminal and the kiosk would have a wireless link to each other. If a portable terminal needs to identify a particular kiosk in order to determine the appropriate address to send information to, the portable terminal could read a code associated with the kiosk. For example, if a customer wanted to have his portable terminal interact with a specific kiosk, the customer could scan a bar code on the kiosk that provides the portable terminal with the an address (e.g., an internet protocol address) associated with the kiosk. A wireless link between the kiosk and the portable terminal could also be established automatically. For instance, when the portable terminal enters a kiosk wireless range, the two devices could exchange the necessary address information.

Once a link is established between the kiosk and the portable terminal, the kiosk could upload information (e.g., recipes, shopping lists) from the portable terminal. The kiosk may also be able to download information (e.g., aisle sorted shopping lists, information about products, messages) to the portable terminal. The information downloaded from the kiosk to the portable terminal may be generic information applicable to all customers (e.g., a sale on a certain product) or it may be targeted for specific customers. The targeted information could be based on the products the customer has selected and/or the customer's shopping history. The customer could optionally reprint a Shopper Sheet. The kiosk can also be used as a vehicle to retrieve information stored on a storage facility on the wide area network. For example, a customer may be able to retrieve information stored on his home computer or from a terminal associated with a manufacturer.

Preferably, a printer is linked to the kiosk. The printer would allow a customer to print out coupon offers, recipes, instructions, an aisle sorted shopping list, nutritional information, etc.

The kiosks of the present invention allow a customer to more efficiently navigate through menu options. The system can provide information to the kiosk about the customer and his selections so the customer does not have to manually enter the information on the screen. For example, typically a greeting screen asks a user which language he would like to use. The kiosk of the present invention can determine the customer's language from the customer profile. As a further example, if a customer uses the kiosk to find information about an item on the customer's shopping list, this information may be only a couple kiosk screen shots away since the kiosk can access the customer's shopping list.

Customers may use the kiosk to obtain information about certain items including items that the customer "bookmarked". The information may include recipes, nutritional information, instructions on use, comparisons to other products, web sites, etc. For instance, the customer may use the kiosk to surf the internet on a product he would like additional information on. The customer may be able to print out the retrieved information on a printer associated with the kiosk or download the information to a portable terminal. The kiosk may also provide coupons to the customer either electronically to the portable terminal or printed out.

The kiosk may also be used as like a "home computer" for some customers. Customers may be able to place an order with an internet vendor for items available for sale on the internet. The customer may pay the merchant for the ordered items or pay the internet vendor directly. The internet vendor may ship the product directly to the customer's home or to the store. Thus, the kiosk is particularly useful for customers who do not have internet access at home, are not home during the day to receive a package, do not have a credit card (since the customer can pay the merchant with cash) and/or are concerned about security/privacy issues about internet orders.

The kiosk may also have a "help desk" feature to provide assistance to customers. The kiosk may include a camera and viewing screen so that customers can have a face-to-face conversation with a store assistant. A merchant who operates within a chain of stores can have a clerk assist customers in many different stores.

6. Messaging Agent

In a preferred embodiment, the system may provide messages to display on the portable terminal. An intelligent messaging agent selects the messages to send to the portable terminal. The intelligent messaging agent operates in accordance with an inference engine, neural network, rules based template or similar statistical model. The source of the messages sent to the portable terminal may be a merchant, a manufacturer, a distributor or a coupon vendor. Preferably, the messages are routed to the portable terminal in accordance with standard TCP/IP. The system provides an opportunity to provide instantaneous messages to customers and receive feedback from a customer in real-time. This real-time feedback can be used to modify messages sent to the customers. For example, after a merchant offers a $1 discount off of a bag of potato chips to a group of customers, the merchant could monitor the customer's product selections and immediately determine the effectiveness of the message. The merchant could raise or lower the amount of the discount in response to the customers' responsiveness to the original message.

In a preferred embodiment of the present invention, the system's messaging capabilities are combined with the customer location tracking feature previously discussed. Thus, the customer is provided with messages about products at the optimal time. For instance, a customer may be offered a discount on toothpaste as he approaches the store's toothpaste selection. The optimal time to provide a message to a customer may not necessarily be when the customer is in front of the item. Thus, if a customer is in the area where a store offers movie videos or DVDs, the system may provide a message about popcorn or if the customer is in front the milk aisle, the system may provide a message about cookies.

The messaging agent uses a rules based algorithm that utilizes prior shopping history to target specific messages to specific customers. The messaging agent is intelligent so it can "learn" what products or types of products a customer typically purchases. If a customer never purchases an item in a certain category or always ignores messages directed to an item in a certain category, the messaging agent will not provide promotional messages about this product to the particular customer. While the system attempts to send messages that are most effective to a particular customer, if the customer is not interested in a message sent to him, the customer can simply ignore the message.

In one embodiment of the present invention, after a customer scans a product, the host accesses the product profile database to determine if there are any messages associated with the product. Thus, when a consumer scans a "Coke" can, he may receive the voice message "COKE IS IT." Alternatively, the central host may access the customer profile database and determine the customer's prior purchase records, and detect correlation of purchased items. If such a correlation to a scanned item is identified, the portable terminal may be prompted to display a message reminding the consumer to purchase other associated products or products usually purchased by the consumer but not currently selected. For example, if a consumer purchases hot dogs, the central host may send a message to the portable terminal, "Do you need hot dog buns and mustard?" The message would be dependent on the customer's transaction list and prior purchasing history, a positive, response selected, and if the display would show a new page providing cost and location data. In addition, if the customer's prior purchase record indicates that the customer usually buys charcoal with hot dogs or hamburgers, the terminal may also ask the customer if he needs "Charcoal." Again, the prompted items would be provided with a link to an informational page to provide cost and location. The item prompts would also be turned off in the event the central host determines that the product is out of stock.

The system accesses the customer profile and product profile databases to determine the most effective messages to send to the customer. The system should not send a message to a customer that would be inconsistent with the messaging agent's rules. For instance, if the customer profile indicates that a customer is a vegetarian and that he never purchases meat, the system would not send a message providing a discount on hamburgers. Instead, the customer may be provided a message concerning a discount on tofu burgers. On the other hand, if a customer's customer profile indicates that he always purchases brand X orange juice, the system may offer a big discount on brand Y to entice the customer to switch brands. Similarly, the system may determine that the customer will likely purchase brand X orange juice. In this case, the system may not offer a discount on this brand of orange juice to this customer since he has a propensity to buy the product without receiving a discount.

In a preferred embodiment, if a special event (birthday, religious holiday, government holiday, Mother's Day etc.) is approaching, the system can access the customer profile and product profile databases to determine appropriate messages. For instance, if the Fourth of July is approaching, the system may provide messages to the customer associated with this holiday and the customer. For example, the system may offer a discount on non-alcoholic beer. The system may determine that a special event is approaching by accessing a calendar with all significant scheduled events and holidays. The system may also be able to access a customer's personal calendar stored on the portable terminal. The customer's personal calendar will typically include appointments for upcoming events. For instance, a customer may have stored on his personal calendar that his anniversary is on July 11. This information may then be stored in the customer profile for that customer. The customer profile may indicate that a customer celebrates a particular holiday. This information can be provided directly from the customer or the system may be able to deduce this information based on the customer's scan selections.

Based on a customer's scan selections the system may be able to deduce other products of interest to the customer. For example, if a customer scans hot dogs, hamburgers and corn, the system may access the product profile database and link these products to a barbeque. Thus, the system may deduce that the customer is going to a barbeque. The system may then access the product profile database to determine other products associated with that particular event. The system may also access the customer profile database to determine products that this particular customer may be interested in purchasing. The system may then offer discounts on other products associated with that event, e.g., barbeque sauce. The deduction that the customer is likely going to attend a special event may be determined from the customer scanning a single item. For example, the system can determine a great deal of information if a customer selects a birthday cake, an anniversary card, charcoal etc.

In another embodiment of the invention, the messaging agent access the replenishment history information in the customer profile database and/or product profile database in determining messages to send to a customer. For example, if the customer profile indicates that a particular customer has a replenishment frequency of two weeks for purchasing a product, and the customer has not purchased the product in two weeks, the system may deduce that the customer would likely purchase that product. Thus, the system may provide a reminder to the customer to purchase that product. Similarly, the product profile can also be accessed to determine replenishment frequency. Some products are inherently purchased more often than other. For example, the replenishment history of vitamins is typically longer than for milk. The system uses the information relating to replenishment history to determine an appropriate message to send to a customer. For example, if a store wants to sell orange juice to a customer who typically purchases orange juice every other week, the system would have to offer a larger discount to the customer if he purchased orange juice a week ago.

In one preferred embodiment of the invention, the system selects the messages to send to a customer based at least partly on the inventory of the offered products. For example, the system is able to determine in real-time the approximate number of products a store has in its inventory. The system may also be able to determine the expiration dates of the products in inventory. Thus, if a store determines that it is overstocked with eggs, the system may promote the eggs by offering discounts on eggs to certain customers. In a preferred embodiment, the amount of the discount provided to a customer is not determined solely by the inventory of the product but other factors as well. These other factors may include the customers' shopping history, the expiration dates of the products, the effectiveness of the advertisements, etc. The system is able to monitor the effectiveness of the messages and the inventory of the eggs in real-time, and adjust the messages if necessary. In the event the messages are not increasing the sales of eggs enough to properly manage the inventory, the system may increase the offered discount. The increased discount could be sent to customers who were not sent the original discount or to the customers who received the original message but did not select the eggs after a certain amount of time after receiving the original message. Similarly, if the system determines that the sales of eggs have increased significantly after sending the original message, the system may decrease the offered discounts to subsequent customers.

The inventory assessment may include inventory at a manufacturing facility, a distributor and/or products in transit. Traditionally, it could take a manufacturer weeks or months to establish discounts, coupons or rebates for customers of the manufacturer's products. The system of the present invention allows the manufacturer to provide promotions immediately to customers and to receive immediate or near immediate responses to the effectiveness of the promotions. For instance, a manufacture may determine that it has excess inventory in laundry detergent. Thus, the system may promote this brand of laundry detergent by offering discounts to certain customers. The promotional messages can be activated directly from a terminal associated with the manufacturer. Alternatively, the store's host computer could act as a gatekeeper to all of the messages that are sent to the customers. The system may also factor into the content of a promotion the products that are to be delivered to a store. For instance, if a truck of merchandise is scheduled to be shipped to a store in the near future and the store has not sold an adequate number of the products on its shelves, the system may provide promotions to increase the sales of the product. The delivery personnel having their own portable terminals will be able to access the system and determine the inventory in a store. The delivery personnel could use this information in planning the amount of products to ship to the merchant.

In a preferred embodiment of the present invention, the central host prompts the portable terminal to display customer specific data and external advertising messages. For instance, if a customer comes in on his birthday the store could offer the customer a free coffee and chocolate cupcake. The system could also provide a message to the customer suggesting certain gifts for an upcoming event. For instance, if a customer's anniversary is approaching, the system could suggest that the customer purchase a bottle of wine. Alternatively, the system allows a merchant to establish affiliate marketing programs. For instance, messages promoting a local hair salon could be sent to all consumers who scan a particular high-end beauty product or a customer who the system deduces is going on a barbeque may be provided with a discount at a hardware store for a gas grill.

In another preferred embodiment, a customer may be able to build up "loyalty points" as he shops. The loyalty points may be redeemed for a discounts off of products or to receive products free of charge. A merchant, manufacturer, distributor or coupon vendor may accept the loyalty points. For instance, after a customer scans a certain brand of toothpaste manufactured by Company X, the customer may receive 5 loyalty points from the Company X. After the customer gathers 100 points within two years, he may be able to redeem the points for a free tube of toothpaste. A manufacturer may provide loyalty points for multiple products. For instance, Company X may also manufacturer shampoo. The customer could increase his loyalty points from Company X by buying the Company X's shampoo. The merchant may also provide a program of providing loyalty points to customers. The loyalty points awarded may be proportional to the amount of money spent by the customers. Extra loyalty points may be awarded to customers as a means to influence their choices. For instance, extra loyalty points could be awarded to try a new product, increase purchases and/or shop at off peak times.

In accordance with another embodiment of the present invention, the system may award, based at least partly on chance, a prize to customers. A customer who purchases or scans an item may have a random chance of receiving the prize. Of course, this embodiment would have to be implemented in a manner consistent with federal and local laws. The prize may be a discount off a product (for this shopping trip or a future trip). A customer may be informed that he is a winner on the portable terminal after he scans a product. The system may factor in the customer profile or the value of the items the customer is presently purchasing in determining the customer's odds of receiving a prize.

The system may employ a parameter control to assure that the customers are not bombarded with an excessive number of messages. The criteria used by the parameter control in determining whether to send a message may include the frequency of previously sent messages and/or the number of messages ignored by the customer. The system may have an option for the customer to select the amount of messages received per shopping trip. For example, the customer may select a Low, Medium, or High level of messages. A customer may select a low or no messages if he is going on a short trip or if he does not want to be distracted while shopping. A store may compensate customers for receiving messages. For instance, a customer that receives many messages may receive a 1% discount off of his bill and a customer that receives only a few messages may receive a 0.25% discount. The customer may also be able to adjust the types of messages he receives on the portable terminal. The customer can set the system so he receives only messages offering discounts or, more specifically, only discounts on products that are on the customer's electronic shopping list or are related to these products.

In another preferred embodiment of the invention, the system may be able provide interactive feedback to a customer in response to the customer entering information to the portable terminal or kiosk. A customer may be able to specifically indicate to the system that he is interested in a particular item, that he is going to a specific type of event, he is interested in a certain meal, or that he is on a specific type of diet. For instance, if a customer indicates that he is interested in soda, the system will provide to the customer the brands of soda that are available or the brands of soda that are currently on sale. If a customer indicates that he is having a barbeque, the system may provide suggestions of items to purchase. If a customer indicates that he wants to prepare a certain meal, the system may provide a list of the necessary ingredients. If the customer indicates he wants to purchase a gift for a certain individual, the system may provide a list of suggested gifts. If the customer indicates he is on a special diet (e.g., vegetarian or protein diet), the system may provide a list of suggested meals and items to purchase.

In another embodiment of the invention, the system may select the messages to send to a customer based at least partly on maximizing a store's profits. The system may be set to promote the products with higher profit margins. For instance, if a store would make a profit of $1.00 on the sale of a first brand of product and a profit of $1.20 on the sale of a second brand, the system may offer a discount up to $0.20 off the second product to increase its profits.

In a preferred embodiment, a merchant who employs the system of the present invention may be able to receive compensation for providing messages to the customers. The store may receive compensation from an advertiser, e.g., a manufacturer, a distributor, another merchant, a coupon vendor or a political candidate running for office. The message rights obtained by the advertiser may be limited to a specific class of customers. The class may be defined by any common trait in a group of customers, e.g., customers who buy certain high end products, customers who buy specific brands of products, customer who spend a certain amount of money, customers who buy certain types of products (e.g., baby products), etc. For instance, an advertiser may have the right to provide messages to customers who have purchased diapers within the last month. The compensation received by the merchant may be a flat fee, a fee based on success of the ads or an auction model. Under an auction approach, a number of entities (e.g., manufacturers) may compete for the ability to provide their message to customers. The auctions may take place on a periodic basis (e.g., quarterly, monthly, weekly, daily and/or hourly). The winner of the auction has the right to provide messages to the customers (or a class of customers) within a predetermined subject area.

7. Shopping Lists

In another preferred embodiment of the present invention, the central host also provides for the uploading of customer shopping lists. Thus, a customer may generate a shopping list and email the list to a predetermined secure (i.e., password protected) email address. The customer's email address would be predetermined and automatically associated with a customer's file at the shopping facility. When the customer is assigned a portable terminal, the portable terminal's initial prompt will also include a message link indicating that a message has been received for the customer. The selection of the link would cause the email message to display on the portable terminal. If the customer has his own portable terminal, the shopping list can be stored in the memory of the portable terminal. This shopping list may or may not be transferred to the central host. The shopping list may be provided to the customer in order of the store layout. If the system determines that a customer is in the vicinity of an item on the shopping list, the system may provide a message to purchase the item.

The shopping list may be derived from a number of sources. A suggested shopping list may be provided based on prior purchases, replenishment frequency, etc. The suggested shopping list may include a number of default items, e.g., milk, which will always be suggested. The customer could then accept or reject items on the suggested list. A customer may also add items to the shopping list by scanning products. For instance, if a customer is at home and finishes a bag of flour, he could add a bag of flour to the shopping list by scanning the bag with the portable terminal. The customer may also add items to the shopping list by scanning a coded recipe. For instance, a recipe may be encoded in a PDF 417 bar code. The recipe includes all of the ingredients necessary to make the recipe. In response to scanning the recipe, the portable terminal could include in the shopping list all of the ingredients necessary to make the recipe. The customer may also add items to the shopping list by scanning codes in a circular or newspaper. In addition to adding the product to the customer's shopping list, the scanned code may provide a discount on the product.

The shopping list could be created on the portable terminal that the customer uses when shopping. Alternatively, the customer could create the shopping list with a first device and transfer the list to a second device. (Similarly, this second device could then transfer the list to a third device.) The first device may be a small scanning device with limited or no display. For example, the first device may be a key-fob device such as the CS 1504 and CS 2000 manufactured and sold by Symbol Technologies Inc., the assignee of the present invention. The second device may be a portable terminal used by the customer while shopping (e.g., a portable terminal having a display that is attached to a shopping cart) or a kiosk. Information may be transferred between the first device and the second device in a number of ways known to those of skill in the art. For example, the information may be transferred optically, acoustically, via radio frequency or a simple hardware connection. Ultimately, the shopping list may be accessible to a host computer associated with a merchant.

In an alternative embodiment the first device may be associated with the user's television or home computer. For instance, a customer viewing an advertisement on television or home computer may be interested in purchasing a product. The customer could indicate on the television's set-top box or home computer that the customer would like to add the product to his shopping list. The set-top box or home computer could then transfer this information to the customer's portable terminal, to a merchant's kiosk or to an email account associated with the customer. Alternatively, instead of indicating on the set-top box or home computer that the customer would like to add the product to the shopping list, the customer may indicate that he would like to "bookmark" the item or receive additional information about a particular product. The customer could then retrieve additional information about the product from a database associated with a merchant or manufacturer.

The system may utilize the information stored in the customer shopping list to select messages to send to the customer. The system may provide a reminder to the customer to purchase an item on the list if the customer is in the vicinity of the item or if the customer passes the item without scanning the item. The system could also use the information in determining whether to send a promotional message to a customer. For instance, if a customer has on his electronic list a particular item, the system may not offer a discount to the customer to purchase this item. Since the customer's shopping list indicates that the customer already has a predisposition to purchase the product, there is no need to offer an additional discount on the product. The system may provide messages promoting products that compete with the items on the customer shopping list or promoting the purchase of a larger quantity of the product. If the customer indicates that he is interested in preparing a certain recipe (or if the system deduces that a customer may be preparing a certain recipe), the system may provide similar messages. Thus, if a customer is preparing a stuffed turkey, the system may remind the customer to purchase stuffing mix or provide a discount on a certain brand of stuffing mix. In the event the customer's portable terminal stores a code associated with an item the customer wishes to purchase and then the customer scans a related item (e.g., the related item may be a different size or a competing product), the system may provide a message to the customer informing him that there is not an exact correlation with the stored code. The customer can then ignore the message and purchase the related product or change his product selection. The system is able to determine that the scanned item is related to an item on the shopping list by comparing these two items to the cross-reference information in the product profile database.

Figure 1F:
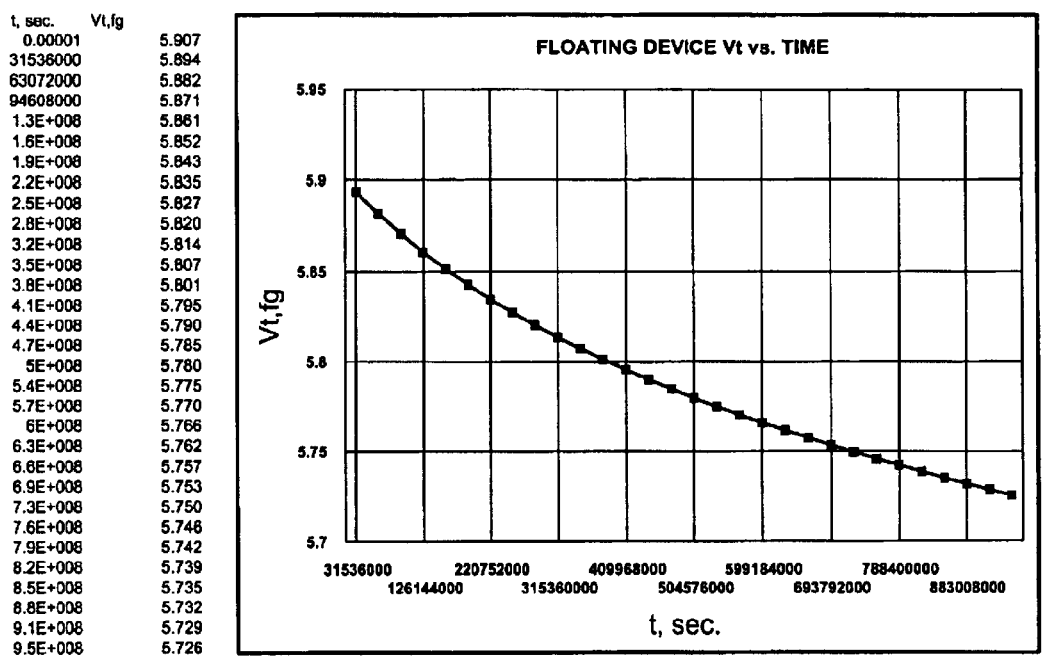
FIG. 1 is a general block diagram of a system employing a preferred embodiment of the present invention.
FIG. 1A is a general block diagram showing information flow in a preferred embodiment of the present invention.
Figure 1H:
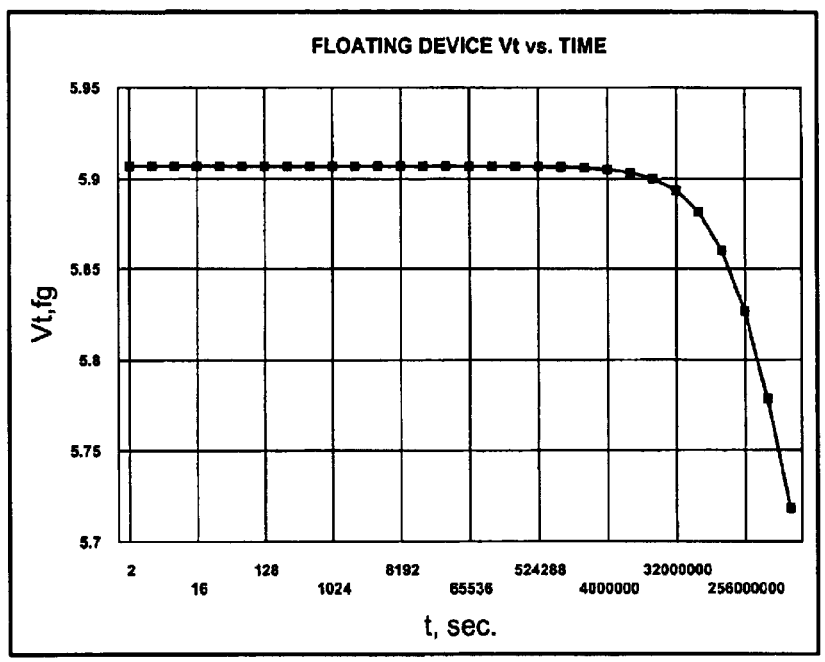
Figure 1J:
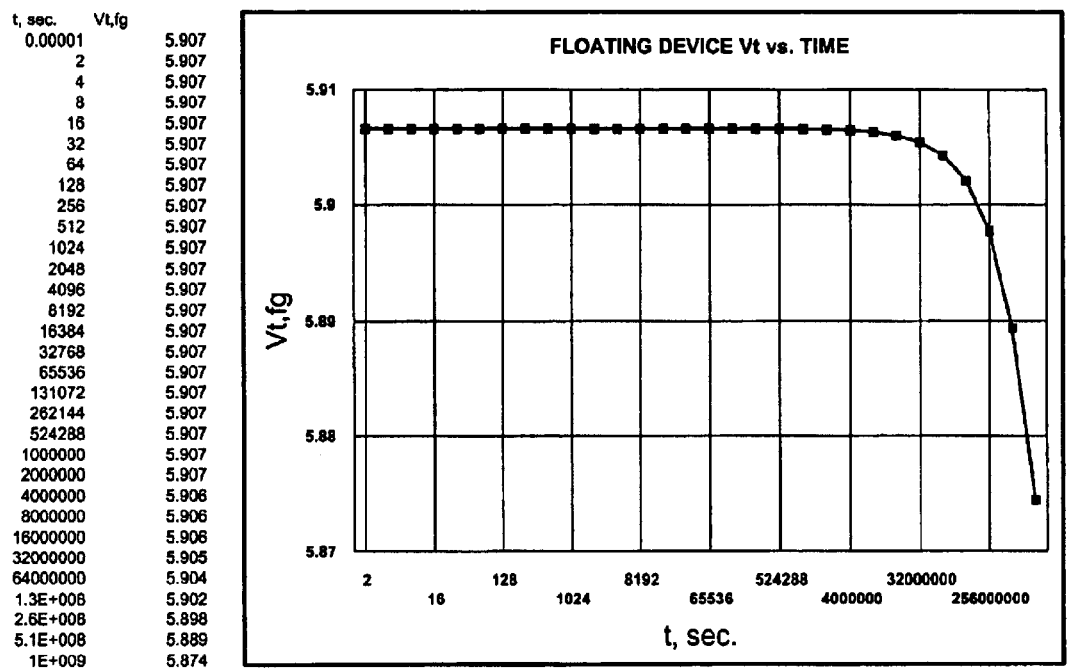
Figure 1K:
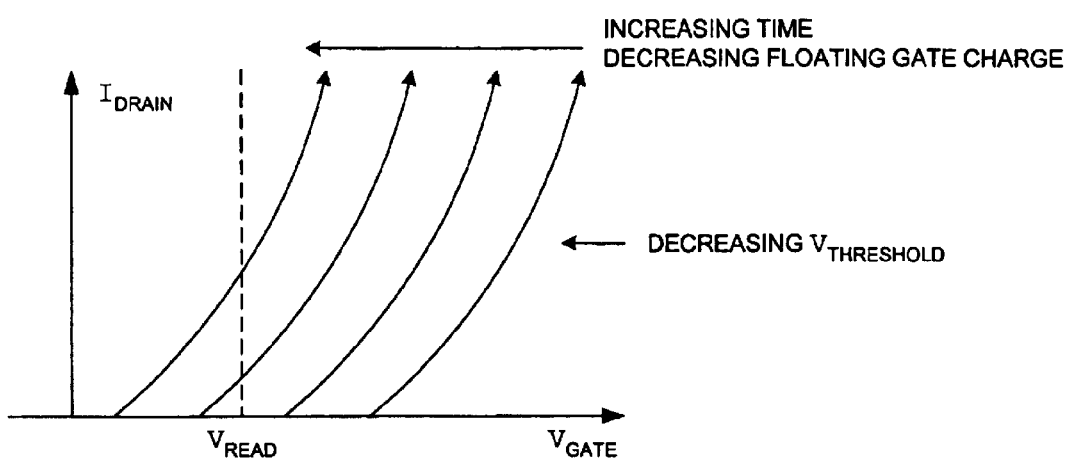
Figure 1M:
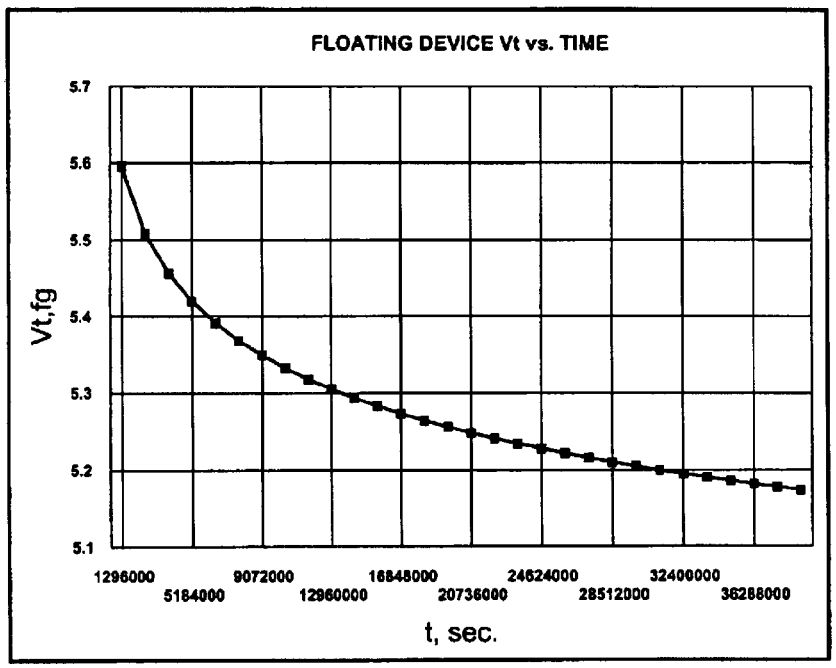
Figure 10:
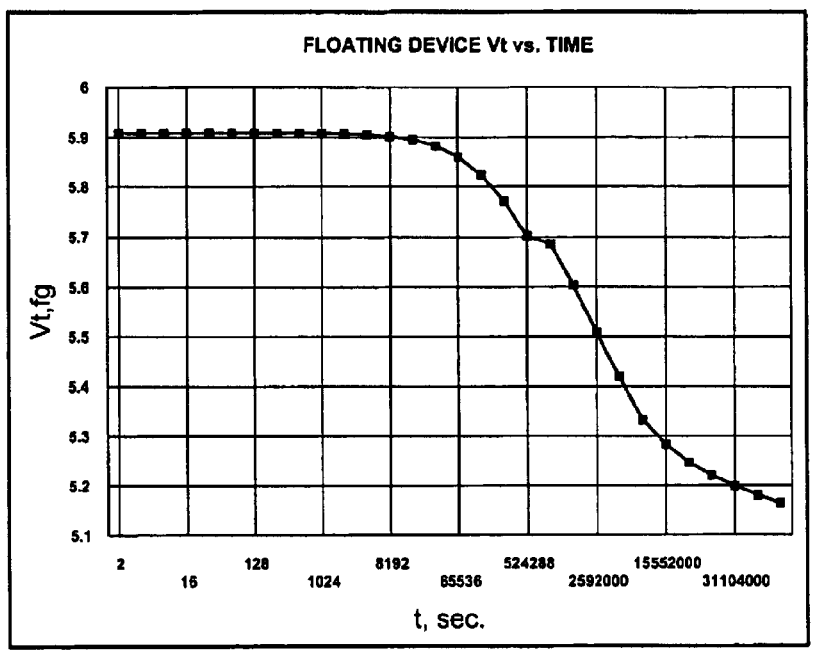
FIG. 10 is a flow chart of a home shopping delivery system employing a preferred embodiment of the present invention.
Figure 2A:
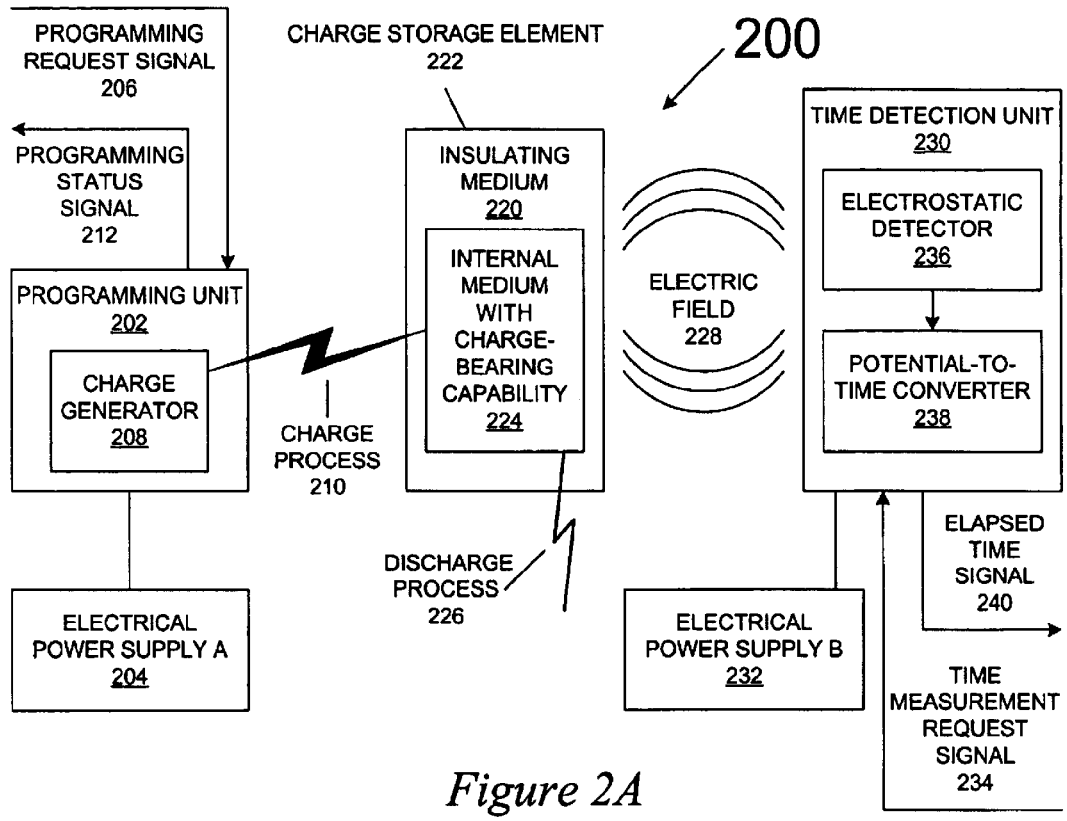
FIG. 2 is a preferred embodiment of a portable terminal of the present invention.
Figure 2B:
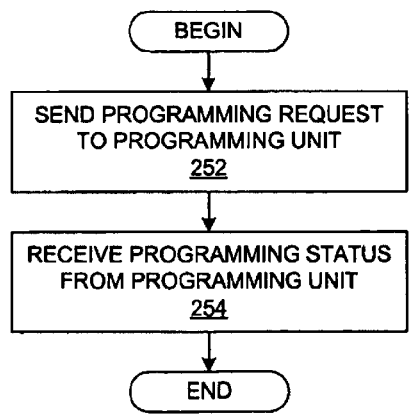
Figure 2C:
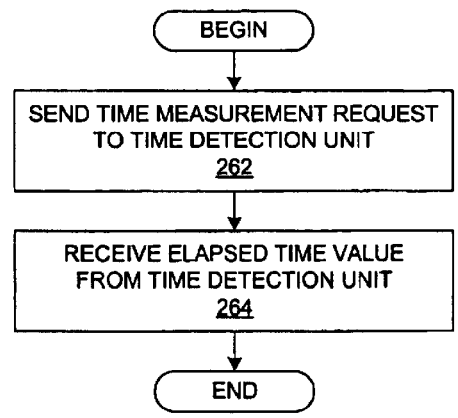
Figure 3A:
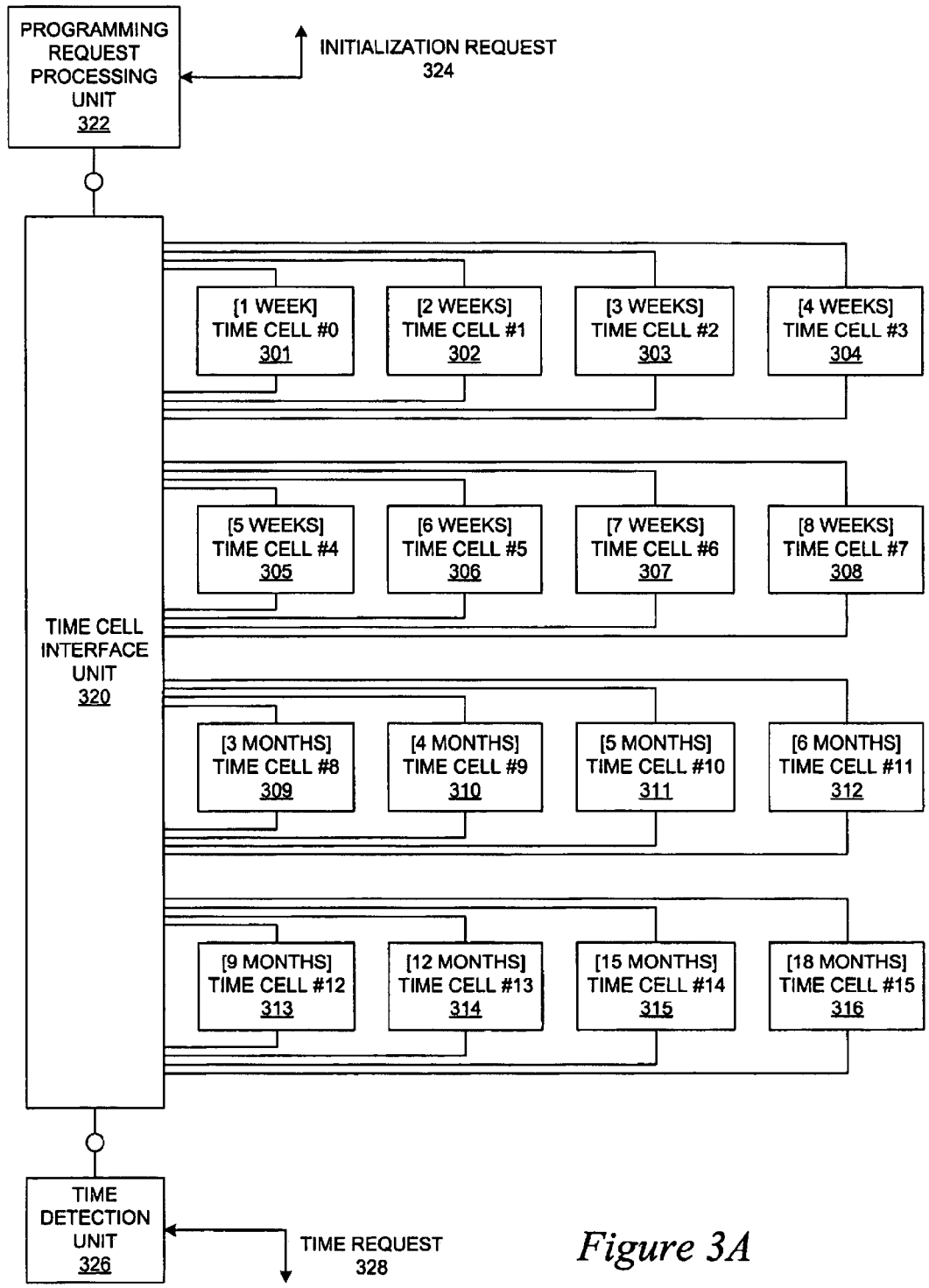
FIG. 3 is a functional block diagram of the basic subcomponents of a preferred embodiment of a portable terminal of the present invention.
Figure 3B:
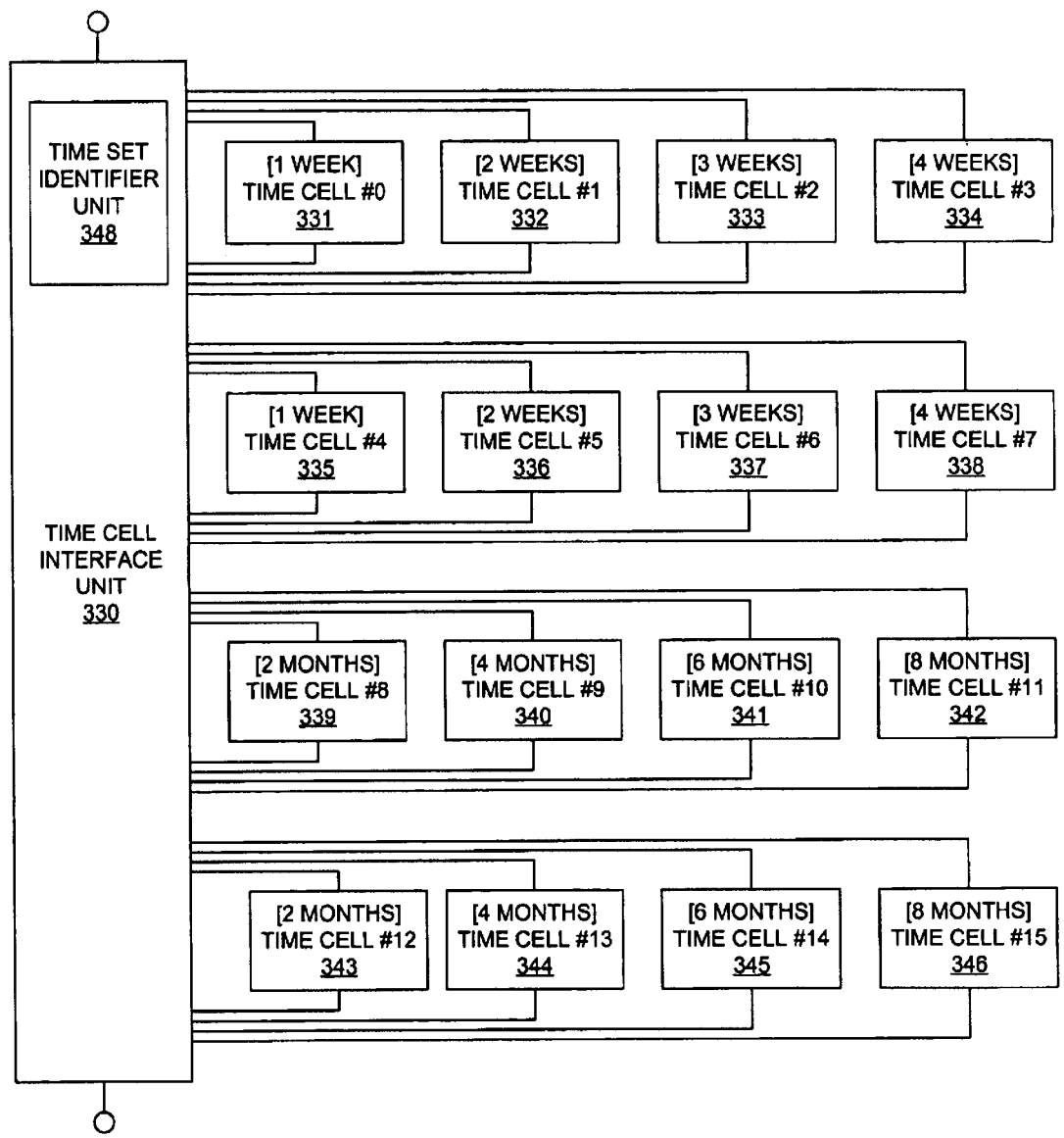
Figure 3C:
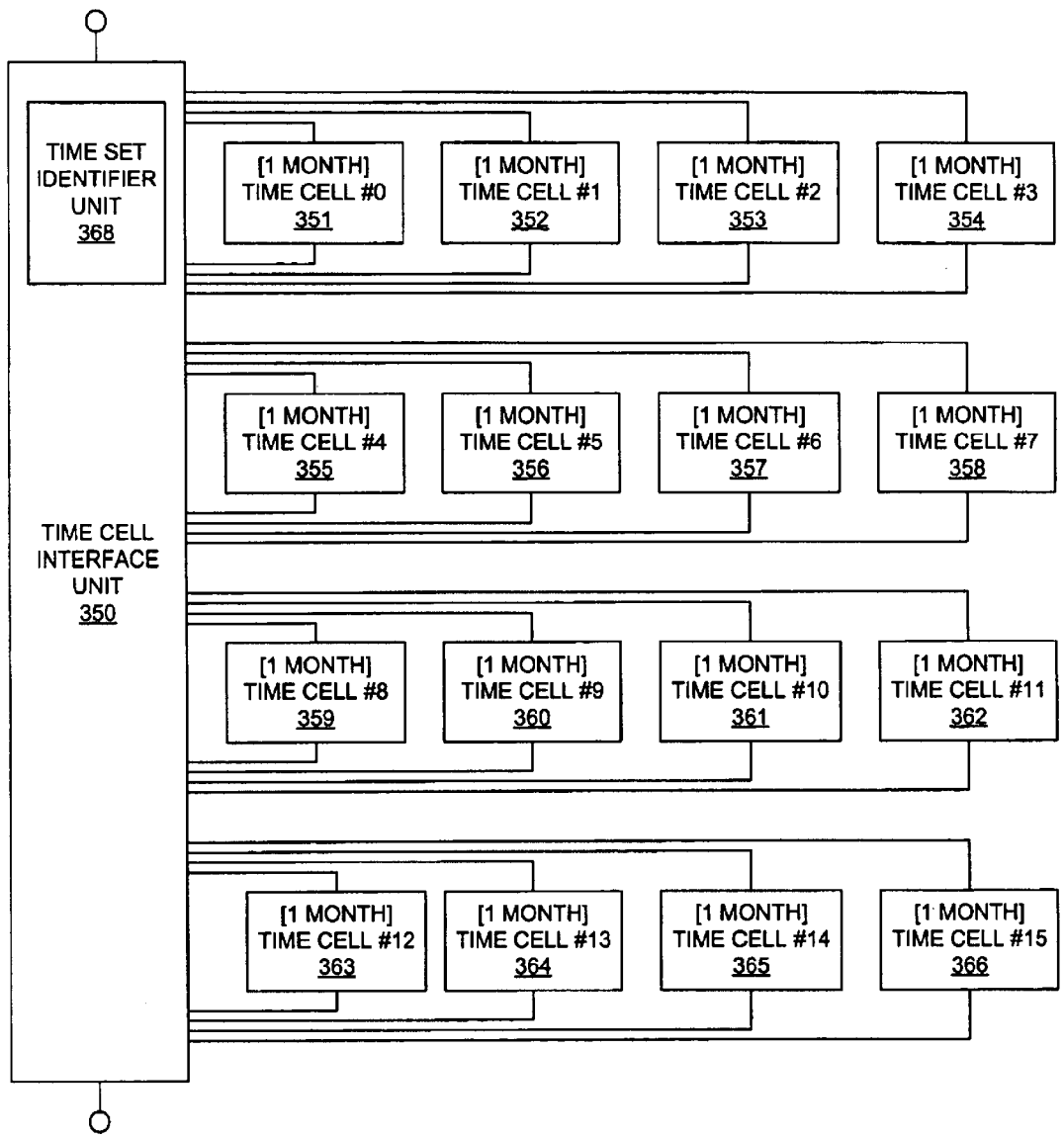
Figure 3D:
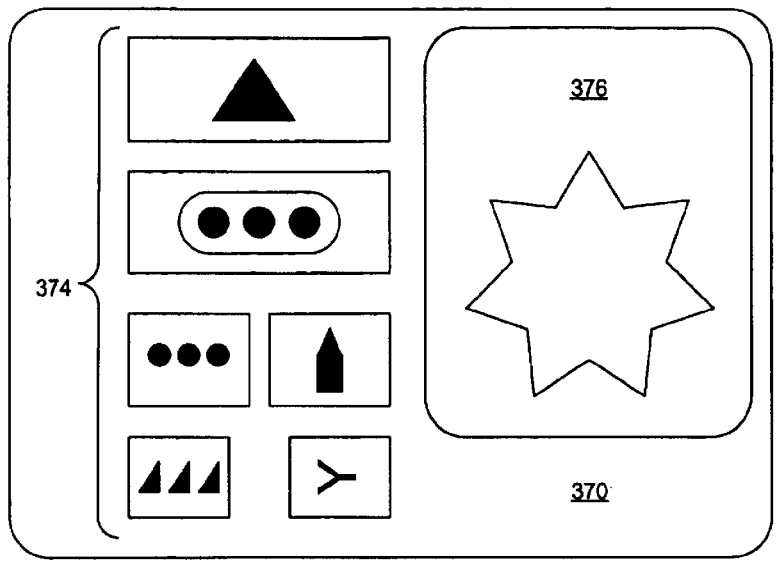
Figure 3E:
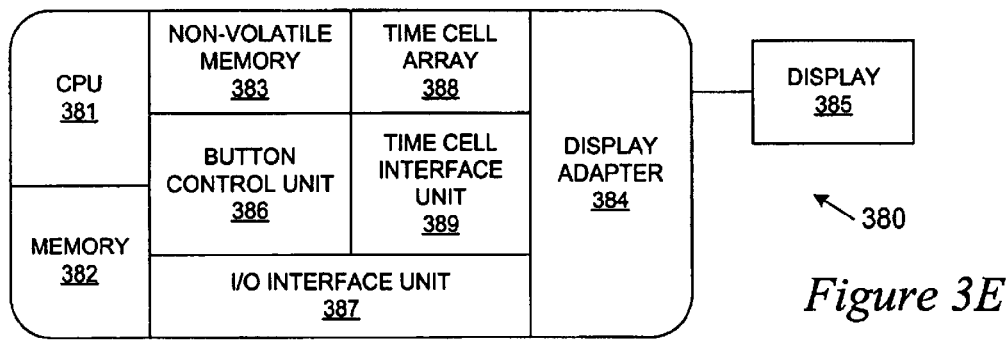
Figure 3F:
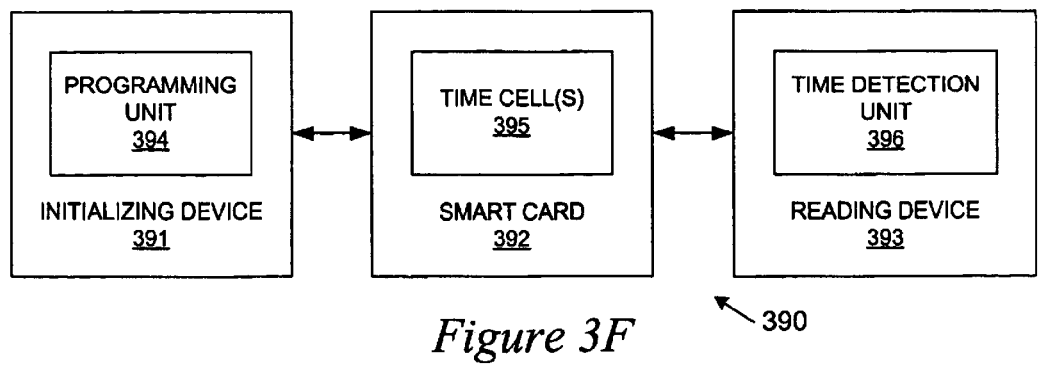
Figure 4A:
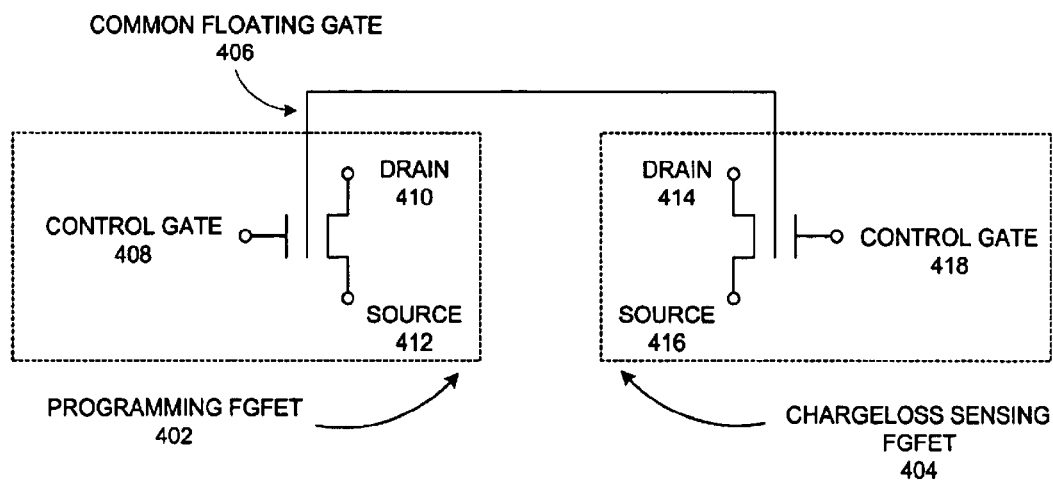
FIG. 4 is an alternative preferred embodiment of the present invention used in a self-scanning application.
Figure 4B:
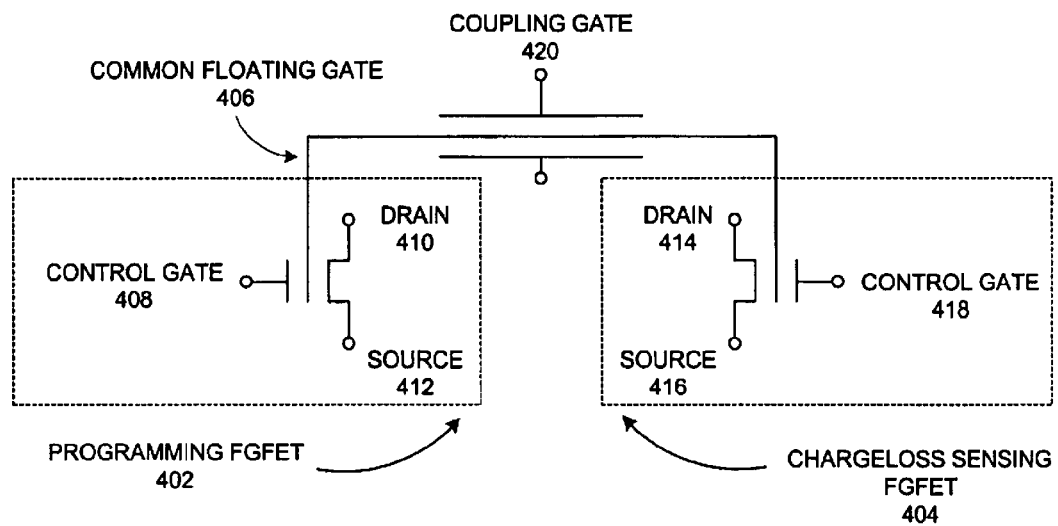
Figure 4C:
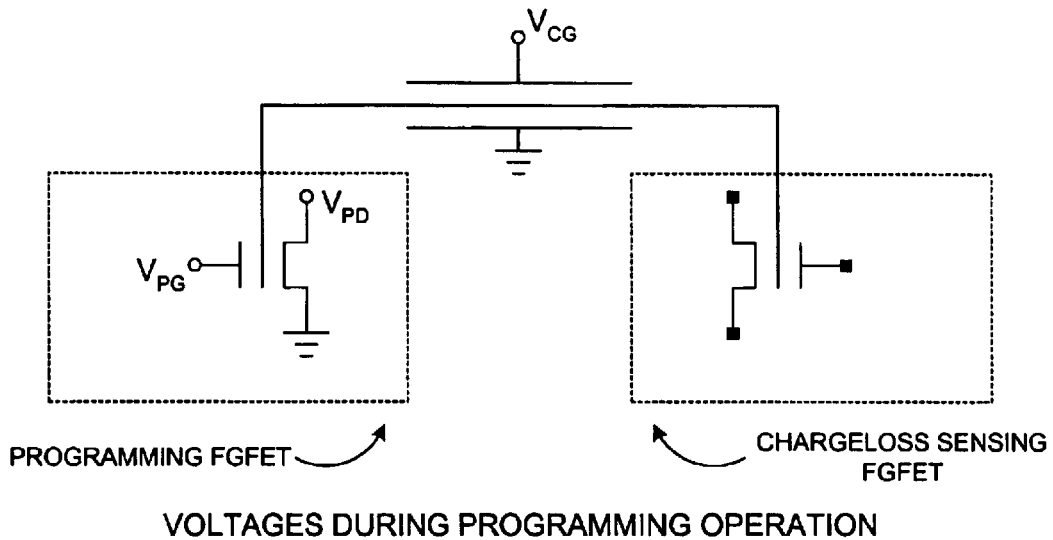
Figure 4D:
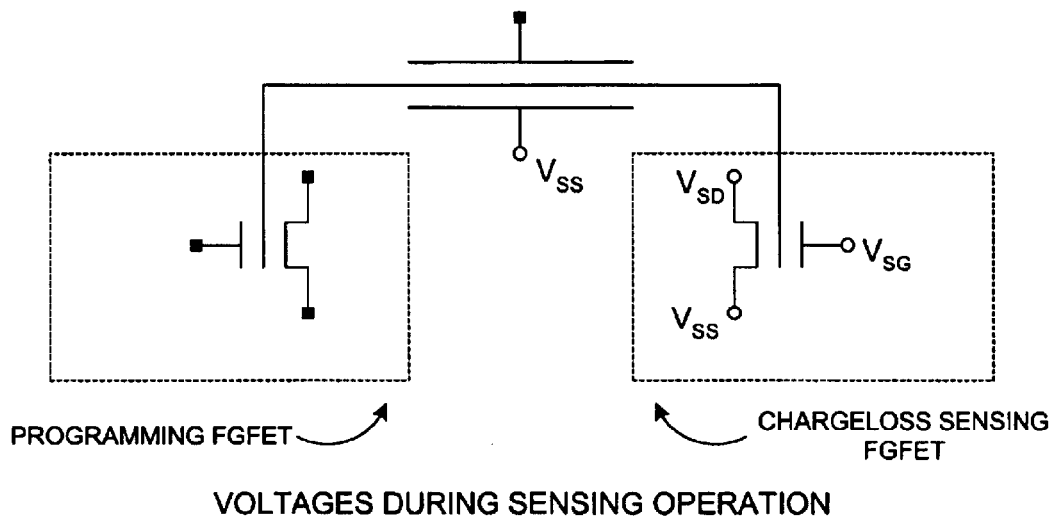
Figure 4E:
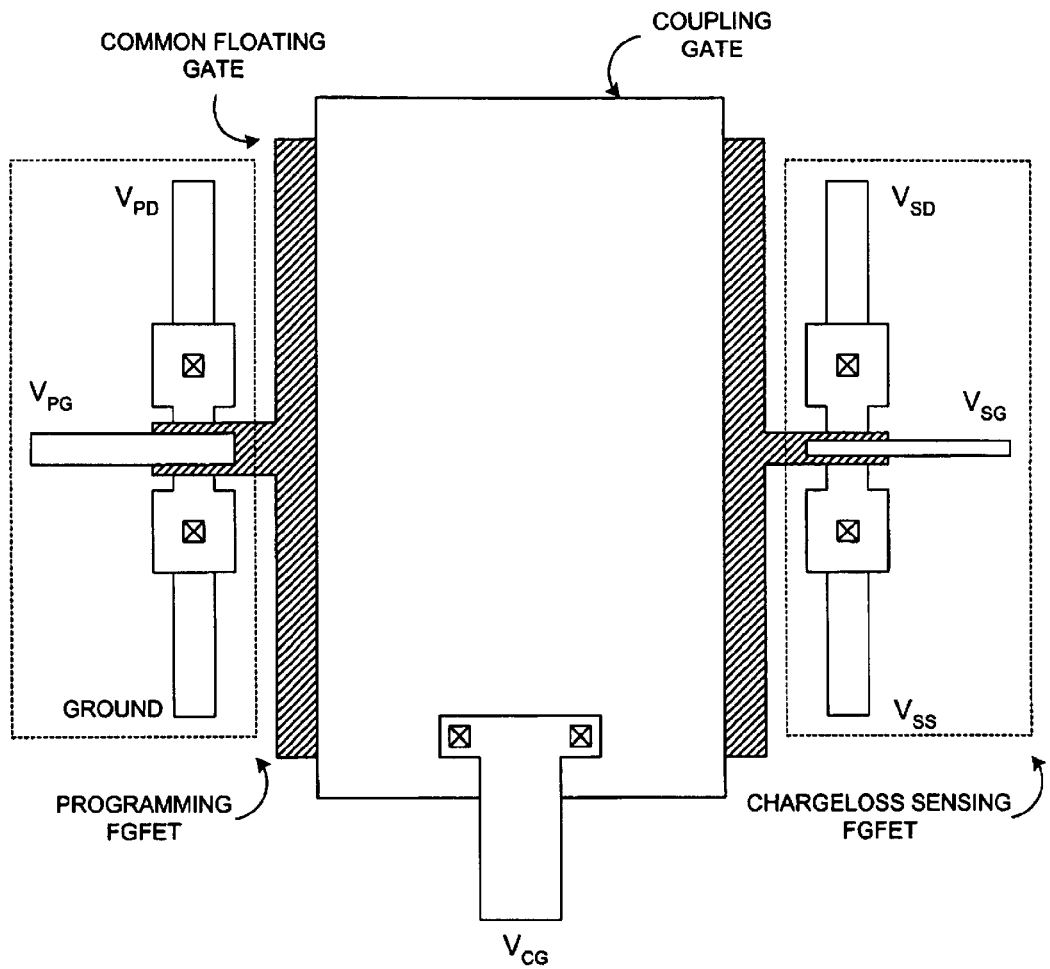
Figure 4F:
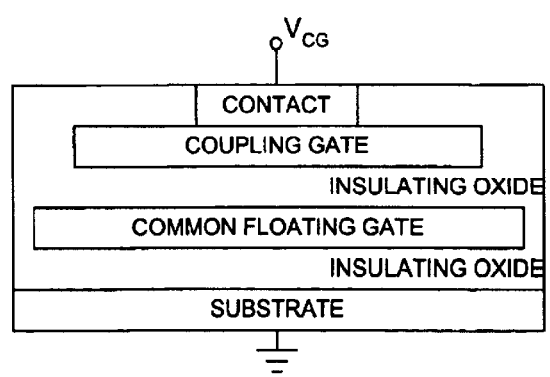
Figure 4G:
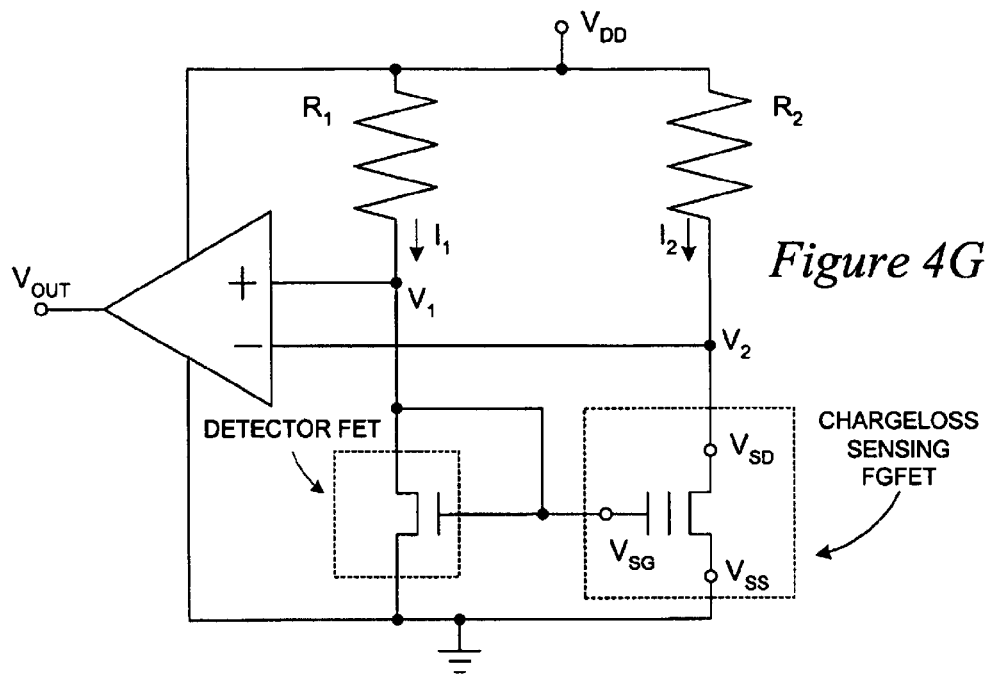
Figure 4H:
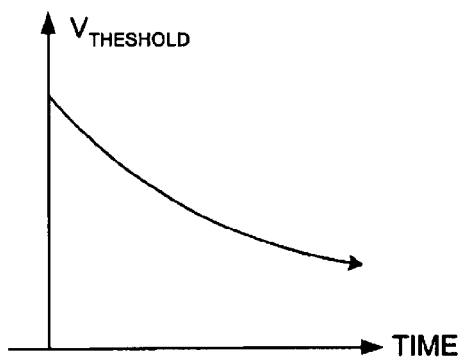
Figure 4I:
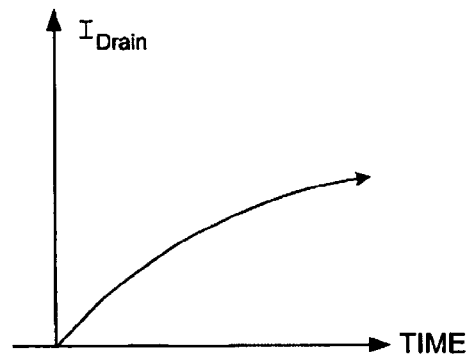
Figure 4J:
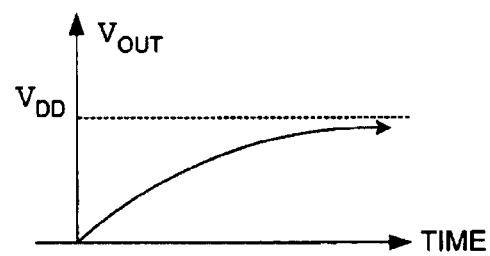
Figure 4K:
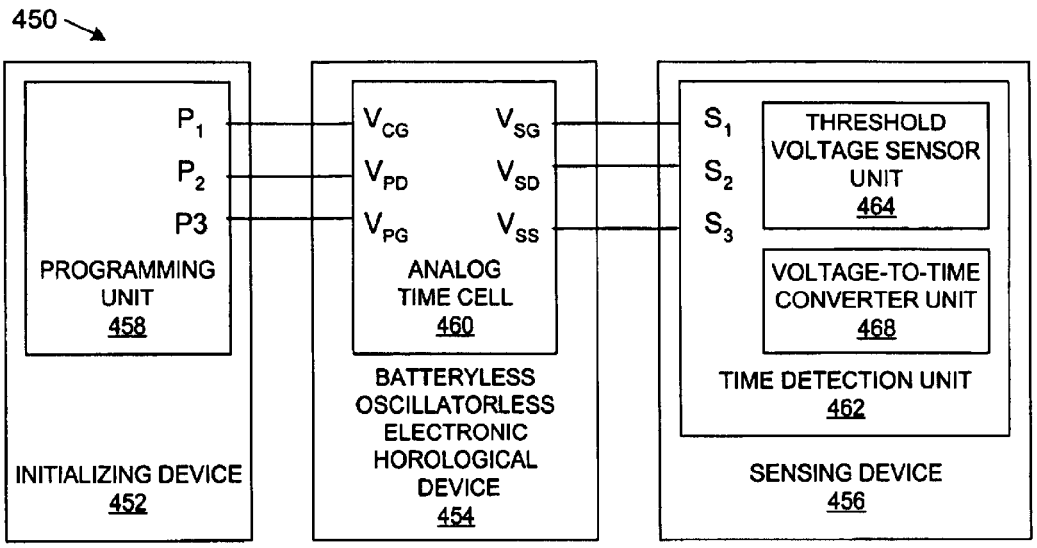
Figure 4L:
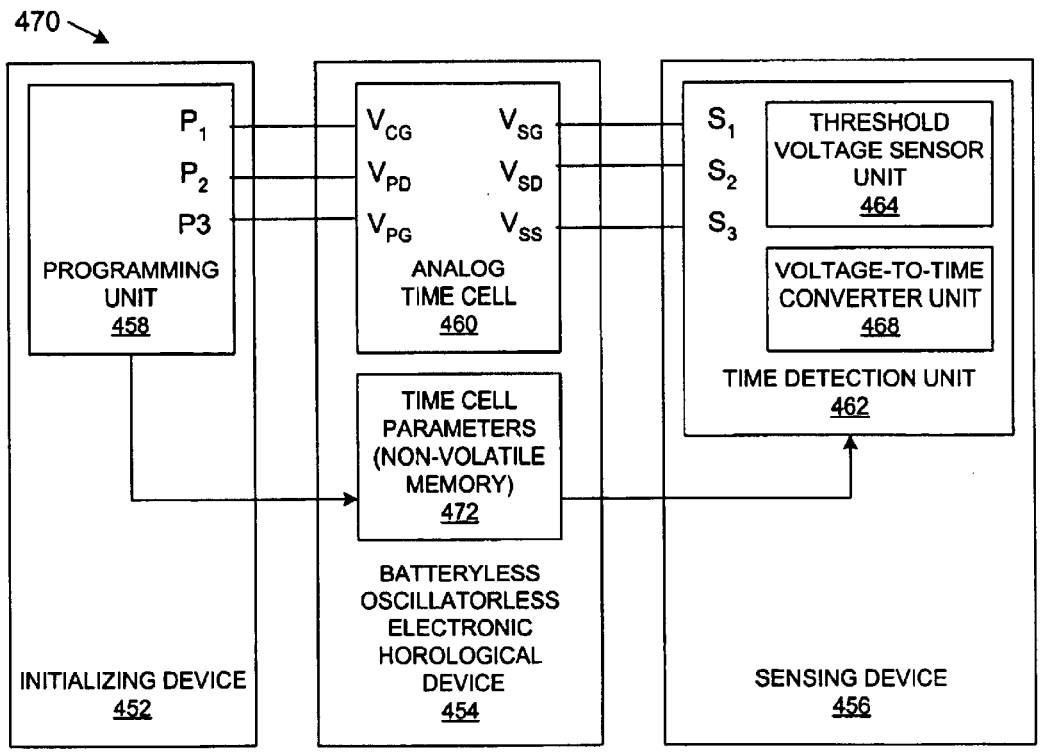
Figure 4M:
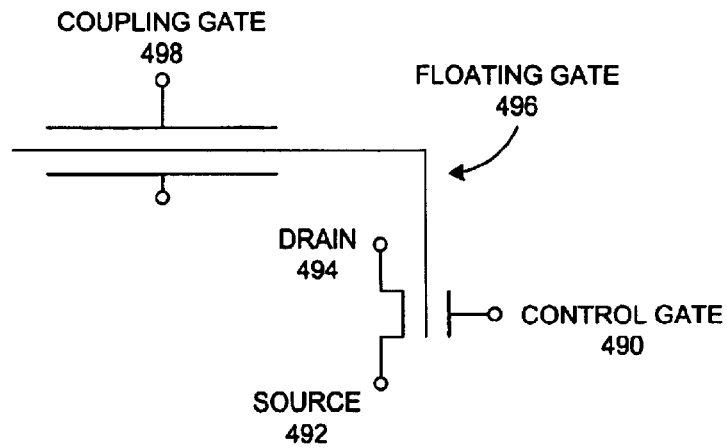
Figure 4N:
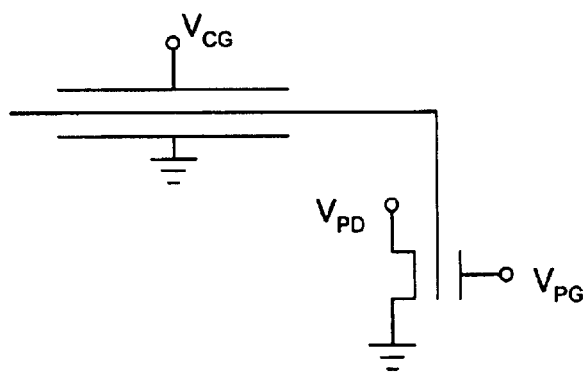
Figure 4O:
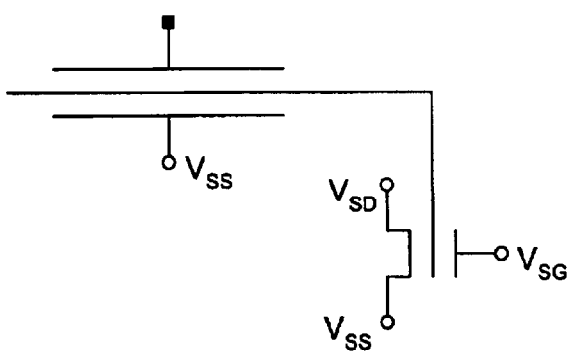
Figure 4P:
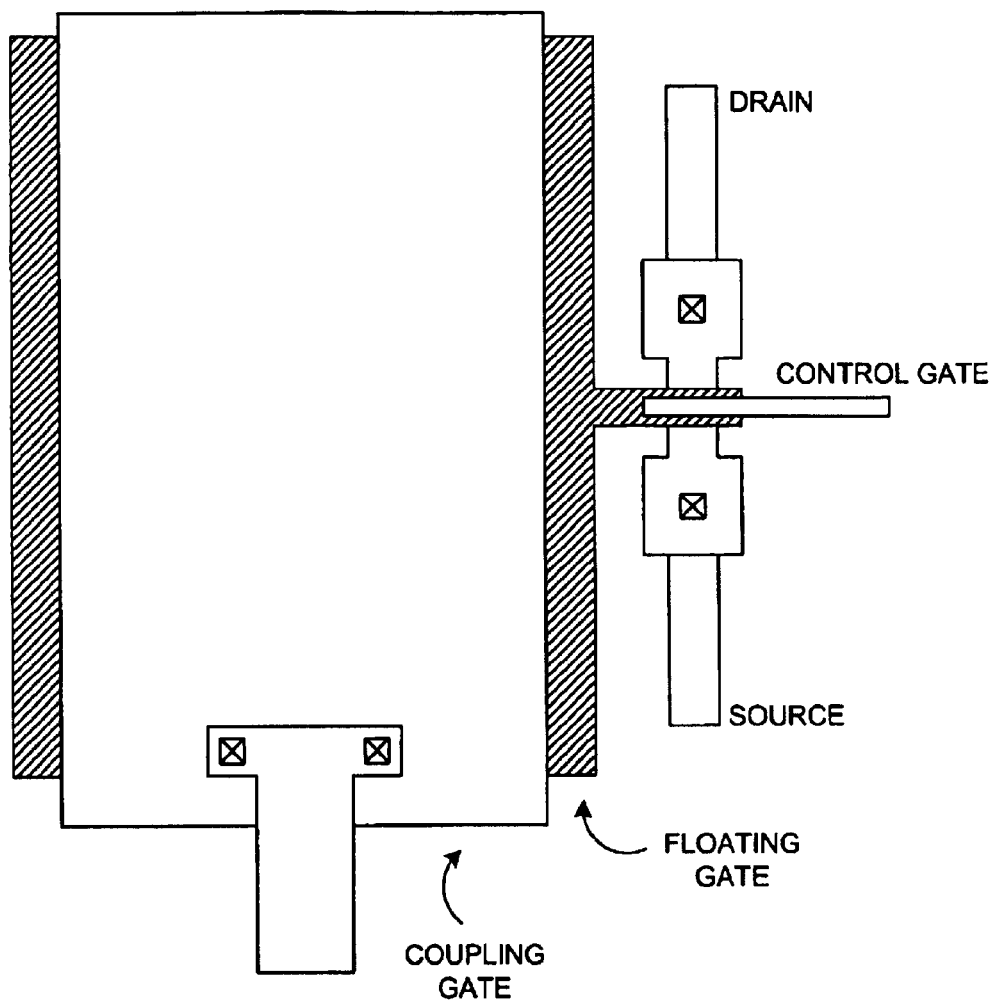

In a further embodiment of the present invention, the customers can access on the portable terminals lists of previously purchased items. The portable terminal may be able to access a list of previously purchased items from its memory, a remote storage facility or the central host may deliver the list to the customer's portable terminal. The purchased item list can be sent to an email address on a customer's computer 45 (FIG. 1), the customer's portable terminal, or in the alternative, the central host makes available on a customer accessible but password protected web page the customer's prior purchase records and a complete listing of available items at the store. As described in FIG. 10, the customer may then select items for inclusion on a customer specific shopping list by checking specific items which are to be purchased and the quantity required for purchase. By using the item selection method, i.e., selecting from a store's list of available goods, the list may be used to prompt customers on their next visit to the store the exact location and price of the selected items on the list by ensuring that the notation used by a customer for items selected for purchase will match the product identifiers used by the central host. The above described shopping list system also permits for home delivery of items because of the assurance of a match between items selected by a customer and items including brand, quantity and price available at the facility.

8. Store Layout

In a preferred embodiment of the present invention, the portable terminal includes a graphical user interface that simulates a store layout, i.e., aisles with items in them as they are stacked within the store. This permits the user to find items within the store. Customers, store employees and other personnel who stock the shelves may use the graphical representation of the store layout. This allows real-time modification of the store layout. Thus, if a store wants a distributor of pretzels to stock the pretzels to a new aisle, the customer, store employees and the pretzel distributor will all be working from the same store layout plan. A user of the system could print out a picture of the store layout from a kiosk or other terminal linked to the network.

In a preferred embodiment, the system can assist a customer in finding items on the customer's shopping list. The items on the list may be represented by graphical images and these images may blink indicating the location of the items the customer intends on purchasing. The system may also allow a customer to enter the name of an item he is trying to locate. The name of the product the customer is trying to locate may be entered by the user in accordance with the product entry capabilities discussed above. When the customer enters the name of the item he is interested in, the portable terminal will provide directions either in graphical format or identification of the aisle and shelf number.

The graphical user interface can also be used by the customer at home or on the road as part of a "virtual shopping" visit using a remote terminal such as a portable terminal or home computer. The customer could view the simulated store layout on the remote terminal over a wide area network such as the World Wide Web. For a more realistic representation of the items on the virtual shopping visit, the layout could be shown in 3D. The layout would include graphical icons that represent the products available for sale by the merchant. The virtual representation could also include promotional messages that appear to be near or on the shelves of the virtual products. The promotional messages would simulate messages that are commonly seen throughout stores. The virtual display may take up only a portion of the monitors display reserving a portion to display messages or promotions for certain items. The entity that manages the system, e.g., a store, could receive compensation from companies that want to provide a message on the customer's display.

As the customer views items on the virtual visit, he can select items for purchase. The simulated store layout may appear on the monitor just as the items are located at the physical store. Thus, customers who are familiar with a store's layout would feel comfortable navigating through the virtual aisles and shelves. Instead of walking through the aisles of a store, customers can browse the virtual aisles by moving a mouse. If the customer is interested in purchasing any of products represented by the graphical icons, he could simply input his request on the remote terminal. For example, by double clicking the mouse or dragging the graphical icon, the customer can add the product to his virtual shopping cart. Similarly, the customer could click on one of the promotional messages and receive a discount off the price of the product being promoted. After the customer has completed his product selection, he could arrange to have the products shipped to his home (as described more fully below) or the merchant could set the products aside for the customer to pick up.

The software necessary to operate the virtual shopping visit could be loaded onto the remote terminal as plug in software. After a customer logs onto the system, an identification code is sent from the remote terminal to a host computer associated with the merchant. The identification code identifies the particular customer. The host computer can then access files in the customer profile database associated with the customer. Since most of the processing necessary to manipulate the images on the display is done locally, there are minimal delays caused by sending information from the host to the remote terminal. To further limit the information sent to the remote terminal, the product profile database and customer profile database could be stored locally on the remote terminal. The host would send minimal information to the portable terminal or home computer such as updated prices, new product information, new product locations and new messages.

9. Assistance Button

In a preferred embodiment of the present invention, the customers have access to a button to request assistance from store personnel. The term "button" is not limited to a physical element. It includes any type of indicator that a customer can engage. For example, the button may include an entry on a touch screen or a vocal command. The customer may engage the button from a portable terminal, kiosk or a dedicated assistance button located within a store. Store personnel can go directly to a customer using the real-time location tracking circuitry previously discussed. If the customer requests the location of a particular product, the customer can be provided with directions relative to the customer's current location. Alternatively, the customer may communicate with store personnel through the portable terminal or the kiosk. The communication may be verbal, verbal with video or written messages.

After a request for assistance, the system may determine which of the store employees should address the customer's requests. In the event the customer provides information about the nature of the request, the system will be able to make a better determination as to the best employee to service the customer. The determination of which employee should service the customer may depend on the location of the customer, the distance between the customer and the various store employees, the nature of the customer request, the relative value of the customer to the store's profits (e.g., special attention may be provided to customers who purchase many high margin products), etc. Alternatively, the customer could be serviced by the next available store employee. A store employee having his own portable terminal may communicate with the customer as the employee is walking toward the customer. Thus, there is less wasted time since the customer is being assisted while the employee is in transit.

An employee from a store may also need assistance from other employees of the store or employees from other stores in the chain. An employee may be able to transmit a message (voice or display) on his portable terminal requesting assistance. The request message can be sent to the portable terminals of multiple store personnel. For instance, the employee who needs assistance may be trying to locate a specific product for a customer. The employee can transmit a request message to warehouse personnel and/or personnel from other stores. The request message includes information identifying the employee making the request. If any of the personnel who receive the message can assist the requesting employee, then can reply to the message with the relevant information. The reply message may be sent to all of the personnel who received the original message so they know that the request has been fulfilled. The reply message can be sent from a remote terminal or any other terminal connected to the LAN and/or WAN.

In a preferred embodiment of the present invention, the system can be used to check a price on an item. Often some items in a store do not have a code associated with them (i.e., a UPC code) or the code has somehow been damaged to a point where it cannot be read. This often leads to the notorious request by a customer or cashier to get a "price check". Typically, today the price check requires communication to a store employee who has a particular expertise in the item in question. This employee often has to inspect the item (or have it described to him in sufficient detail). Next, the employee determines the appropriate price and/or stock keeping code. Finally, this information is relayed to the person who made the original request. In a preferred embodiment of the present invention, the price of an item can be determined in a more automated, less time consuming manner. The portable terminal (or kiosk) can be used to take an image of the item in question. The image may be a single view of the item or a view of the item from different angles. The image may be transmitted electronically to an employee's terminal or portable terminal. The employee determines the appropriate price and/or stock keeping code. Instead of verbally relaying this information, the employee can transmit the necessary information to the party who requested a price check. In an even more automated embodiment of the present invention, a computer may determine price and/or code information for improperly labeled merchandise. The image of the item in question can be sent electronically to the computer. The computer compares the image of the item in question to images in a database that correspond to products available for sale. If the computer finds a match, the computer accesses the necessary price and/or code information. This information can then be transmitted to the person who made the request for a price check.

The system monitors and records customer assistance requests. After each request for assistance, the system records the time and date of the request and the location where the request was made. Preferably, store employees who service the customers have their own portable terminal or other device for providing assistance feedback. For instance, the assistance feedback may include the time the employee starts to service the customer, the time the employee finishes servicing the customer, the identification of the employee who assists the customer, the nature of the customer's inquiry, whether the customer was satisfied (this particular item may be provided by the customer or the store employee), whether any further action is required, etc. The system is able to process the assistance feedback and provide related reports. For example, system may determine the average time an employee spends on each customer request, the average time a customer waits before he receives assistance, the number of customers an employee services in a day, the percentage of customer requests relating to certain problems (e.g., percentage of customers requesting price checks), the number of requests received by hour, etc.

The system may also provide alerts if customer requests are not addressed in a timely manner. For instance, a store may determine that no customer should wait more than 90 seconds before being assisted. If a customer is not provided assistance within this time, the system may send a message to a manager.

10. Notification Feature

The system may also allow a customer to receive on a portable terminal a notification that an order has been fulfilled or is about to be fulfilled. The order may have been placed at a deli counter, pharmacy, film developer, tailor, etc. Alternatively, the customer may have placed the order from a portable terminal, kiosk or home computer. The customer may pick up the order after he receives the notification or the store may track the location of the customer and bring the order directly to the customer. In one embodiment of the invention, the notification may be sent to the portable terminal when the customer is in the vicinity of the ordered product. For instance, as a customer is near the film developing area, he may receive a message notifying him that his photos are ready. The notification may be sent over multiple devices designated by a customer. For instance, the notification may be sent to any combination of the following devices: portable terminal, cell phone, personal digital assistant, and home computer.

The system may also allow a customer to sign on to a queue. The queue may be for a checkout line, placing orders, requesting assistance, etc. For instance, when a customer is near to completing his product selection, he could indicate that he would like to sign on to the queue. The system could then assign to the customer a position within the queue. The system may provide to the customer a "window" wherein the customer can proceed to a cashier checkout counter or security check counter. For example, if the customer indicates that at 9:30 am that he wants to sign on to the queue, the system may provide to the customer a window of 9:35 through 9:40 am to show up at the counter. If the customer does not show up within the window, the system may provide a second window, e.g., 9:45 through 9:50 am. Alternatively, instead of providing the customer with a window the system may provide the customer with a number indicating the customer's relative position within the queue.

The customers' position within the queue may be determined by the order in which customers sign on to the queue. The system may also consider many other factors in assigning positions within the queue. For example, the system may consider the number of products and/or the types of products selected by the customer, the relative value of the customer to the store (frequent shoppers and customers who purchase high profit margin goods may be given a better position), the probability that the store will audit the customer, whether the customer is elderly or handicapped, etc.

11. Delivery/Home Shopping

In a preferred embodiment of the present invention, the customer may shop for products from a location remote from the merchant such as the customer's home. The selection of items may be made through a graphical use interface which simulates a store layout, i.e., aisles with items in them as they are stacked within the store. As described above, this permits the user to find item he knows are located in certain aisles of the store. Once the customer has completed his selection the shopping list is also provided with a general comment section to provide special instructions to the store or reminders to the customer. It is preferred that the central host acknowledge receipt and recognition of selected items by email response or telephone call to the customer's location. In the event of an email order for home delivery, it is also preferred that the customer receive a telephone call to ensure that the customer has in fact placed the order and to provide credit card verification information if the order is to be paid in the form of an electronic fund transfer.

The system may also allow a customer to have access to certain records stored on the host computer. The customer can access this information remotely from the personal terminal or from his home computer. For instance, the customer may review prices, product inventory, information about products and the location of products within the store. The customer may also be able to obtain information about any items the customer has previously bookmarked.

In one embodiment of the present invention, a customer may provide access to the customer's electronic shopping list to a selected group of merchants (including internet vendors). The shopping list may be stored on the customer's portable terminal or home computer. The merchants may directly access the shopping list from a wide area network link or the shopping list may be sent to the merchants in an email format. After receiving the shopping list, the merchants can place bids to receive the customer's business. The merchants may offer to sell all of the items on the shopping list or only a select number of items. The shopping list may also be provided to a company that specializes in receiving orders, picking up products from a merchant and delivering the products to customers.

The order entry system can be manipulated to provide pick-up service, emergency delivery service, same day delivery service and regularly scheduled delivery. A customer may have staple items delivered every Saturday and supplement such deliveries with other delivery services as needed. In the event of an emergency, such as a customer who runs out of baby food, formula and diapers, the customer may order emergency delivery service. The store can promote various services by charging (or giving discounts) as is appropriate under the circumstances (i.e., traffic conditions of the system). In the event of regularly scheduled deliveries of staple items, the system may be provided with redundancy features and confirmation notices to ensure that the customer will require the items to be delivered on the next regularly scheduled delivery, and ensure that the customer is not away on vacation. The system could require that a customer respond to a confirmation notice such as an E-mail message or an automated telephone query, i.e., this is an automated confirmation system for your delivery scheduled for tomorrow morning, please press I to confirm the delivery, press 2 to cancel delivery, press 3 to reschedule the delivery.

Once the customer's order has been placed electronically, a store attendant using a portable terminal of the present invention is prompted to collect items for delivery to the specified customer. The attendant collects and scans items which have been selected for purchase. In the event a product is not available because it has been depleted subsequent to the order being placed, the attendant is provided with an out-of-stock marker. The marker could be a bar coded command on a bar coded command sheet provided to the attendant which could include scannable instruction codes such as "Begin new client collection," "Out of stock item," "Suspend client collection," "Cancel client collection" and "Scan bag for client." For example, in the event the item selected by the customer for purchase is out-of-stock the bar coded command indicating that the item is out of stock is scanned by the attendant. The shopping list delivered to the customer is then modified to indicate the item has not been included for delivery to the customer. In a preferred embodiment of this system, the customer may mark items as "essential" or "required for delivery" so that key ingredients (as in recipes) are not omitted which would make the rest of the requested items unnecessary. Thus, if a customer selects items on a list based on a recipe which is suggested on the store's home page, and a critical element is not available, all the items on the recipe may be withheld. This "requirement" condition can be tagged to the complete list or simply a portion of the list using any number of methods which would become obvious to one skilled in the art subsequent to reading this description. Essential items could also be linked to or marked with alternative products.

Figure 12:
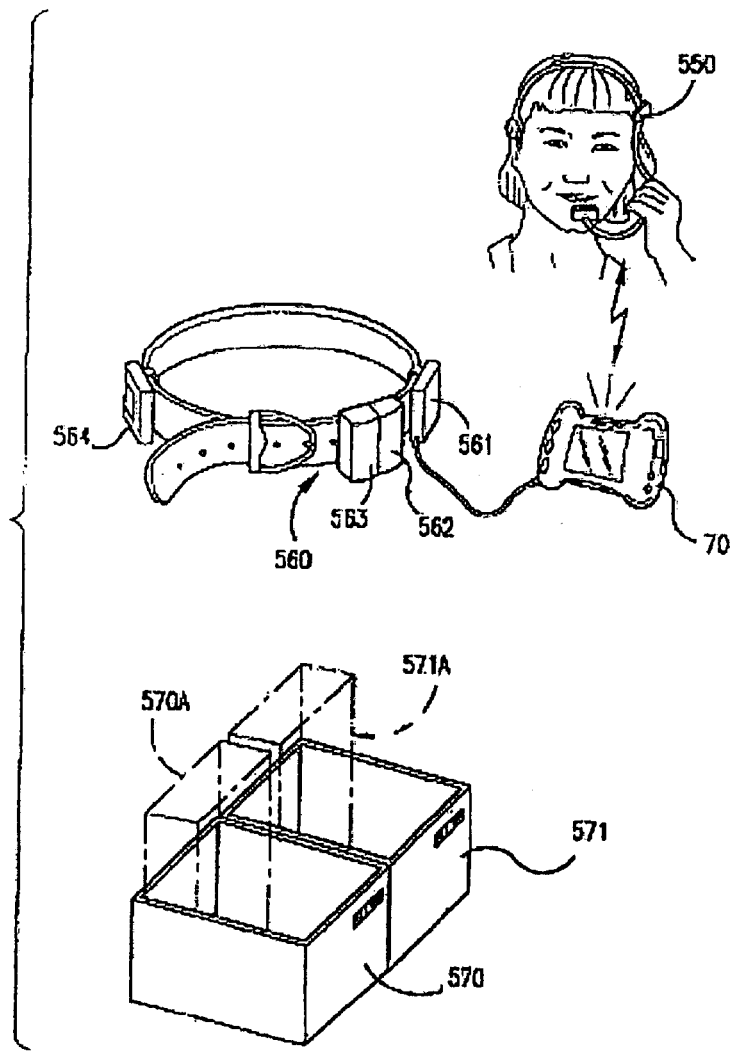
FIG. 12 is an alternative preferred embodiment of a terminal system for use by an attendant in filling customer orders.

FIG. 12 illustrates an alternative preferred embodiment of a system of the present invention which may be employed by an attendant collecting items for delivery to customers. In FIG. 12, a voice headset 550 is shown which uses a narrow band radio for communicating data to and from the portable terminal 70. In the event the attendant uses the terminal for extended time periods, a wearable battery pack 560 may be provided to supplement the battery of the terminal 70. In an alternative preferred embodiment, the terminal could be a wearable design for ease of use by the attendant. Examples of such a wearable design are illustrated in U.S. Pat. Nos. 5,514,861; 5,250,790; 5,543,610; 5,340,972; 5,191,197; 5,410,140; and 5,416,310; all of which are assigned to the assignee of the current invention.

The items collected by the attendant may be placed in the containers 570 and 571. These containers can be supplemented with bags 570A, 571A and are preferably provided with bar coded tags. These tags may be registered by the attendant with the terminal 70 and associated with a specific customer. This permits an attendant to collect items for multiple customers with one pass through a store. Preferably, the attendant scans the selected item, places the item in the bag 571A and then scans the bag label. This assures that the article is placed in the correct bag, and can provide confirmation that a scanned item is bagged for the desired customer.

In the event the attendant uses the system frequently, it will be preferred to provide a bar code scanner which is easy to use and light weight. This can be scheduled by employing a body wearable terminal design such as that illustrated in FIG. 12. The belt 560 could be provided with all the necessary terminal functions through modular packs 561–564. Battery 561 could be supplemented with a CPU component 562, a radio module 562, memory board 563 and audio/video module 564. These systems would communicate with a headset 550, a wrist-mounted display, and a wireless ring scanner. It is preferred that these components employ a wireless communication data line which permits multi-channel communication to the CPU component 562, and that the belt modules be connected using a flexible cable connector data bus.

As a result, a customer's shopping list will be subdivided into a series of lists with related items which a customer may redesignate for his own purposes. Once the attendant has completed the collection process, the attendant prints out customer stickers that are placed on bags used to transport a customer's selected items to the customer's delivery location. The attendant may be provided with a portable printer which is commercially available from Symbol Technologies, Inc.

In order to improve on the efficiency of the delivery system described above, it is preferred that the customer include a delivery time window and location in their delivery requests. Once these entries are entered into the central host, the central host will order the collection of home delivery orders so as to provide for the delivery to customers located in proximity to each other in both location and delivery time periods. In addition, a customer's shopping list may also be reorganized by the central computer to account for efficient collection of goods for the attendant relevant to current location. Thus, all of the items in the same aisle will be grouped together for collection by the attendant and once a location within the aisle is identified by the scanning of a current or prior article, the order will be reordered to provide for the ordered selection of goods within the aisle. This dynamic reorganization of items allows for real world situations in which an attendant may be called away for a moment or simply proceeds in an inefficient direction.

The attendant could also be provided with a "bag" link on the portable terminal. Each bag may be provided with a unique coded identifier. Once the attendant begins using the bag for a particular customer's products, the attendant can scan the bag code with the portable terminal using the "plus" key. The portable terminal will identify this as a bag containing customer products and automatically associate the bag to the customer. The identification of the bag and contents is stored on the system and may be forwarded to a customer via E-mail or made available with a password protected web page. In a preferred embodiment, these "bags" could be reusable totes electronically matched to a customer identification code, and upon each delivery to the home, totes from the last delivery are retrieved and returned to the store.

Figure 6:
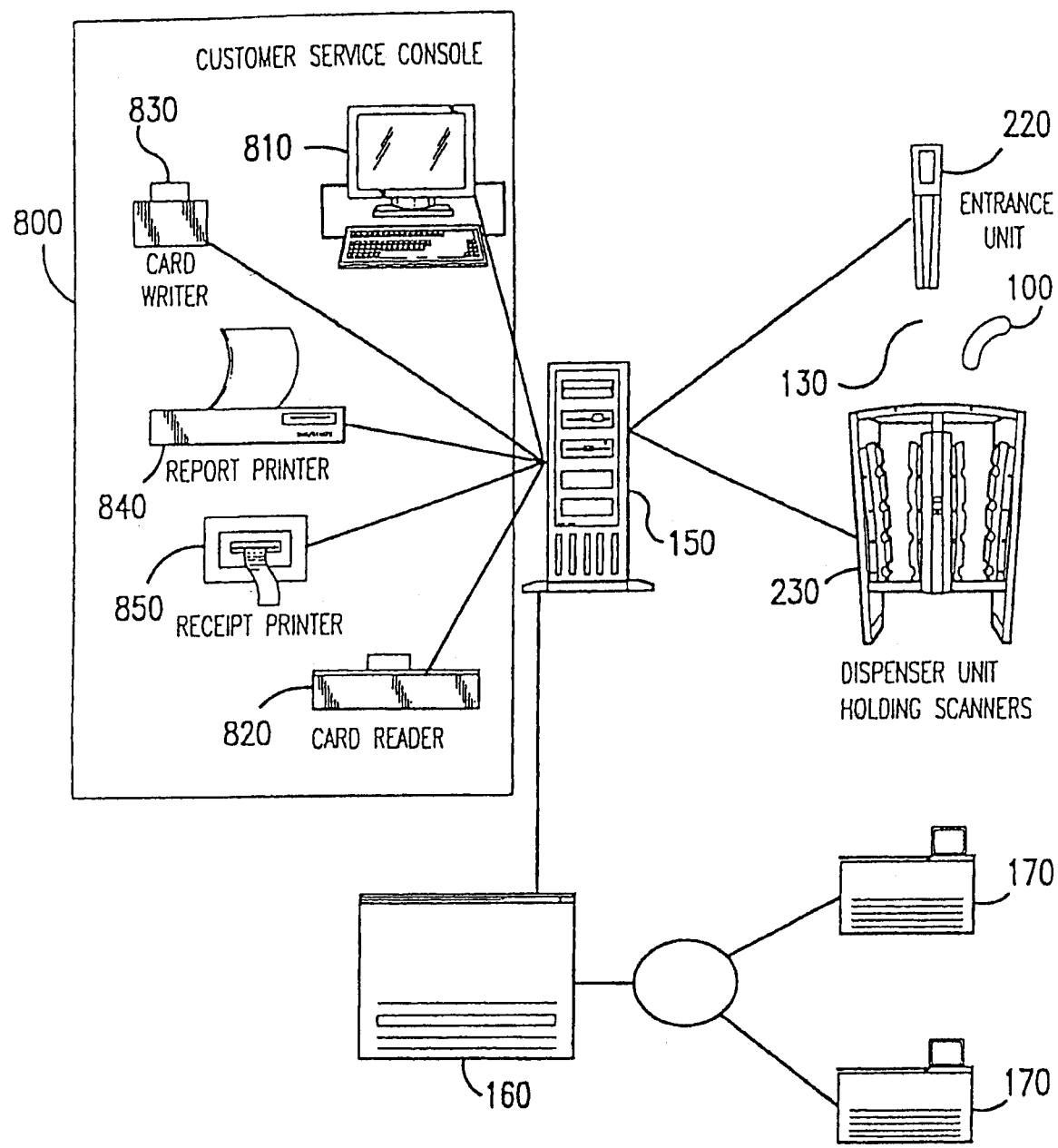
FIG. 6 is an alternative preferred embodiment of a system of the present invention employed in a self-scanning system.

In the event a customer selects the item for collection and pick-up at the store, the customer may proceed to a service desk shown in FIG. 6 to make payment and receive a receipt. The customer desk 800 is provided with a service console 810, a card reader 820 for identifying a customer loyalty card, a report printer for generating report data for the customer, a card writer 830 and a receipt printer 840. The customer may settle his account and proceed to collect his bags of goods.

D. Delivery Tracking

In the event a customer selects a delivery option, in a preferred embodiment of the present invention the delivery attendant is also provided with a portable terminal of the present invention. In addition, regular customers will be provided with machine readable labels at their delivery site. The delivery site may include a refrigerated storage compartment or simply a storage box. The attendant scans the items delivered and the machine coded destination label. This information is delivered to the central host via a wide area network communication interface. In the event no customer is present to accept the delivery and items are included which are not acceptable for delivery in the assigned receptacle, i.e., frozen items in an un-refrigerated compartment, the portable terminal will notify the attendant not to leave at least those bags including spoilable items in the container, and to immediately communicate a message, by E-mail or telephone, of the failed delivery attempt. In the event the message is received by the customer at their predetermined destination, the attendant may be signaled with the portable terminal to redeliver the items.

This system provides dynamic tracking of goods which can be accessed by the consumer. In the event the consumer wishes to find the status of their order, they can log onto the central host with a networked computer or automated telephone system and receive a notice as to the last known location of the items to be delivered and expected time of delivery.

Figure 13:
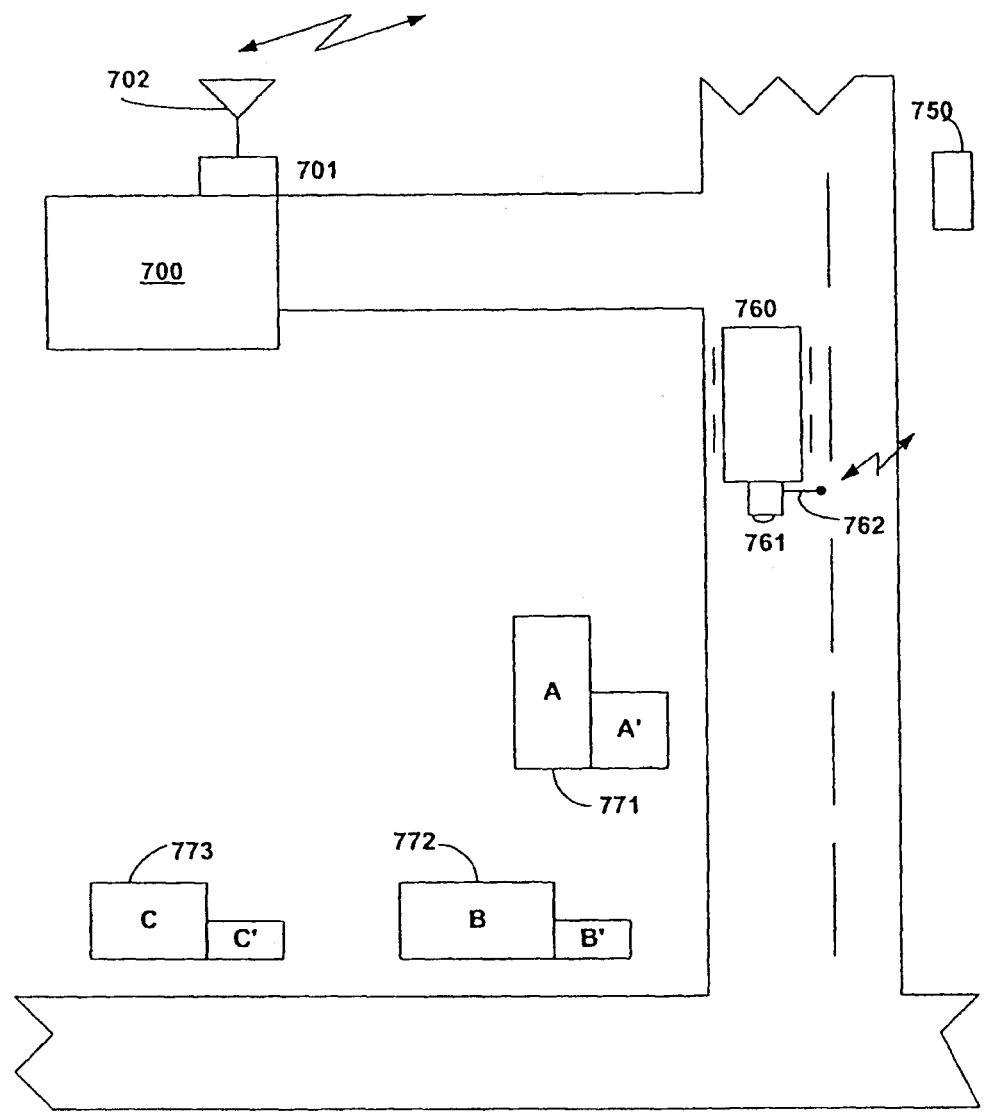
FIG. 13 is a block diagram of a preferred delivery system for an order fulfillment system.

In FIG. 13, a preferred embodiment of a delivery system is illustrated. A truck 7600 is loaded at a warehouse facility 700 with packaged items for delivery to customers A, B and C. The truck is provided with a portable terminal (not shown) and a vehicle mount cradle. In order to supplement the battery life of the portable terminal is provided with a recharging cradle which recharges the battery in the portable terminal when it is not in use. The cradle is also provided with a signal step-up antenna which receives the radio signal generated by the portable terminal and retransmits it to a wide area network access point. This permits a portable terminal employing a wireless radio having limited range to communicate over a wide area network without heavy consumption of battery life.

Figure 14:
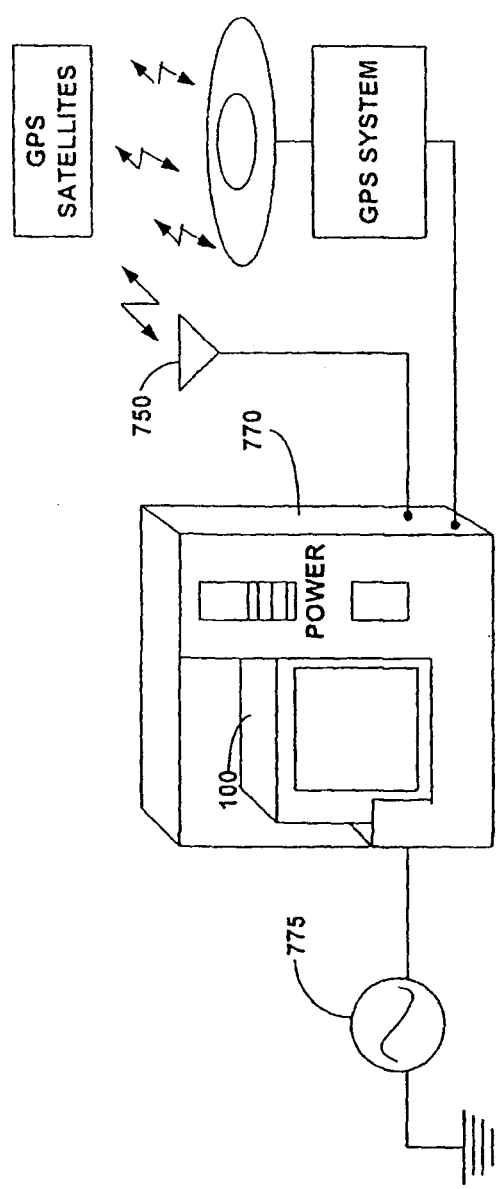
FIG. 14 is a preferred embodiment of a vehicle cradle system for a delivery system of the present invention.
Figure 15:
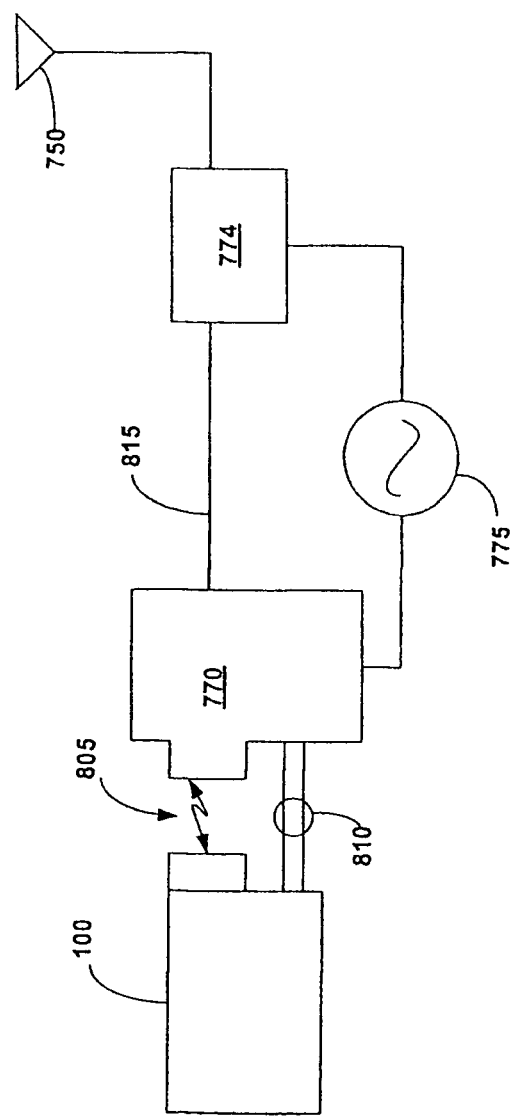
FIG. 15 is a block diagram of the vehicle cradle and terminal system illustrated in FIG. 14.

FIG. 14 illustrates a vehicle cradle 770 connected to a battery source 775. FIG. 15 illustrates a portable terminal 100 in communication with a cradle 770. The systems communicate via an IR connector and have contacts 810 to charge the battery of the portable terminal 100. In addition, the cradle is provided with a signal generator 774 which is coupled to antenna 750. Although not shown, the IR connector 805 could be replaced with a limited range radio transceiver. In the event ground location of the vehicle is desired beyond the identification of the last customer location, the system could be provided with a GPS system as illustrated in FIG. 14. These systems are generally known in the art and will not be explained in detail herein.

E. Exemplary Applications of the Present Invention

The following are some exemplary applications of preferred embodiments of the shopping and marketing system of the present invention.

1. Dressing Room

The system can be used to allow communication between a customer and a store clerk while the customer is in a dressing room. The customer can send verbal or written messages with the customer's portable terminal or a kiosk within the dressing room. The store clerk can receive the messages on the clerk's portable terminal or another terminal. For instance, if a garment does not fit, the customer may request that the clerk bring a different size to the dressing room for the customer. The customer never has to leave the dressing room. By the time the customer removes the original clothes, the clerk may have the new clothes waiting for the customer to try on.

While the customer is in the dressing room, the system may provide information to the customer related to alternative items. The system may display on the screen of the portable terminal or kiosk a picture of the clothes in different colors and/or different styles. The system may also display and/or suggest accessories (e.g., a belt, shoes, pocketbook, scarf, etc.) that match the clothes selected by the customer. Using the messaging agent discussed above, the system displays and/or suggests items that would be of interest to the specific customer.

After the customer determines which items he is interested in purchasing, he can indicate these items on the portable terminal or kiosk. The selected items can be prepared for the customer while he is still in the dressing room. By the time the customer leaves the dressing room, his selected items may be bagged and ready to go.

2. Shoe Selection

Typically a merchant who sells shoes has a display of various shoe styles. The display includes only one size per shoe style. If a customer is interested in a particular style, a clerk asks the customer for his shoe size and the clerk checks the stock room to check the availability of the particular style in the customer's size. If another customer happens to be trying on the last pair of shoes that meet the original customer's criteria, the clerk will tell the original customer that the store is out of stock. If the store is out of stock, a clerk typically brings out for the customer the next size smaller and the next size larger, and asks the customer which one he would like to try on.

In accordance with a preferred embodiment of the present invention, each style of shoe in the display has a code associated with it. If a customer is interested in a particular style of shoe, the customer or store clerk can scan with a portable terminal or kiosk the code associated with that shoe. The customer's size can be entered at that time or the system can access the customer profile and determine the customer's size. The code is transmitted to a host computer, which accesses a database to determine the availability of the particular style in the customer's size. The customer can be informed about the availability of the shoes on the portable terminal. If the store does not have a pair of shoes that meet the customer's criteria, the portable terminal may display possible substitutions that are available. The substitutions may be a slightly different size or a different style. In the event the store has shoe requested by the customer (or the customer accepts a substitution), a clerk in the stock room can receive the customer request and have the shoes immediately brought to the customer.

If the store is out of stock and the customer does not want to accept a substitution, the store can complete the sale with the customer and have the shoes shipped to the customer. Alternatively, the portable terminal or kiosk can be used to determine availability of the shoes in other stores in the chain. If another store has the shoes, the customer can pick up the shoes or the shoes can be brought to the customer.

Typically today shoe stores only maintain records of the shoes that are actually sold to customers. The system of the present invention enables a store to maintain a record of every shoe tried on by its customers. The system could generate reports providing information about the most popular shoes and whether the store had in stock the shoes requested by the customers. The store could use this information to more efficiently stock its merchandise.

The herein described embodiments of the present invention are intended to provide the preferred embodiments of the present invention as currently contemplated by the applicants. It would be obvious to anyone of skill in the relevant art based on the herein described examples without straying from the present invention that numerous modifications could be made to the described preferred embodiments. For example, the portable terminal could take any number of forms including wearable solutions available from Symbol Technologies, Inc. and other portable solutions described herein. In addition, the graphical user interface could also be implemented as a number of different presentation schemes. Although many of the preferred embodiments have been described primarily in the context of a self-scanning supermarket application, the system could be used in any type of self-scanning application. For example, in a clothing store, the portable terminals could be used to provide information pertaining to recommended accessories which would match a selected item by providing cost, location and even a display of how two or more items would appear as one outfit. In addition, even though the remote order entry system has often been described in the context of a home computer, it could also be implemented in the form of a selection kiosk or other form of automated graphical selection device such as "WebTV" type devices through the use of a portable device that could be used both in the home to maintain home inventory tracking and in the store.

What is claimed is:

1. An interactive consumer marketing system comprising:
   a wireless shopping device that operates in one of a store mode and an out of store mode, the wireless shopping device comprising a wireless data collecting device for use by a customer at home or within a shopping establishment, said wireless data collecting device including a scanner for reading identification codes on products of interest and a memory for storing a product list;
   a comprehensive database for storing information relating to products available for purchase within the shopping establishment;
   a central host with access to the comprehensive data base and in communication with the data collecting device via an intermediate consumer presentation device, the central host further in communication with third party servers, the central host with a messaging agent that selects messages to be presented to the customer; and
   an intermediate consumer presentation device, comprising:
      a communications link for communicating with the wireless data collecting device and the comprehensive database;
      a data aggregator for correlating the products on the product list and the information stored in the comprehensive database;
      a display for presenting to the consumer an enhanced presentation of products on the product list and information stored in the comprehensive database.

2. The system of claim 1 wherein the intermediate consumer presentation device is secured to a shopping cart.

3. The system of claim 1 wherein display on the intermediate consumer presentation device is at least 6" by 6".

4. The system of claim 1 further comprising a location tracking agent for determining the approximate location of the intermediate consumer presentation device.

5. The system of claim 1 further comprising a messaging agent for providing messages to the display of the intermediate consumer presentation device.

6. The system of claim 1 wherein the enhanced presentation includes indications of which products on the product list are available at a discounted rate.

7. The system of claim 1 wherein the enhanced presentation includes only products that are offered for sale by the shopping establishment.

8. The system of claim 1 wherein the enhanced presentation includes a sorting of the product list according to the layout of the shopping establishment.

9. The system of claim 1 wherein the product list is generated by the consumer at the home.

10. A system for marketing products to a customer in a shopping establishment comprising:
   a) a wireless network for the bi-directional communication of data;
   b) a wireless shopping device that operates in one of a store mode and an out of store mode, said wireless shopping device having:
      i) a reader for registering a product identification number;
      ii) a display for displaying messages;
   c) a customer database containing data relating to at least one shopping behavior characteristic of the customer, wherein said data relating to at least one shopping behavior characteristic of the customer is modified in real time as the customer registers product identification numbers with said wireless shopping device; and
   d) a host computer associated with the shopping establishment having access to said customer database, said host computer having:
      i) a communication link for receiving the product identification numbers registered by the wireless shopping device;
      ii) a messaging agent comprising:
         a message selector for selecting a message being correlated to said shopping behavior characteristic; and
         a message sending agent for communicating said message via the communication link to said wireless shopping device.

11. The system of claim 10 further comprising a location tracking agent for determining the approximate location of the wireless shopping device.

12. The system of claim 11 wherein the location tracking agent determines the location of the customer by:
   a) accessing a product location database containing data representing products available for sale and a location identifier associated with said available products, and
   b) determining the location identifier associated with the product registered by the wireless shopping device.

13. The system of claim 10 wherein the host computer has access to a database that stores the customer's preferred payment method.

14. The system of claim 10 wherein the host computer has access to a database that stores information about a credit account associated with the customer and wherein the credit account is automatically charged when the customer completes his product selection.

15. The system of claim 10 wherein the wireless shopping device is removably secured to a shopping cart.

16. The system of claim 10 further comprising a remote computer having a communication link for communicating over said wireless network.

17. The system of claim 16 wherein said remote computer is associated with the customer's home, said remote computer having a docking station for communicating with said wireless shopping device.

18. The system of claim 16 wherein said remote computer is associated with a manufacturer or distributor.

19. The system of claim 10 further comprising a kiosk associated with a store, said kiosk having a communications link for communicating with said wireless shopping device.

20. The system of claim 19 wherein said kiosk uploads information stored in said wireless shopping device.

21. The system of claim 19 wherein said kiosk downloads information to said wireless shopping device.

22. A system for marketing products to a customer in a shopping establishment comprising:
   a) a wireless network for the bi-directional communication of data;
   b) a first shopping device and a second shopping device, the first shopping device operates in one of a store mode and on out of store mode, said first shopping device having:
      i) a reader for registering a product identification number; and
      ii) a transmitter for communicating said product identification number to said second shopping device; said second shopping device having
      i) a latching mechanism for securing said second shopping device to a shopping cart;
      ii) a receiver for receiving said product identification number from said first shopping device;
      iii) a radio for receiving a message over said wireless network and for communicating said product identification number over said wireless network; and
      iv) a display for displaying said message;
   c) a product profile database containing an identification number for a plurality of products, wherein each identification number includes correlation data linking said identification number with one or more correlated products; and
   d) a host computer associated with the shopping establishment having access to said product profile database, said host computer having:
      i. a communication link for receiving the product identification number registered by the first shopping device; and
      ii. a messaging agent comprising:
         a message selector for selecting said message, said message relating to the one or more correlated products corresponding to the identification number registered by the first shopping device; and
         a message sending agent for communicating said message via the communication link to said first shopping device.

23. The system of claim 22 further comprising a location tracking agent for determining the approximate location of the customer.

24. The system of claim 23 wherein the product profile database contains a location identifier associated with the plurality of products and wherein after a customer scans a product the location tracking agent determines the location of the customer by:
   a) accessing the product profile database; and
   b) determining the location identifier associated with the product registered by the wireless shopping device.

25. The system of claim 22 wherein the host computer has access to a database that stores information about a credit account associated with the customer and wherein the credit account is automatically charged when the customer completes his product selection.

26. The system of claim 22 further comprising a remote computer having a communication link for communicating over said wireless network.

27. The system of claim 26 wherein said remote computer is associated with the customer's home, said remote computer having a docking station for communicating with said wireless shopping device.

28. The system of claim 26 wherein said remote computer is associated with a manufacturer distributor.

29. The system of claim 22 further comprising a kiosk associated with a store, said kiosk having communications link for communicating over said wireless network.

30. The system of claim 22 further comprising a kiosk associated with a store, said kiosk having a communications link for communicating with said first shopping device.

31. The system of claim 30 wherein said kiosk uploads information stored in said first shopping device.

32. The system of claim 30 wherein said kiosk downloads information to said first shopping device.

33. A system for enabling a customer to shop for products offered for sale by a merchant, the system being operable within a store associated with the merchant and at a location remote from the merchant's store, the system comprising:
   a) a wireless network for the bi-directional communication of data;
   b) a wireless shopping device capable of operating in an in store mode and an out of store mode, said wireless shopping device having:
      i) a reader for registering product identification numbers;
      ii) a radio for receiving a message over said wireless network and for communicating said product identification numbers over said wireless network; and
      iii) a display for displaying said message;
   c) a host computer associated with the merchant having:
      i) a communication link for receiving the product identification numbers registered by the wireless shopping device;
      ii) a message selector for selecting said message to send to the wireless shopping device;
      iii) a message sending agent for communicating said message via the communication link to said wireless shopping device;
   wherein when the wireless shopping device is operating in the out of store mode, the wireless shopping device requests that the customer select a delivery method for products associated with said product identification numbers transmitted from the wireless shopping device to the host computer and wherein when the wireless shopping device is operating in the in store mode, the wireless shopping device does not request that the customer select a delivery method.

34. The system of claim 33 wherein said message selector selects said message based on the output of an inference engine.

35. The system of claim 33 wherein said message selector selects said message based at least partly on chance.

36. A system for marketing products to a customer in a shopping establishment comprising:
   a) a shopping device having:
      i) a reader for registering a product identification number;
      ii) a communications port;
      iii) a memory for storing a customer identification code; and
      iv) a display for displaying messages;
   b) a kiosk for linking with the communications port of said shopping device;
   c) a host computer associated with the shopping establishment having access to a customer database, said customer database including information about the customer, said host computer having:
      i) a communication link for receiving the customer identification code of the customer and for communicating with the shopping device via the kiosk;
      ii) and a message selector for selecting messages to download to the shopping device, at least one of said messages being correlated to said information about the customer identified by the customer identification code; and
   d) a triggering agent for triggering the display of one of said selected messages on the shopping device.

37. The system of claim 36 wherein said kiosk links with said shopping device via a wireless communication link.

38. The system of claim 36 wherein said kiosk uploads information from said shopping device.

39. The system of claim 36 wherein said kiosk uploads recipes from said shopping device.

40. The system of claim 36 wherein said kiosk downloads to the shopping device an aisle sorted shopping list.

41. The system of claim 36 wherein the display of said one of said selected messages is triggered in response to the customer registering a product with said shopping device.

42. The system of claim 36 wherein the display of said one of said selected messages is triggered in response to the location of the customer.

43. The system of claim 36 wherein the display of said one of said selected messages is triggered in response to the time of day.

44. A system for marketing products to a customer in a shopping establishment comprising:
   a) a shopping device having
      i) a reader for registering a product identification number;
      ii) a communications port;
      iii) a memory for storing a customer identification code; and
      iv) a display for displaying messages;
   b) a kiosk for linking with the communications port of said shopping device;
   c) a host computer associated with the shopping establishment having access to a product database, said product database including a product identification number for a plurality of products and product correlation data linking said product identification number with one or more correlated products, said host computer having
      i) a communication link for receiving the customer identification code of the customer and for communicating with the shopping device via the kiosk; and
      ii) a message selector for selecting messages to download to the shopping device; and
   d) a triggering agent for triggering the display of one of said selected messages on the shopping device, said selected message containing information about one of the products correlated to the product identification number registered by the shopping device.

45. The system of claim 44 wherein said kiosk links with said shopping device via a wireless communication link.

46. The system of claim 44 wherein said kiosk uploads information from said shopping device.

47. The system of claim 44 wherein said kiosk uploads recipes from said shopping device.

48. The system of claim 44 wherein said kiosk downloads to the shopping device an aisle sorted shopping list.

49. The system of claim 44 wherein the display of said one of said selected messages is triggered in response to the customer registering a product with said shopping device.

50. The system of claim 44 wherein the display of said one of said selected messages is triggered in response to the location of the customer.

51. The system of claim 44 wherein the display of said one of said selected messages is triggered in response to the time of day.

52. A system for marketing products to a customer in a shopping establishment comprising:
   a) a customer database containing data relating to at least one shopping behavior characteristic of the customer;
   b) a shopping device that operates in one of a store mode and out of store mode having
      i) a reader for registering a product identification number;
      ii) a communications port;
      iii) a memory for storing a customer identification code;
      iv) and a display for displaying messages;
   c) a cradle for linking with the communications port of said shopping device;
   d) a host computer associated with the shopping establishment having access to said customer database, said host computer having:
      i) a communication link for receiving the customer identification code of the customer and for communicating with the shopping device via the cradle; and
      ii) a messaging agent with a message selector for selecting messages to download to the shopping device, at least one of said messages being correlated to said shopping behavior characteristic of the customer identified by the customer identification code; and
   e) a triggering agent for triggering the display of one of said selected messages on the shopping device.

53. The system of claim 52 wherein the cradle is integrated into a kiosk.

54. The system of claim 53 wherein the kiosk is located at an end cap within the shopping establishment.

55. The system of claim 52 wherein the display of said one of said selected messages is triggered in response to the customer registering a product with said shopping device.

56. The system of claim 52 wherein the display of said one of said selected messages is triggered in response to the location of the customer.

57. A system for marketing products to a customer in a shopping establishment comprising:

a) a product profile database containing a product identification number for a plurality of products, wherein each product identification number includes correlation data linking said product identification number with one or more correlated products;

b) a shopping device having
   i) a reader for registering a product identification number;
   ii) a communications port;
   iii) a memory for storing a customer identification code; and
   iv) a display for displaying messages;

c) a cradle for linking with the communications port of said shopping device;

d) a host computer associated with the shopping establishment having access to said product profile database, said host computer having
   i) a communication link for receiving the customer identification code of the customer and for communicating with the shopping device via the cradle; and
   ii) a message selector for selecting messages to download to the shopping device; and e) a triggering agent for triggering the display of one of said selected messages on the shopping device, said selected message containing information about one of the products correlated to the product identification number registered by the shopping device.

58. The system of claim 57 wherein the cradle is integrated into a kiosk.

59. The system of claim 58 wherein the kiosk is located at an end cap within the shopping establishment.

60. The system of claim 57 wherein the display of said one of said selected messages is triggered in response to the customer registering a product with said shopping device.

61. The system of claim 57 wherein the display of said one of said selected messages is triggered in response to the location of the customer.

62. A system for marketing products available for sale by a merchant to a customer, the system comprising:

a) a wide area network for the bi-directional communication of data;

b) a remote terminal associated with the customer, said remote terminal having:
   i) a communication link for communicating over said wide area network
   ii) a graphical user interface for displaying graphical representations of the products available for sale by the merchant, wherein said graphical representations are arranged according to virtual aisles and virtual shelves, and for displaying messages promoting the products on the virtual aisles;
   iii) a product selector for allowing the customer to select which products the customer would like to purchase;

c) a host computer associated with the merchant, said host computer having access to a customer database containing information about the customer, and further having:
   i) a communications link for communicating over said wide area network, wherein said host computer can receive a customer identification code sent from the remote terminal;
   ii) a message selector for selecting the promotional messages to send to the remote terminal, at least one of said messages being correlated to said information about the customer identified by the customer identification code.

63. The system of claim 62 wherein said graphical representations are three dimensional.

64. The system of claim 62 wherein the product selector is a computer mouse.

65. A method for a manufacturer or distributor to manage inventory of a product through an indirect sales entity, wherein the manufacturer or distributor has access to a host computer and wherein a plurality of consumers utilizing the indirect sales entity each have a wireless shopping device, the method comprising the steps of:

a) determining an inventory surplus quantity of the product based at least partly on sales of the product;

b) calculating, as a function of said inventory surplus quantity, a discount to offer to the consumers; and c) transmitting said discount to said wireless shopping device wherein said wireless shopping device notifies the consumer of said discount.

66. The method of claim 65 further including the step of determining consumer responsiveness data based at least partly on sales of the product.

67. The method of claim 66 further including the step of transmitting to said host computer said consumer responsiveness data.

68. The method of claim 66 further including the step of calculating an adjusted discount as a function of said consumer responsiveness data.

69. The method of claim 65 wherein an expiration date of the product is a factor in said calculating step.

70. A method for a store to manage inventory of a product, wherein the store has access to a host computer and wherein a plurality of consumers each have a wireless shopping device, the method comprising the steps of:

a) determining an inventory surplus quantity of the product based at least partly on sales of the product;

b) calculating, as a function of said inventory surplus quantity, a discount to offer to the consumers; and c) transmitting said discount from said host computer to a first wireless shopping device wherein said first wireless shopping device notifies the consumer of said discount.

71. The method of claim 70 further including the step of determining consumer responsiveness data based at least partly on sales of the product.

72. The method of claim 71 further including the step of transmitting to said host computer said consumer responsiveness data.

73. The method of claim 71 further including the step of calculating an adjusted discount as a function of said consumer responsiveness data.

74. The method of claim 70 wherein an expiration date of the product is a factor in said calculating step.

75. A method for marketing products to a plurality of customers in a shopping establishment wherein the customers each use a wireless shopping device for registering a product identification code on selected products, the method comprising:

a) classifying the customers according to a behavior category, said behavior category being based upon products selected for purchase by the customers via scanning with a wireless data collection device in communication with a central host, the shopping device operates in one of a store mode and an out of store mode;

b) maintaining a database containing data relating to said behavior category, the database accessible to the central host with a messaging agent that selects messages to be presented to the customer;

c) associating a message with said behavior category;

d) transmitting said message to said wireless shopping device of the customers that are classified as being within said behavior category according to said data maintained in said database;

e) monitoring the customer selected products in real time;

f) modifying said database in response to said monitoring step.

76. The method of claim 75 wherein said modifying step comprises changing the behavior category of the customers.

77. The method of claim 75 wherein the wireless shopping device comprises:

a) a first handheld device having a reader for registering the product identification code; and b) a second device having a video display secured to a shopping cart.

78. The method of claim 75 wherein said behavior category relates to whether the customer has young children.

79. The method of claim 75 wherein said behavior category relates to the types of food the customer purchases.

80. A method of marketing products to a customer in a shopping establishment wherein the customer uses a wireless shopping device for registering a product identification code on selected products, said wireless shopping device being capable of receiving promotional messages relating to products offered for sale, the method comprising the steps of:

a) calculating a message control value, said message control value being used to determine whether to send a message to the customer;

b) comparing said message control value to a threshold level;

c) displaying said message on said wireless shopping device if said message control value is below said threshold level;

d) monitoring the customer's response to said message displayed on said wireless shopping device; and e) adjusting said message control value in response to said monitoring step.

81. The method of claim 80 wherein said adjusting step comprises increasing said message control value if said customer does not register the product identification code for the product associated with the message within a predetermined time.

82. The method of claim 80 wherein said adjusting step comprises decreasing said message control value if said customer registers the product identification code for the product associated with the message.

83. The method of claim 80 wherein said threshold level is based at least in part on the customer's input as to the number of messages the customer would like to receive.

84. The method of claim 80 wherein said customer receives a discount based upon the setting of the threshold level.

85. A method of shopping in a shopping establishment wherein a customer uses a wireless shopping device, the method comprising the steps of:

a) storing an electronic shopping list on said wireless shopping device, said electronic shopping list comprising a list of products the customer would like to purchase;

b) providing a host computer associated with the shopping establishment, said host computer having access to an inventory list comprising a list of products available for purchase from the shopping establishment;

c) providing a communication link between said wireless shopping device and said host computer;

d) generating a product availability list comprised of products that are common to both said electronic shopping list and said inventory list; and e) providing said product availability list to the customer.

86. The method of claim 85 wherein said communication link between said wireless shopping device and said host computer is created by coupling said wireless shopping device to a kiosk.

87. The method of claim 85 wherein said host computer downloads messages to said wireless shopping device, said messages being correlated to the products on said electronic shopping list.

88. The method of claim 85 wherein said host computer accesses said electronic shopping list stored in said wireless shopping device.

89. The method of claim 85 wherein said wireless shopping device accesses said inventory list.

90. The method of claim 85 wherein the order of the products in said product availability list is correlated to the layout of the shopping establishment.

91. The method of claim 85 further comprising the step of providing to the customer information useful in locating at least some of the products on product availability list.

92. The method of claim 85 wherein said product availability list is displayed on said wireless shopping device.

93. The method of claim 85 wherein said product availability list is printed out under the control of a kiosk.

94. The method of claim 85 wherein said wireless shopping device includes a reader for reading a product identification code.

95. The method of claim 94 further comprising the step of providing an indication when a product identification code of a product on said product availability list is read by said wireless shopping device.

96. The method of claim 94 wherein said electronic shopping list is at least partly generated by reading a product identification code in an advertisement.

97. The method of claim 85 wherein the wireless shopping device comprises:

a) a first handheld device having a reader for registering the product identification code; and b) a second device having a video display secured to a shopping cart.

98. The method of claim 97 wherein said step of providing said product availability list comprises displaying said list on said video display.

99. In a self-service shopping checkout system wherein a shopper uses a portable terminal for scanning of a bar code of an item selected for purchase and wherein items selected for purchase are deposited in a plurality of shopping bags, and wherein a list of items self-scanned by the shopper is compiled, a method for performing a security check to determine if the shopper has failed to scan an item deposited into the shopping bags comprising:

a) selecting from the shopping bags one or more items to be scanned by a clerk;

b) scanning a barcode located on each of said items selected for scanning;

c) determining a weight associated with each of the items on said list that were not scanned by the clerk;

d) determining a net weight of each shopping bag, said net weight of each shopping bag being associated with a weight of each shopping bag without the items selected for scanning;

e) comparing the net weight of each shopping bag with the weight of the items on said list that were not scanned by the clerk; and f) disallowing the shopping transaction if said comparison step indicates that the net weight of any of the shopping bags could not be attained from the weight of the items on said list that were not scanned by the clerk.

100. The method of claim 99 wherein said step of determining the net weight of each shopping bag comprises determining a weight associated with each shopping bag, determining a weight associated with each of the items selected for scanning and deducting from the weight of each shopping bag the weight of each of the items selected for scanning within the respective shopping bags.

101. The method of claim 99 wherein said step of determining the net weight of each shopping bag comprises measuring the weight of each shopping bag after removing the items selected for scanning.

102. The method of claim 99 further including the step of determining if the item selected for scanning is present on said list of items self-scanned by the shopper.

103. The method of claim 99 further comprising the step of determining probability that the net weight of any of the shopping bags could be attained from the weight of the items on said list that were not scanned by the clerk.

104. The method of claim 103 further comprising the step of disallowing the shopping transaction if said probability is less than an acceptable level.

105. The method of claim 104 wherein said acceptable level is based at least in part on a security record of the shopper.

* * * * *

UNITED STATES PATENT AND TRADEMARK OFFICE
CERTIFICATE OF CORRECTION

PATENT NO. : 6,837,436 B2
APPLICATION NO. : 09/990597
DATED : January 4, 2005
INVENTOR(S) : Jerome Swartz et al.

Page 1 of 28

It is certified that error appears in the above-identified patent and that said Letters Patent is hereby corrected as shown below:

Replace the Title Page with the attached Title Page.

The drawing Sheets 1-28, consisting of Figs. 1-21 should be deleted to be replaced with Sheets 1-26, consisting of Figs. 1-21, as shown on the attached pages.

Signed and Sealed this
Eighth Day of May, 2012

David J. Kappos
*Director of the United States Patent and Trademark Office*

CERTIFICATE OF CORRECTION (continued)

(12) United States Patent
Swartz et al.

(10) Patent No.: US 6,837,436 B2
(45) Date of Patent: Jan. 4, 2005

(54) CONSUMER INTERACTIVE SHOPPING SYSTEM

(75) Inventors: Jerome Swartz, Old Field, NY (US); Thomas K. Roslak, Eastport, NY (US); Mauro Premutico, Brooklyn, NY (US); Adam Petrovich, Pittsburgh, PA (US); Edward Barkan, Miller Place, NY (US)

(73) Assignee: Symbol Technologies, Inc., Holtsville, NY (US)

(*) Notice: Subject to any disclaimer, the term of this patent is extended or adjusted under 35 U.S.C. 154(b) by 197 days.

(21) Appl. No.: 09/990,597

(22) Filed: Nov. 21, 2001

(65) Prior Publication Data

US 2003/0132298 A1 Jul. 17, 2003

Related U.S. Application Data

(63) Continuation-in-part of application No. 09/487,923, filed on Jan. 19, 2000, which is a division of application No. 08/866,690, filed on May 30, 1997, now abandoned, which is a continuation-in-part of application No. 08/780,023, filed on Dec. 20, 1996, now Pat. No. 6,084,528, which is a continuation-in-part of application No. 08/706,579, filed on Sep. 5, 1996, now Pat. No. 5,825,002.

(51) Int. Cl.[7] ............................................. G06K 7/10
(52) U.S. Cl. ............................. 235/472.02; 235/462.45
(58) Field of Search ................... 235/472.02, 462.45, 235/462.46, 472.01, 380, 385, 383

(56) References Cited

U.S. PATENT DOCUMENTS

| | | | |
|---|---|---|---|
| 4,373,133 A | 2/1983 | Clyne et al. | 235/383 |
| 4,779,706 A | 10/1988 | Mergenthaler | 186/61 |
| 4,787,467 A | 11/1988 | Johnson | 177/50 |
| 4,792,018 A | 12/1988 | Humble et al. | 186/61 |
| 4,833,308 A | 5/1989 | Humble | 235/383 |
| 4,882,724 A | 11/1989 | Vela et al. | 364/401 |
| 4,947,028 A | 8/1990 | Gorog | 235/381 |
| 4,949,256 A | 8/1990 | Humble | 364/401 |
| 4,973,952 A | 11/1990 | Malec et al. | 340/825 |
| 5,047,614 A | 9/1991 | Bianco | 235/385 |
| 5,192,854 A | 3/1993 | Counts | 235/375 |
| 5,227,874 A | 7/1993 | Von Kohorn | 358/84 |
| 5,250,789 A | 10/1993 | Johnsen | 235/383 |
| 5,287,266 A | 2/1994 | Malec et al. | 364/401 |
| 5,294,781 A | 3/1994 | Takahashi et al. | 235/376 |
| 5,297,882 A | 3/1994 | Kornides | 401/184 |
| 5,340,970 A | 8/1994 | Wolfe et al. | 235/383 |
| 5,361,871 A | 11/1994 | Gupta et al. | 186/61 |
| 5,420,606 A | 5/1995 | Begum et al. | 345/156 |
| 5,424,524 A | 6/1995 | Ruppert et al. | 235/462 |
| 5,426,282 A | 6/1995 | Humble | 235/383 |
| 5,437,346 A | 8/1995 | Dumont | 186/61 |
| 5,457,307 A | 10/1995 | Dumont | 235/383 |
| 5,463,209 A | 10/1995 | Figh et al. | 235/383 |
| 5,469,206 A | 11/1995 | Strubbe et al. | 348/7 |
| 5,478,989 A | 12/1995 | Shepley | 235/375 |
| 5,490,060 A | 2/1996 | Malec et al. | 364/401 |
| 5,630,068 A | 5/1997 | Vela et al. | 395/201 |
| 5,664,110 A | 9/1997 | Green et al. | 705/26 |
| 5,761,648 A | 6/1998 | Golden et al. | 705/14 |
| 5,821,513 A | 10/1998 | O'Hagan et al. | 235/383 |
| 5,859,414 A | 1/1999 | Grimes et al. | 235/383 |
| 5,918,211 A | 6/1999 | Sloane | 705/16 |
| 5,950,173 A | 9/1999 | Perkowski | 705/26 |
| 5,970,469 A | 10/1999 | Scroggie et al. | 705/14 |
| 5,995,015 A | 11/1999 | DeTemple et al. | 340/825.49 |
| 6,000,610 A | 12/1999 | Talbott et al. | 235/383 |

(List continued on next page.)

Primary Examiner—Daniel St Cyr
(74) Attorney, Agent, or Firm—Amin & Turocy, LLP

(57) ABSTRACT

The present invention relates generally to a consumer interactive shopping and marketing system. The system includes a portable data terminal for communicating information over a communication network. The present system has aspects that may be used within a shopping establishment or at a user's home.

105 Claims, 26 Drawing Sheets

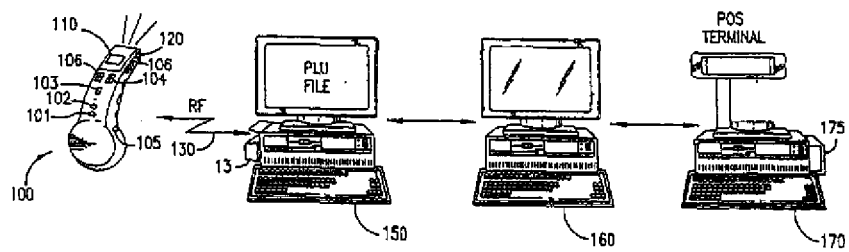

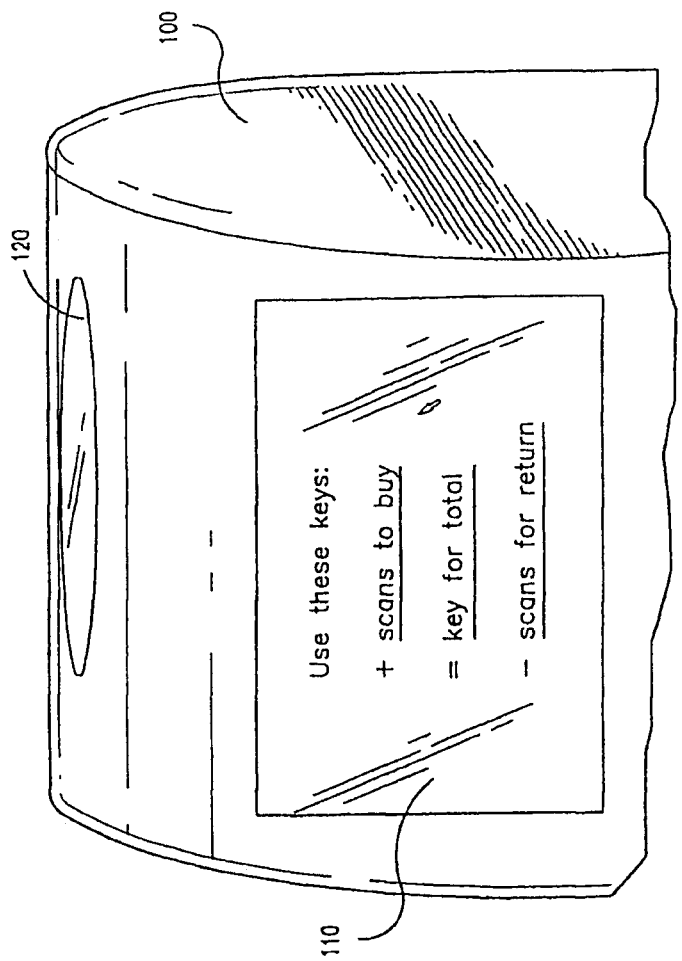

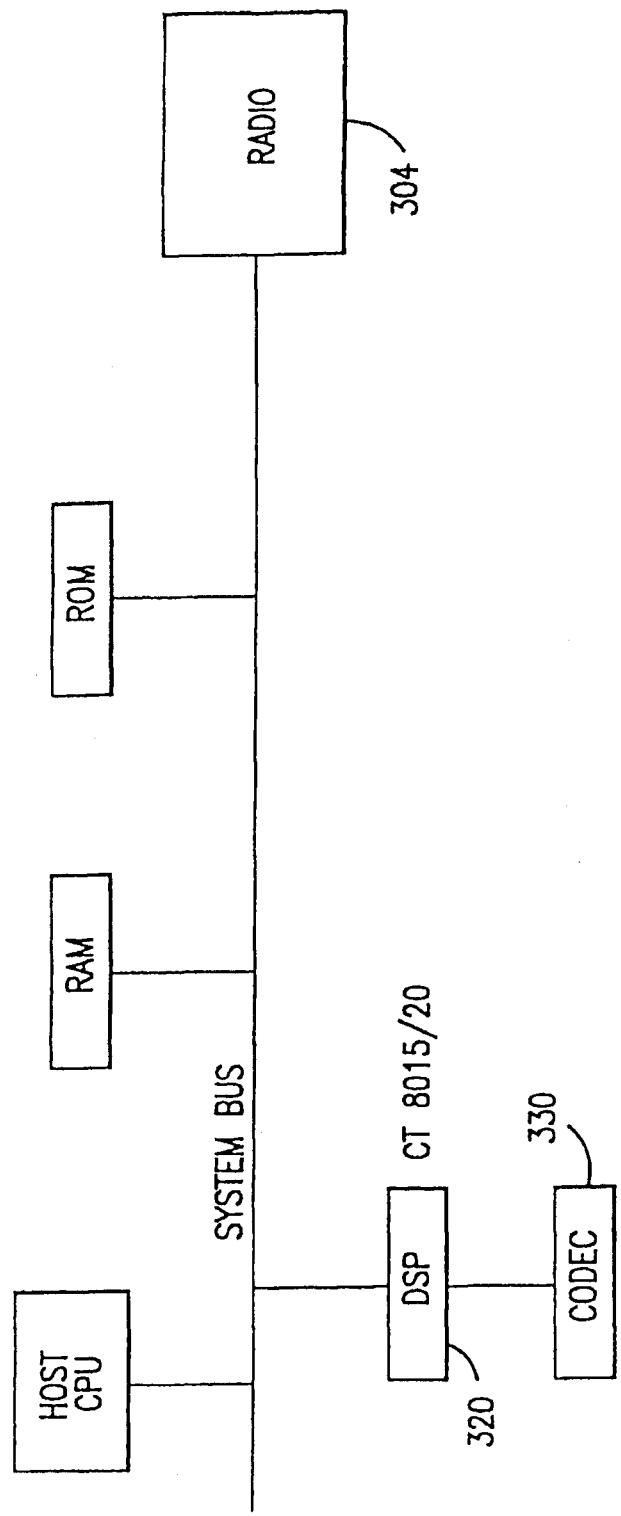

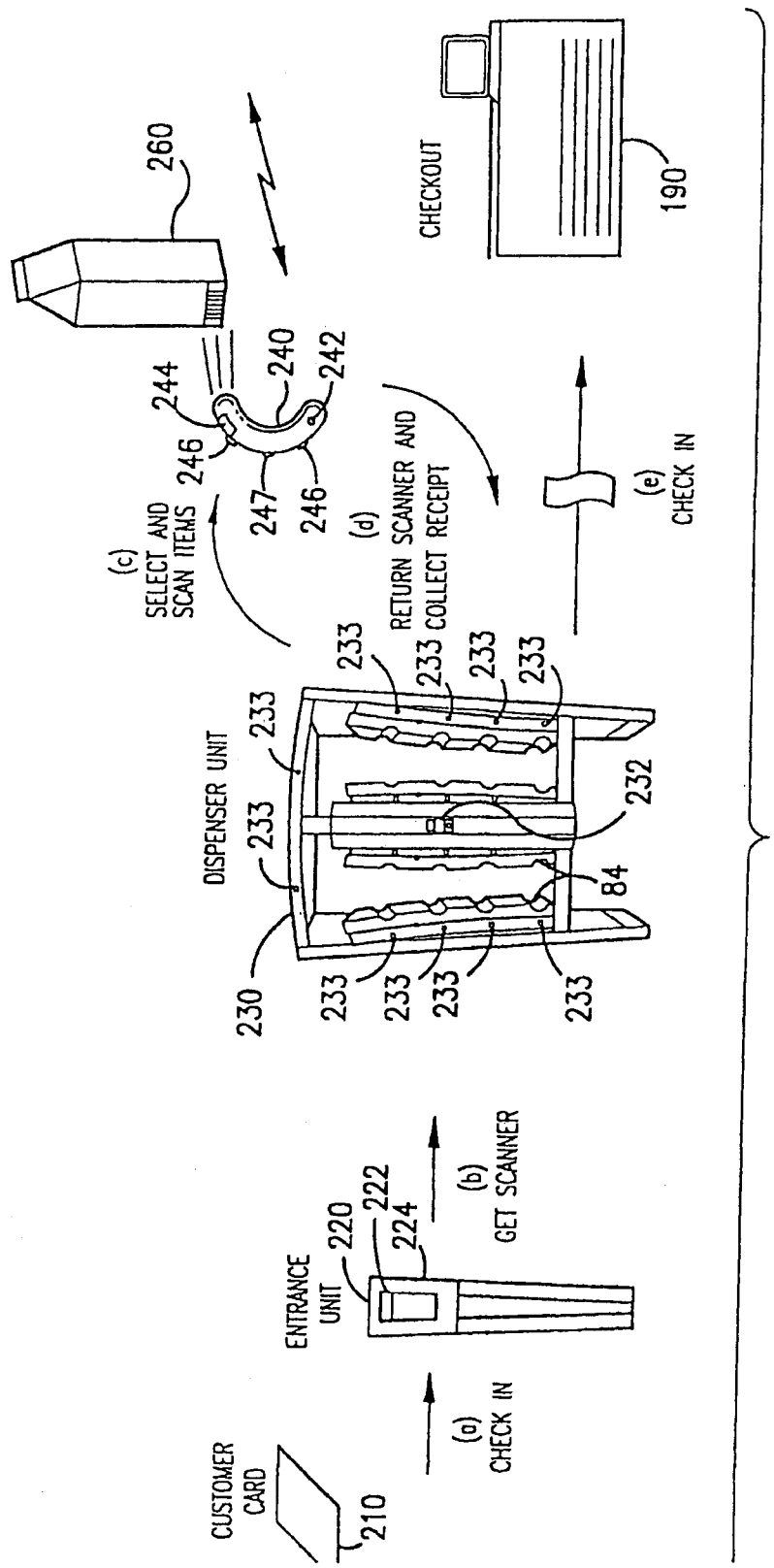

Figure 16

| Product ID | General Type | Characteristics | Nutritional Value | Uses | Advertisements | Expiration | Replenishment |
|---|---|---|---|---|---|---|---|
| 0001 (2 lbs Zorro Pretzels) | Snack | Family size | 0 fat/serv., 0 cholesterol, 45 Carbs./serv., 4 protein/serv. | Party, snacks | In circular | 18 months | 4 |
| 0002 (1 liter Store Brand cola) | Beverage | Caffeine free, good profit margin | 0 fat/serv., 100 carbs/serv., 0 protein/serv. | Party, dinner | TV commercial | 18 months | 2 |
| 0003 (30 gal. garbage bags) | House wares | High profit margin | N/A | Staple, parties cleaning | In newspaper | N/A | 6 |
| 0004 (Piggy Brand Sausage) | Meat | High fat product | 22 fat/serv., 30 carbs/serv., 40 protein/serv. | Dinner, barbeque | No ads in last 4 weeks | 1 week | 6 |
| 0005 (blueberries) | Fruit | High profit margin | 0 fat/serv., 10 carbs/serv., 1 protein/serv. | Snacks, pancakes, blueberry pie | In circular | 5 days | 6 |
| 0006 (Zap Brand Greeting card) | Stationery | Birthday card, High profit margin | N/A | Party | No ads in last 4 weeks | N/A | 5 |

902 / 904 / 906 / 908 / 910 / 912 / 914 / 916

Figure 17

| Product ID | Price 918 | Profit 920 | Expense Factor 922 | Available Promotions 924 | Location 926 | Inventory 928 | Next Shipment 930 |
|---|---|---|---|---|---|---|---|
| 0001 (2 lbs Zorro Pretzels) | $3.99 | $.75 | 2 | .35 discount | Aisle 10, section 5, shelf 3 | 52 | In 48 hours |
| 0002 (1 liter Store Brand cola) | $.95 | $.15 | 3 | none | Aisle 10, section 4, shelf 3 | 67 | In 5 days |
| 0003 (30 gal. garbage bags) | $3.95 | $1.00 | 1 | .50 discount | Aisle 11, section 3, shelf 4 | 39 | In 7 days |
| 0004 (Piggy Brand Sausage) | $4.92 | $.50 | 4 | none | Aisle 3, section 5, shelf N/A | 35 | In 5 days |
| 0005 (blueberries) | $3.00 | $1.00 | 8 | $.25 | Aisle 1, section 5, shelf N/A | 122 | In 6 hours |
| 0006 (Zap Brand Greeting card) | $3.50 | $1.50 | 1 | none | Aisle 12, section 3, shelf 3 | 22 | In 2 weeks |

Figure 18

| 902 | 932 | 934 | 936 | 938 | 940 |
|---|---|---|---|---|---|
| Product ID | Nutritional Alternatives | Competitive Alternatives | Substitutes | Complementary Products | Products in the Area |
| 0001 (2 lbs Zorro Pretzels) | 0028 (Zorro, No salt pretzels) | 0023 (Store brand pretzels), 0024 (Wise Guy brand pretzels) | 0025 (Zorro potato chips), 0027 (Store brand popcorn) | Soda, beer, potato chips, popcorn | 0023, 0024, 0025, 0027, 0028, 0002, 0012, 0014, 0015, 0016 |
| 0002 (1 liter Store Brand cola) | 0012 (Store brand diet cola), 0013 (Store brand juice) | 0014 (Tony's Brand Cola), 0015 (Acne brand cola) | 0016 (Pop's brand root beer) | Straws, frozen pizza | 0023, 0024, 0025, 0027, 0028, 0002, 0012, 0014, 0015, 0016 |
| 0003 (30 gal. garbage bags) | N/A | 0044 (Store brand bags) | 0048 (garbage container) | Window cleaner, tile cleaner, air freshener | 0045 (sandwich bags), 0049 (air freshener) |
| 0004 (Piggy Brand Sausage) | 0050 (Acne Turkey sausage) | 0055 (Store brand sausage) | 0057 (ground beef) | Peppers, Italian bread | 0050, 0055, 0057, 0058 (poultry) |
| 0005 (blueberries) | None | None | 0062 (raspberries), 0064 (strawberries) | Sugar, flour | 0062, 0064 |
| 0006 (Zap Brand Greeting card) | N/A | 0072 (Acne brand cards) | 0078 (stationary) | Gifts, birthday candles | 0074 (magazines) |

Figure 19

Customer ID Number 10-0001:

|                      |                          |
|----------------------|--------------------------|
| Shopping Visit:      | 6/16/01                  |
| Start of Visit:      | 10:15 am                 |
| End of Visit:        | 10:58 am                 |
| Total items:         | 65                       |
| Total cost:          | $87.32                   |
| Products purchased:  | 0002, 0006, 0050, ... 1234 |
|                      |                          |
| Shopping Visit:      | 6/23/01                  |
| Start of Visit:      | 9:15 am                  |
| End of Visit:        | 9:45 am                  |
| Total items:         | 37                       |
| Total cost:          | $55.52                   |
| Products purchased:  | 0002, 0016, 0058, ... 1234 |
|                      |                          |
| Shopping Visit:      | 6/30/01                  |
| Start of Visit:      | 1:00 pm                  |
| End of Visit:        | 1:18 pm                  |
| Total items:         | 15                       |
| Total cost:          | $47.62                   |
| Products purchased:  | 0002, 0005, 0050, ... 1234 |
|                      |                          |
| Shopping Visit:      | 7/7/01                   |
| Start of Visit:      | 10:13 am                 |
| End of Visit:        | 11:10 am                 |
| Total items:         | 75                       |
| Total cost:          | $97.42                   |
| Products purchased:  | 0002, 0006, 0058, ... 1234 |

Figure 20

Customer ID Number 10-0001

| Products Purchased (950) | Linked Products (952) | Price Sensitivity Factor (954) | Replenishment Frequency (956) | Date of visit (958) | Date of visit (958) | Date of visit (958) | Date of visit (958) |
|---|---|---|---|---|---|---|---|
| 0002 | N/A | 1 | 1 | 6/16/01 | 6/23/01 | 6/30/01 | 7/07/01 |
| 0005 | 0045, 0067, 0072, 0089, 0139, 0202 | 5 | 7 | -- | -- | 6/30/01 | -- |
| 0006 | 0090 | 2 | 3 | 6/16/01 | -- | -- | 7/07/01 |
| 0016 | N/A | 4 | 4 | -- | 6/23/01 | -- | -- |
| 0050 | N/A | 3 | 3 | 6/16/01 | -- | 6/30/01 | -- |
| 0058 | 0016 | 3 | 3 | -- | 6/23/01 | -- | 7/07/01 |

Figure 21

Customer ID Number 10-0001
Visit: 6/16/01

| Product Purchased (950) | Product selection order (960) | Discount available for product? (962) | Discount applied to product? (964) | Discount available on competing product? (966) |
|---|---|---|---|---|
| 0002 | 4/65 | No | N/A | Yes |
| 0006 | 45/65 | Yes | Yes | No |
| 0050 | 39/65 | Yes | No | No |